United States Patent
Shabtay et al.

(10) Patent No.: US 11,966,147 B2
(45) Date of Patent: Apr. 23, 2024

(54) POP-OUT ZOOM CAMERA

(71) Applicant: Corephotonics Ltd., Tel Aviv (IL)

(72) Inventors: Gal Shabtay, Tel Aviv (IL); Ephraim Goldenberg, Tel Aviv (IL); Itay Yedid, Tel Aviv (IL); Roy Rudnick, Tel Aviv (IL); Michael Dror, Tel Aviv (IL); Michael Scherer, Tel Aviv (IL); Ziv Shemesh, Tel Aviv (IL); Nadav Goulinski, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 17/915,148

(22) PCT Filed: Aug. 9, 2021

(86) PCT No.: PCT/IB2021/057311
§ 371 (c)(1),
(2) Date: Sep. 28, 2022

(87) PCT Pub. No.: WO2022/058807
PCT Pub. Date: Mar. 24, 2022

(65) Prior Publication Data
US 2023/0205055 A1 Jun. 29, 2023

Related U.S. Application Data

(60) Provisional application No. 63/173,446, filed on Apr. 11, 2021, provisional application No. 63/080,047, filed on Sep. 18, 2020.

(51) Int. Cl.
*G03B 17/04* (2021.01)
*G02B 13/00* (2006.01)
(Continued)

(52) U.S. Cl.
CPC ............ *G03B 17/04* (2013.01); *G02B 13/009* (2013.01); *G02B 15/142* (2019.08); *G03B 5/02* (2013.01);
(Continued)

(58) Field of Classification Search
CPC ........ G03B 17/04; G03B 17/12; G03B 13/36; G03B 13/009; G03B 13/0045;
(Continued)

(56) References Cited

U.S. PATENT DOCUMENTS 2,106,752 A 2/1938 Land
2,354,503 A 7/1944 Arthur
(Continued)

FOREIGN PATENT DOCUMENTS

CN 102193162 A 9/2011
CN 102466865 A 5/2012
(Continued)

OTHER PUBLICATIONS

International Search Report and Written Opinion in related PCT application PCT/IB2021/057311, dated Dec. 7, 2021.
(Continued)

*Primary Examiner* — Travis S Fissel
(74) *Attorney, Agent, or Firm* — Nathan & Associates; Menachem Nathan

(57) ABSTRACT

Cameras with OIS capable of performing multi zoom super macro photography and handheld electronic devices comprising such cameras. A camera may include a lens comprising N lens elements $L_1$-$L_N$ divided into two or more lens groups arranged along a lens optical axis starting with $L_1$ on an object side and ending with $L_N$ on an image side, adjacent lens groups separated by a respective air-gap $d_i$ along the lens optical axis; an image sensor with a sensor diagonal SD between 7 and 20 mm separated from lens element $L_N$ by an
(Continued)

air-gap $d_2$ along the lens optical axis; and an actuator for controlling air-gaps $d_1$ and $d_2$ to switch the camera between $M \geq 1$ operative pop-out states and a collapsed state and to focus the camera on an object at an object-lens distance of less than 30 cm.

15 Claims, 31 Drawing Sheets

(51) Int. Cl.
| | | |
|---|---|---|
| G02B 15/14 | (2006.01) | |
| G03B 5/02 | (2021.01) | |
| G03B 13/36 | (2021.01) | |
| G03B 30/00 | (2021.01) | |
| H04N 23/68 | (2023.01) | |

(52) U.S. Cl.
CPC .......... *G03B 13/36* (2013.01); *G03B 30/00* (2021.01); *H04N 23/687* (2023.01); *G02B 13/0045* (2013.01); *G03B 2205/0046* (2013.01)

(58) Field of Classification Search
CPC .......... G03B 13/02; G03B 5/02; G03B 30/00; G02B 15/142; G02B 15/14; G02B 15/02; G02B 9/60; G02B 9/62; G02B 9/64; G02B 3/02; G02B 3/10; G02B 7/005; G02B 7/023; G02B 17/04; H04N 23/687
USPC ....... 359/379–381, 408, 406, 672, 684, 680, 359/685, 691, 694, 699, 703, 708, 359/713–717, 721, 813, 817–826
See application file for complete search history.

(56) References Cited

U.S. PATENT DOCUMENTS

| | | |
|---|---|---|
| 2,378,170 A | 6/1945 | Aklin |
| 2,441,093 A | 5/1948 | Aklin |
| 3,388,956 A | 6/1968 | Eggert et al. |
| 3,524,700 A | 8/1970 | Eggert et al. |
| 3,558,218 A | 1/1971 | Grey |
| 3,864,027 A | 2/1975 | Harada |
| 3,942,876 A | 3/1976 | Betensky |
| 4,134,645 A | 1/1979 | Sugiyama et al. |
| 4,338,001 A | 7/1982 | Matsui |
| 4,465,345 A | 8/1984 | Yazawa |
| 5,000,551 A | 3/1991 | Shibayama |
| 5,014,077 A * | 5/1991 | Yomogizawa ......... G03B 17/04 396/85 |
| 5,969,869 A | 10/1999 | Hirai et al. |
| 6,014,266 A | 1/2000 | Obama et al. |
| 6,035,136 A | 3/2000 | Hayashi et al. |
| 6,088,535 A * | 7/2000 | Katano ................. G03B 17/14 396/79 |
| 6,147,702 A | 11/2000 | Smith |
| 6,169,636 B1 | 1/2001 | Kreitzer |
| 6,654,180 B2 | 11/2003 | Ori |
| 7,187,504 B2 | 3/2007 | Horiuchi |
| 7,206,136 B2 | 4/2007 | Labaziewicz et al. |
| 7,515,351 B2 | 4/2009 | Chen et al. |
| 7,564,635 B1 | 7/2009 | Tang |
| 7,643,225 B1 | 1/2010 | Tsai |
| 7,660,049 B2 | 2/2010 | Tang |
| 7,684,128 B2 | 3/2010 | Tang |
| 7,688,523 B2 | 3/2010 | Sano |
| 7,692,877 B2 | 4/2010 | Tang et al. |
| 7,697,220 B2 | 4/2010 | Iyama |
| 7,738,186 B2 | 6/2010 | Chen et al. |
| 7,777,972 B1 | 8/2010 | Chen et al. |
| 7,813,057 B2 | 10/2010 | Lin |
| 7,821,724 B2 | 10/2010 | Tang et al. |
| 7,826,149 B2 | 11/2010 | Tang et al. |
| 7,826,151 B2 | 11/2010 | Tsai |
| 7,869,142 B2 | 1/2011 | Chen et al. |
| 7,898,747 B2 | 3/2011 | Tang |
| 7,916,401 B2 | 3/2011 | Chen et al. |
| 7,918,398 B2 | 4/2011 | Li et al. |
| 7,957,075 B2 | 6/2011 | Tang |
| 7,957,076 B2 | 6/2011 | Tang |
| 7,957,079 B2 | 6/2011 | Tang |
| 7,961,406 B2 | 6/2011 | Tang et al. |
| 8,000,031 B1 | 8/2011 | Tsai |
| 8,004,777 B2 | 8/2011 | Souma |
| 8,077,400 B2 | 12/2011 | Tang |
| 8,149,523 B2 | 4/2012 | Ozaki |
| 8,218,253 B2 | 7/2012 | Tang |
| 8,228,622 B2 | 7/2012 | Tang |
| 8,233,224 B2 | 7/2012 | Chen |
| 8,253,843 B2 | 8/2012 | Lin |
| 8,279,537 B2 | 10/2012 | Sato |
| 8,363,337 B2 | 1/2013 | Tang et al. |
| 8,395,851 B2 | 3/2013 | Tang et al. |
| 8,400,717 B2 | 3/2013 | Chen et al. |
| 8,451,549 B2 | 5/2013 | Yamanaka et al. |
| 8,503,107 B2 | 8/2013 | Chen et al. |
| 8,514,502 B2 | 8/2013 | Chen |
| 8,570,668 B2 | 10/2013 | Takakubo et al. |
| 8,718,458 B2 | 5/2014 | Okuda |
| 8,780,465 B2 | 7/2014 | Chae |
| 8,810,923 B2 | 8/2014 | Shinohara |
| 8,854,745 B1 | 10/2014 | Chen |
| 8,958,164 B2 | 2/2015 | Kwon et al. |
| 9,185,291 B1 | 11/2015 | Shabtay |
| 9,229,194 B2 | 1/2016 | Yoneyama et al. |
| 9,235,036 B2 | 1/2016 | Kato et al. |
| 9,279,957 B2 | 3/2016 | Kanda et al. |
| 9,438,792 B2 | 9/2016 | Nakada et al. |
| 9,488,802 B2 | 11/2016 | Chen et al. |
| 9,568,712 B2 | 2/2017 | Dror et al. |
| 9,678,310 B2 | 6/2017 | Iwasaki et al. |
| 9,817,213 B2 | 11/2017 | Mercado |
| 2002/0118471 A1 | 8/2002 | Imoto |
| 2005/0041300 A1 | 2/2005 | Oshima et al. |
| 2005/0062346 A1 | 3/2005 | Sasaki |
| 2005/0128604 A1 | 6/2005 | Kuba |
| 2005/0141103 A1 | 6/2005 | Nishina |
| 2005/0168840 A1 | 8/2005 | Kobayashi et al. |
| 2005/0270667 A1 | 12/2005 | Gurevich et al. |
| 2006/0238902 A1 | 10/2006 | Nakashima et al. |
| 2007/0229983 A1 | 10/2007 | Saori |
| 2007/0247726 A1 | 10/2007 | Sudoh |
| 2008/0056698 A1 | 3/2008 | Lee et al. |
| 2008/0094730 A1 | 4/2008 | Toma et al. |
| 2008/0304161 A1 | 12/2008 | Souma |
| 2009/0002839 A1 | 1/2009 | Sato |
| 2009/0067063 A1 | 3/2009 | Asami et al. |
| 2009/0122423 A1 | 5/2009 | Park et al. |
| 2009/0141365 A1 | 6/2009 | Jannard et al. |
| 2009/0147368 A1 | 6/2009 | Oh et al. |
| 2009/0225438 A1 | 9/2009 | Kubota |
| 2010/0033844 A1 | 2/2010 | Katano |
| 2010/0165476 A1 | 7/2010 | Eguchi |
| 2010/0277813 A1 | 11/2010 | Ito |
| 2011/0001838 A1 | 1/2011 | Lee |
| 2011/0102911 A1 | 5/2011 | Iwasaki |
| 2011/0115965 A1 | 5/2011 | Engelhardt et al. |
| 2011/0149119 A1 | 6/2011 | Matsui |
| 2011/0157430 A1 | 6/2011 | Hosoya et al. |
| 2011/0188121 A1 | 8/2011 | Goring et al. |
| 2011/0249347 A1 | 10/2011 | Kubota |
| 2012/0069455 A1 | 3/2012 | Lin |
| 2012/0092777 A1 | 4/2012 | Tochigi et al. |
| 2012/0105708 A1 | 5/2012 | Hagiwara |
| 2012/0154929 A1 | 6/2012 | Tsai et al. |
| 2012/0229920 A1 | 9/2012 | Otsu et al. |
| 2012/0262806 A1 | 10/2012 | Lin et al. |
| 2013/0057971 A1 | 3/2013 | Zhao et al. |
| 2013/0088788 A1 | 4/2013 | You |
| 2013/0208178 A1 | 8/2013 | Park |
| 2013/0279032 A1 | 10/2013 | Suigetsu et al. |
| 2013/0286488 A1 | 10/2013 | Chae |
| 2014/0022436 A1 | 1/2014 | Kim et al. |

(56) References Cited

U.S. PATENT DOCUMENTS

| | | |
|---|---|---|
| 2014/0092487 A1 | 4/2014 | Chen et al. |
| 2014/0146216 A1 | 5/2014 | Okumura |
| 2014/0204480 A1 | 7/2014 | Jo et al. |
| 2014/0285907 A1 | 9/2014 | Tang et al. |
| 2014/0293453 A1 | 10/2014 | Ogino et al. |
| 2014/0362274 A1 | 12/2014 | Christie et al. |
| 2015/0029601 A1 | 1/2015 | Dror et al. |
| 2015/0116569 A1 | 4/2015 | Mercado |
| 2015/0138431 A1 | 5/2015 | Shin et al. |
| 2015/0153548 A1 | 6/2015 | Kim et al. |
| 2015/0205068 A1 | 7/2015 | Sasaki |
| 2015/0244942 A1 | 8/2015 | Shabtay et al. |
| 2015/0253532 A1 | 9/2015 | Lin |
| 2015/0253543 A1 | 9/2015 | Mercado |
| 2015/0253647 A1 | 9/2015 | Mercado |
| 2015/0373252 A1 | 12/2015 | Georgiev |
| 2015/0373263 A1 | 12/2015 | Georgiev et al. |
| 2016/0044250 A1 | 2/2016 | Shabtay et al. |
| 2016/0062084 A1 | 3/2016 | Chen et al. |
| 2016/0070088 A1 | 3/2016 | Koguchi |
| 2016/0085089 A1 | 3/2016 | Mercado |
| 2016/0105616 A1 | 4/2016 | Shabtay et al. |
| 2016/0187631 A1 | 6/2016 | Choi et al. |
| 2016/0202455 A1 | 7/2016 | Aschwanden et al. |
| 2016/0212333 A1 | 7/2016 | Liege et al. |
| 2016/0291295 A1 | 10/2016 | Shabtay et al. |
| 2016/0306161 A1 | 10/2016 | Harada et al. |
| 2016/0313537 A1 | 10/2016 | Mercado |
| 2016/0341931 A1 | 11/2016 | Liu et al. |
| 2016/0353008 A1 | 12/2016 | Osborne |
| 2017/0094187 A1 | 3/2017 | Sharma et al. |
| 2017/0102522 A1 | 4/2017 | Jo |
| 2017/0115471 A1 | 4/2017 | Shinohara |
| 2017/0160511 A1 | 6/2017 | Kim et al. |
| 2017/0199360 A1 | 7/2017 | Chang |
| 2018/0059365 A1 | 3/2018 | Bone et al. |
| 2018/0217475 A1 | 8/2018 | Goldenberg et al. |
| 2018/0224630 A1 | 8/2018 | Lee et al. |
| 2019/0086638 A1 | 3/2019 | Lee |
| 2019/0107651 A1 | 4/2019 | Sade |
| 2019/0170965 A1 | 6/2019 | Shabtay et al. |
| 2020/0084358 A1 | 3/2020 | Nadamoto |
| 2020/0221026 A1 | 7/2020 | Fridman et al. |
| 2021/0364746 A1 | 11/2021 | Chen |
| 2021/0396974 A1 | 12/2021 | Kuo |

FOREIGN PATENT DOCUMENTS

| | | |
|---|---|---|
| CN | 102466867 A | 5/2012 |
| CN | 102147519 B | 1/2013 |
| CN | 104297906 A | 1/2015 |
| CN | 105467563 A | 4/2016 |
| CN | 106680974 A | 5/2017 |
| JP | S54157620 A | 12/1979 |
| JP | S59121015 A | 7/1984 |
| JP | 6165212 A | 4/1986 |
| JP | S6370211 A | 3/1988 |
| JP | 406059195 A | 3/1994 |
| JP | H11223771 A | 8/1999 |
| JP | 2004334185 A | 11/2004 |
| JP | 2006195139 A | 7/2006 |
| JP | 2007133096 A | 5/2007 |
| JP | 2007219199 A | 8/2007 |
| JP | 2007306282 A | 11/2007 |
| JP | 2008111876 A | 5/2008 |
| JP | 2008191423 A | 8/2008 |
| JP | 2010164841 A | 7/2010 |
| JP | 2012203234 A | 10/2012 |
| JP | 2013105049 A | 5/2013 |
| JP | 2013106289 A | 5/2013 |
| JP | 2014142542 A | 8/2014 |
| JP | 2018059969 A | 4/2018 |
| KR | 20090131805 A | 12/2009 |
| KR | 20140135909 A | 5/2013 |
| KR | 20140023552 A | 2/2014 |
| KR | 20160000759 A | 1/2016 |
| TW | M602642 U | 10/2020 |
| WO | 2013058111 A1 | 4/2013 |
| WO | 2013063097 A1 | 5/2013 |
| WO | 2018130898 A1 | 7/2018 |

OTHER PUBLICATIONS

A compact and cost effective design for cell phone zoom lens, Chang et al., Sep. 2007, 8 pages.

Consumer Electronic Optics: How small a lens can be? The case of panomorph lenses, Thibault et al., Sep. 2014, 7 pages.

Optical design of camera optics for mobile phones, Steinich et al., 2012, pp. 51-58 (8 pages).

The Optics of Miniature Digital Camera Modules, Bareau et al., 2006, 11 pages.

Modeling and measuring liquid crystal tunable lenses, Peter P. Clark, 2014, 7 pages.

Mobile Platform Optical Design, Peter P. Clark, 2014, 7 pages.

Boye et al., "Ultrathin Optics for Low-Profile Innocuous Imager", Sandia Report, 2009, pp. 56-56.

"Cheat sheet: how to understand f-stops", Internet article, Digital Camera World, 2017.

\* cited by examiner

Known art

POP-OUT ZOOM CAMERA

CROSS REFERENCE TO EXISTING APPLICATIONS

This is a 371 application from international patent application PCT/IB2021/057311 filed Aug. 9, 2021, which claims priority from U.S. Provisional Patent Applications No. 63/080,047 filed Sep. 18, 2020 and 63/173,446 filed Apr. 11, 2021, which are incorporated herein by reference in their entirety.

FIELD

The presently disclosed subject matter is generally related to the field of digital cameras, and in particular to zoom compact multi-aperture cameras.

BACKGROUND

Compact multi-cameras and their incorporation in hand-held electronic devices (also referred to herein as "devices") such as tablets and mobile phones (the latter referred to hereinafter generically as "smartphones") are known. These cameras provide advanced imaging capabilities such as zoom, see e.g. co-owned PCT patent application No. PCT/IB2063/060356. A typical triple-camera system exemplarily includes an ultra-wide-angle (or "Ultra-Wide" or "UW") camera, wide-angle (or "Wide" or "W") camera and a telephoto (or "Tele" or "T") camera, wherein their fields of view (FOVs) fulfill $FOV_{UW} > FOV_W > FOV_T$.

First smartphone models that provide Macro-photography capabilities by enabling very close focusing with a UW camera, which has a relatively short focal length (e.g. 2.5 mm), have entered the consumer market. Drawbacks of UW Macro cameras include a need for small object-lens distances ("u"), and small object-to-image magnifications ("M"). For example, when a 2.5 mm UW lens is focused to an object at 5 cm (lens-object distance), the UW camera will have object-to-image a M of about 19:1.

Challenges with zoom cameras relates to camera height or length (correlated e.g. with a total track length or "TTL"), to the effective focal length (EFL) and to the size of the image sensor of camera ("Sensor Diagonal" or "SD"). FIG. 1A illustrates schematically the definition of various entities such as TTL, EFL and back focal length ("BFL"). TTL is defined as the maximal distance between the object-side surface of a first lens element facing the object and a camera image sensor plane. BFL is defined as the minimal distance between the image-side surface of a last lens element facing the image sensor and a camera image sensor plane.

FIG. 1B shows an exemplary camera system having a lens with a FOV, an EFL, and an image sensor with a sensor width W and height H. SD connects to a sensor width W and a height H via $SD = \sqrt{(W^2 + H^2)}$. For fixed width/height ratios of a (normally rectangular) image sensor, the sensor diagonal is proportional to the sensor width and height. The diagonal field of view (FOV) relates to EFL and SD as follows:

$$\tan\left(\frac{FOV}{2}\right) = \frac{SD/2}{EFL} \quad \text{(Eq. 1)}$$

This shows that a camera with a larger SD but same FOV requires a larger EFL.

A Tele camera enables optical zoom. The TTL of a Tele lens is smaller than its EFL, typically satisfying 0.7<TTL/EFL<1.0. Typical Tele EFL values in vertical Tele cameras range from 6 mm to 10 mm (without applying 35 mm equivalence conversion). In folded Tele cameras, they range and from 10 mm to 40 mm. Larger EFL is desirable for enhancing the optical zoom effect, but this results in larger TTL, which is undesirable.

In a continuous attempt to improve the obtained image quality, there is a need to incorporate larger image sensors into Tele cameras. Larger sensors allow for improved low-light performance and larger number of pixels, hence improving spatial resolution as well. Other image quality characteristics, such as noise characteristics, dynamic range and color fidelity may also improve as the sensor size increases. In most Tele cameras, the SD of the sensor pixel array ranges from about 4.5 mm (typically referred to as 1/4" sensor) to 7 mm (typically referred to 1/2.5" sensor).

It would be beneficial to have a Tele camera design which both supports large EFL for
- large optical zoom effect;
- incorporation of large sensors (e.g. SD>10 mm or 1/1.7" sensor);
- large M (e.g. 2:1-10:1) at lens-object distances of 5-15 cm, while still having small TTL for slim design. This can be achieved by a "pop-out camera", i.e. a camera having two or more lens states. In a first ("pop-out") lens state the camera is operative and has a large height $H_O$. A second lens state is a collapsed lens state where the camera is not operative and has a height $H_{N-O} < H_O$. Such design is presented for example in co-owned international patent application No. PCT/IB2020/058697.

Modern multi-cameras usually further include optical image stabilization (OIS). OIS is required to mitigate undesired camera host device motion ("hand motion" or "handshake"). For OIS, the lens or the image sensor or the entire camera can be linearly moved in two directions that are perpendicular to the camera's optical axis (see FIG. 14A).

Undesired host device motions shift the camera in 6 degrees of freedom, namely linear movements in X-Y-Z (coordinates given with reference to the coordinate system shown in FIG. 6A), roll ("tilt about" or "tilt around") the Y axis, yaw (tilt around the Y axis) and pitch (tilt around the X axis), wherein mainly yaw and pitch are accountable for significant image deterioration. As undesired linear motion in X-Y-Z affects the image quality only negligibly for lens-object distances of 1 m or more, most known premium smartphones include OIS that corrects for yaw and pitch only. In contrast, for Macro photography with a Tele camera allowing for large M of 10:1 or larger, undesired linear motion in X-Y may significantly affect the image quality. It would thus be beneficial to have an OIS mechanism that corrects for undesired linear motion during Macro capture.

SUMMARY

In various embodiments, there are provided cameras, comprising: a lens comprising N lens elements $L_1$-$L_N$ arranged along a lens optical axis starting with $L_1$ on an object side and ending with $L_N$ on an image side, wherein N is ≥5, wherein the lens elements are divided into two or more lens groups and wherein two adjacent lens groups are separated by a respective air-gap $d_1$ along the lens optical axis; an image sensor separated from lens element $L_N$ by an air-gap $d_2$ along the lens optical axis, image sensor having a sensor diagonal SD between 7 and 20 mm; and an actuator for controlling air-gaps $d_1$ and $d_2$ to switch the camera between M≥1 operative pop-out states and a collapsed state and to focus the camera on an object at an object-lens distance of less than 30 cm, wherein in each operative pop-out state m∈{1, 2, . . . M} the lens has a respective effective focal length $EFL_m$ and a total track length $TTL_m$, wherein in the collapsed state the lens has a total track length c-TTL, wherein a minimal EFL in the set of m EFLs is equal to or greater than 7 mm, wherein c-TTL<0.7EFL.

In some embodiments, M=2 or 3 or 4.

In some embodiments, the operative state is continuous such that the EFL changes continuously from $EFL_1$ to $EFL_M$.

In some embodiments, for a minimal EFL in the set of m EFLs, c-TTL<0.65EFL.

In some embodiments, a camera can focus the lens to an object at a distance of less than 25 cm.

In some embodiments, a camera can focus the lens to an object at a distance of less than 15 cm.

In some embodiments, the actuator comprises a spring.

In some embodiments, $d_1$ is larger than $TTL_M/6$.

In some embodiments, $d_1$ is larger than $TTL_M/5$.

In various embodiments, there are provided camera systems comprising a camera as above or below (referred to now as "first camera") together with a second camera comprising a second lens system having at least one air-gap, wherein in the collapsed state the second lens has a total track length c-TTL$_2$, wherein the actuator is operative to control the at least one air-gap of the second camera for simultaneously switching the first camera and the second camera between M≥1 operative pop-out states and a collapsed state. In some embodiments, cTTL$_2$=cTTL±10%. The cameras or a camera system as above or below may be incorporated in a handheld electronic device. The handheld electronic device may have a device exterior surface, wherein in an operative state any of the cameras extends beyond the device exterior surface by 2 mm-10 mm and in a non-operative state any of the cameras of any of the claims 1-11 and 13 extends beyond the device exterior surface by less than 2 mm.

In various embodiments, there are provided handheld electronic devices, comprising: a Tele camera having a camera optical axis and comprising an image sensor and a lens having a lens axis substantially parallel to the camera optical axis, the Tele camera having an EFL≥9 mm; a motion sensor for sensing an undesired linear motion of the handheld electronic device; a depth estimator for estimating the distance between the Tele camera and an object; and an actuator for moving the Tele camera or a component of the Tele camera to compensate for the handheld electronic device's undesired linear motion, wherein the compensation depends on the handheld electronic device's undesired linear motion and on the distance between the Tele camera and an object, wherein the distance between the Tele camera and the object is smaller than 50 cm.

In some embodiments, a handheld device further comprises an Ultra-Wide camera having a field of view $FOV_{UW}$ larger than a field of view $FOV_T$ of the Tele camera.

In some embodiments, a handheld device further comprises a Wide camera having a field of view $FOV_W$ larger than a field of view $FOV_T$ of the Tele camera.

In some embodiments, the estimating the distance between the Tele camera and an object is based on Phase detection auto focus (PDAF).

In some embodiments, the estimating the distance between the Tele camera and an object is based on the Wide camera and the Tele camera or based on the Ultra-Wide camera and the Tele camera.

In some embodiments, the sensing the linear motion includes measuring the linear motion in one or more directions.

In some embodiments, the sensing the linear motion includes measuring the linear motion in two or more directions.

In some embodiments, the moving component is the lens. An amount of lens movement $d_{Lens}$ is calculated as $$d_{Lens} = d_0 \frac{EFL}{u},$$

wherein $d_0$ is an undesired linear motion of device, EFL is the effective focal length and u is an object-lens distance.

In some embodiments, the moving component is the image sensor. An amount of image sensor movement $d_{Sensor}$ is calculated as $$d_{sensor} = d_0 \frac{EFL}{u - EFL}$$

wherein $d_0$ is an undesired linear motion of device and u is an object-lens distance.

In some embodiments, the motion sensor includes an inertial measurement unit (IMU).

BRIEF DESCRIPTION OF THE DRAWINGS

Non-limiting embodiments of the presently disclosed subject matter are described below with reference to figures attached hereto that are listed following this paragraph. Identical structures, elements or parts that appear in more than one figure may be labeled with the same numeral in the figures in which they appear. The drawings and descriptions are meant to illuminate and clarify embodiments disclosed herein, and should not be considered limiting in any way.

DETAILED DESCRIPTION

Figure 1A:
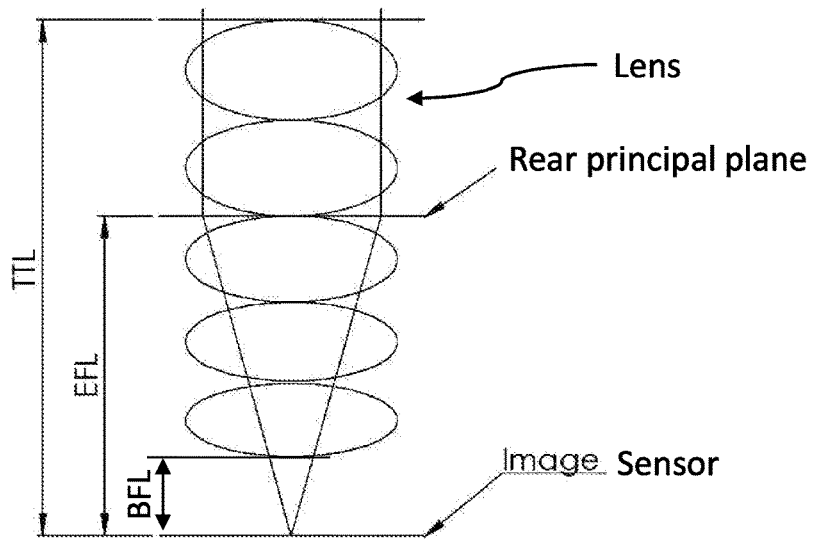
FIG. 1A illustrates schematically the definition of various entities in a camera.
Figure 1B:
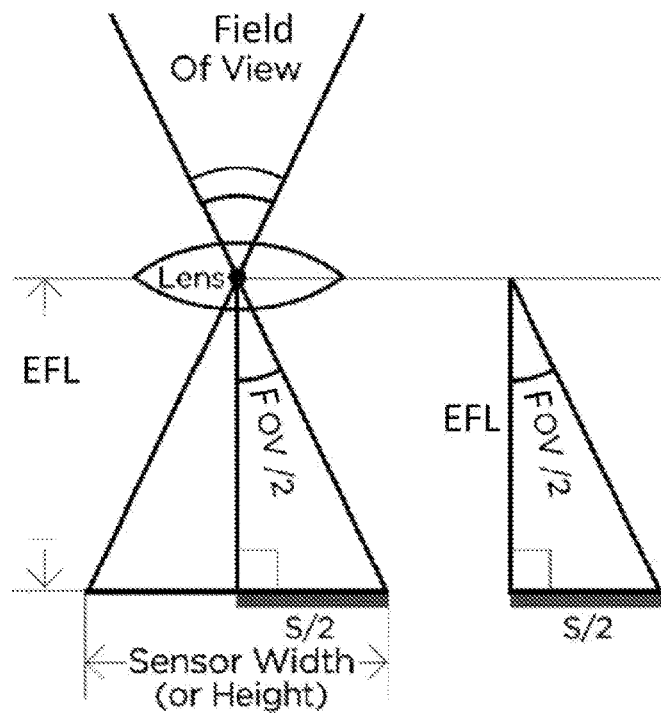
FIG. 1B illustrates schematically an exemplary camera system having a lens with a FOV, an EFL and an image sensor with a sensor width W.
Figure 1C:
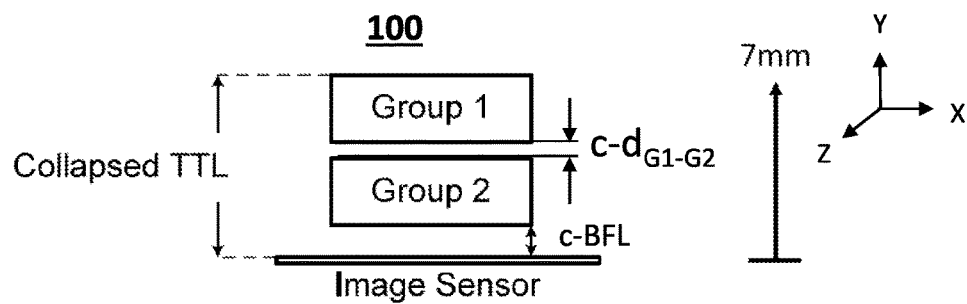
FIG. 1C shows schematically in cross-section an exemplary Tele camera lens system disclosed herein in a collapsed, non-operative state.
Figure 1D:
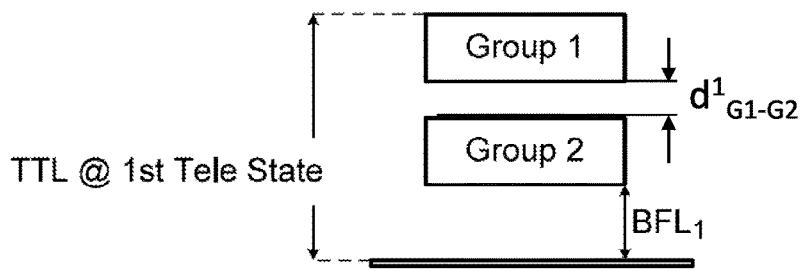
FIG. 1D shows the camera of FIG. 1C in a first operative Tele lens state.
Figure 1E:
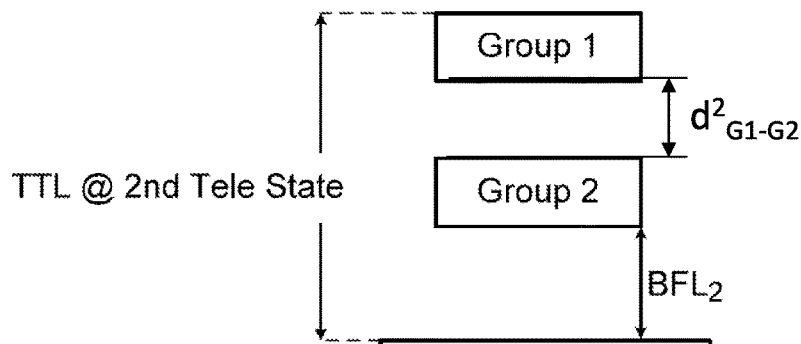
FIG. 1E shows the camera of FIG. 1C in a second operative Tele lens state.
Figure 1F:
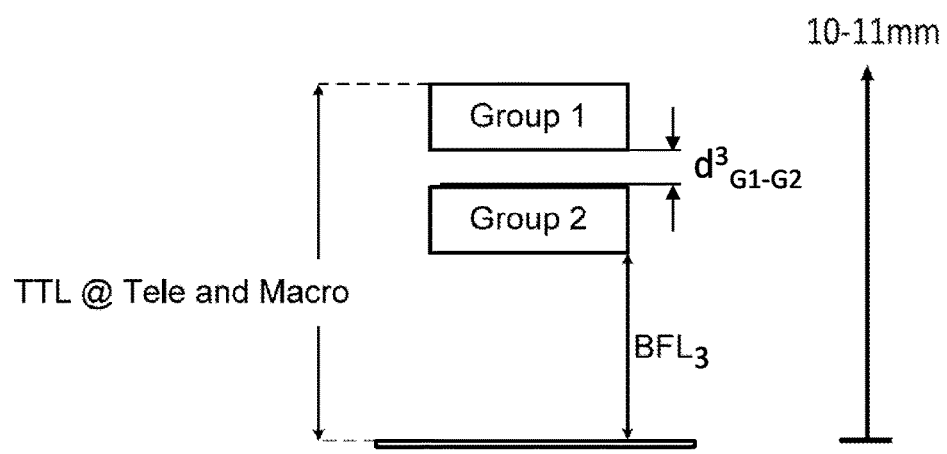
FIG. 1F shows the camera of FIG. 1C in an operative Macro lens state.

FIGS. 1C-F show schematically an embodiment of a Tele camera lens system (or simply "lens system") numbered 100 disclosed herein in a cross-sectional view. FIG. 1C shows lens system 100 in a collapsed, non-operative state. FIG. 1D shows lens system 100 in a first operative Tele lens state (or "Tele state"). FIG. 1E shows lens system 100 in a second operative Tele lens state. FIG. 1F shows lens system 100 in an operative Macro lens state (or "Macro state"). Lens system 100 comprises a lens (with lens elements), an optional optical window, and an image sensor.

Lens system 100 may be included in a pop-out Tele camera such as camera 200, an optics module such as an optics module 240 (see FIG. 4A-B) or 500 (see FIG. 5A-B) wherein the optics module may be included in a pop-out mechanism such as pop-out mechanism 210 (see FIG. 2A-B, FIG. 3A-B and FIG. 4A-B) to form a pop-out camera. If not stated otherwise, a "Tele state" refers to a state in which the lens system that can focus to objects in the range from infinity to about 50 cm, while a "Macro state" refers to a state in which the lens system that can focus to objects in the range from about 50 cm to about 5 cm or less. Tele states enable Tele photography, while Macro states enable Macro photography.

Henceforth and for simplicity, the use of the term "pop-out" before various components may be skipped, with the understanding that if defined the first time as being a "pop-out" component, that component is such throughout this description.

Lens system 100 comprises two groups of lens elements, Group 1 (G1) and Group 2 (G2). G1 and G2 are movable along a common optical axis to occupy different positions that correspond to different Tele states. In some embodiments, two or three or four or five particular lens states may be supported, e.g. the four lens states shown in FIGS. 1C-E. A folded lens divided into several lens groups for realization of various lens states is described for example in PCT/IB2020/051405. FIGS. 1C-E show also the meaning of TTL, a first collapsed back focal length c-BFL, a BFL of the $1^{st}$ operative Tele state ("second" back focal length) $BFL_1$, a third back focal length $BFL_2$ and a fourth back focal length $BFL_3$.

The pop-out design allows for a slim lens when the camera is not in use. When the camera is in use ("activated"), the lens pops out of an exterior device surface into an operative state, acting as an optical system that produces a crisp image on an image sensor. Each lens group comprises lens elements that have fixed distances to each other, but an air gap $d_{G1-G2}$ between G1 and G2 may change between the different lens states. G1 and G2 can be moved relative to each other by an actuator such as actuator 212 see below.

The actuator may move G1 and G2 by e.g. 0.05-8.5 mm with respect to each other (e.g. for modifying an air-gap such as $d_{G1-G2}$) or it may move G1 and G2 together relative to the image sensor for switching from one lens state to another lens state, e.g. from a Tele state to a Macro state In some embodiments, the transition between different lens focus distances may be continuous, e.g. the pop-out camera may be capable of focusing from infinity to e.g. 5 cm continuously. In other embodiments, the transition may be discrete with ranges for continuous focusing. For example, in a Tele state, the pop-out camera may be capable of focusing continuously to object-lens distances ("u") from infinity to e.g. 1 m, and in a Macro state the pop-out camera may be capable of focusing continuously to u from e.g. 40 cm to 5 cm. The F number (f/#) may undergo only slight changes when transitioning between the different lens states, e.g. by less than 5%, or less than 10%, or less than 30% with respect to, respectively, a lens state at infinity, at 10 cm, or at 5 cm. In yet other embodiments, only two different lens states may be provided, e.g. one collapsed lens state and one Tele lens state. The Tele lens state may be switched to a Macro lens state by changing only the BFL, i.e. by moving all lens elements.

FIG. 1C shows lens system 100 in a collapsed state. Here, a collapsed TTL ("c-TTL") of the lens may be 4-13 mm, a collapsed BFL ("c-BFL") may be 0.15-4 mm and a collapsed air gap "c-$d_{G1-G2}$" may be 0.02-2.5 mm. In the collapsed state, the camera is not functional, i.e. the optics cannot project a scene as a crisp image onto the image sensor.

As an example ("SD-Example") for TTL and SD, in the following we apply Eq. 1 to a Tele camera with FOV=30 degrees. We assume EFL=TTL and that an image sensor may be in a 4:3 width/height format, so that sensor width W~0.8SD.

FIG. 1D shows lens system 100 in a first extended (or "operative" or "pop-out") state having a first zoom factor ZF1. The lens acts as a Tele lens. Here, a first extended state TTL ($TTL_1$) may be 5-13 mm, a first extended state BFL ($BFL_1$) may be 0.25-5 mm and a first extended air gap $d^1_{G1-G2}$ may be 0.15-3 mm. For SD-Example with a $TTL_1$=12 mm, SD=8.1 mm.

FIG. 1E shows lens system 100 in a second lens state having a second zoom factor ZF2>ZF1. The lens acts as a Tele lens. Here, $TTL_2$ may be 6-17 mm, $BFL_2$ may be 0.45-6 mm and $d^2_{G1-G2}$ may be 0.25-5 mm. For SD-Example with a $TTL_2$=14 mm, SD=9.5 mm.

FIG. 1F shows lens system 100 in a third lens state having a third zoom factor ZF3>ZF2. In this state, the lens acts as a Tele lens and a Macro lens. A magnification M for Macro photography at camera-object distances of <15 cm may be 15:1-2:1. $TTL_3$ may be 7-20 mm, the $BFL_3$ may be 0.5-8 mm and $d^3_{G1-G2}$ may be 0.35-8 mm. For SD-Example with a $TTL_3$=19 mm, SD=13 mm (corresponding to a 1/1.3" sensor).

For embodiments that support a continuous lens state change, there may be continuous transitions between the lens states shown in FIGS. 1C-F. In some embodiments, G1 may include the majority of optical power Φ of the entire lens and G2 may correct for Field curvature. The "majority of optical power" refers to more than a factor of 2 between the optical power of G1 and G2, i.e. $\Phi_{G1} > 2 \cdot \Phi_{G2}$, wherein Φ=1/EFL.

Figure 2A:
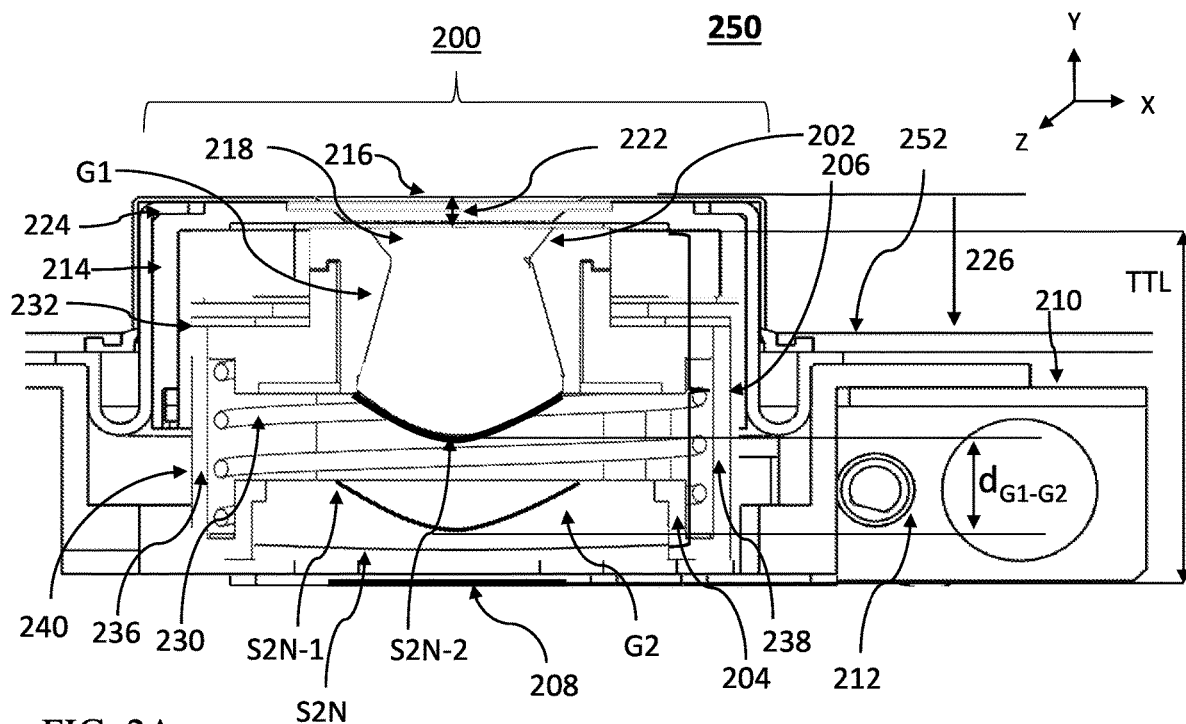
FIG. 2A shows a cross-sectional view of a of a pop-out Tele camera disclosed herein in an extended state and incorporated in a camera hosting handheld electronic device.

FIG. 2A shows in cross-sectional view an embodiment numbered 200 of a pop-out Tele camera disclosed herein in an extended state and incorporated in a device 250. Camera 200 comprises a pop-out optics module 240 that includes a pop-out lens 206. Camera 200 further comprises an image sensor 208 and a pop-out mechanism 210 that includes an actuator 212 and a window frame 214 carrying a window 216. The window covers an aperture 218 of pop-out Tele camera 200. Optics module 240 is covered by a cover 232.

An entrance pupil (or "aperture size") of camera 200 may be for example 4-9 mm. For comparison, a folded Tele camera usually has an entrance pupil smaller than 4.5 mm, while a dedicated Macro camera usually has an entrance pupil smaller than 1 mm. Assuming pop-out Tele camera 200 has an aperture size of 7 mm vs. a size of 4 mm for the folded Tele camera, camera 200 will receive about 3 times more light, corresponding to a better low light signal-to-noise ratio ("SNR"). In comparison with the dedicated Macro camera with a 1 mm aperture size, camera 200 will have a 6-fold larger EFL, and a ~40 times shallower Depth of Field (DOF), translating into a ~40 times stronger optical Bokeh effect.

The lens, image sensor and (optionally) an optical window or "filter" (not shown here but shown e.g. in lens systems 800, 850, 900, 1000, 1100, 1200, 1300, 1700, 1800, 1900, 2000, 2100) form a pop-out lens system 260. The camera may have a Tele $FOV_T$ of 15-50 deg.

The TTL of the lens in a pop-out Tele camera disclosed herein may be 5-35 mm. The image sensor may have a sensor diagonal SD in the range 3.5-25 mm and EFL of 6 mm to 45 mm.

Figure 2B:
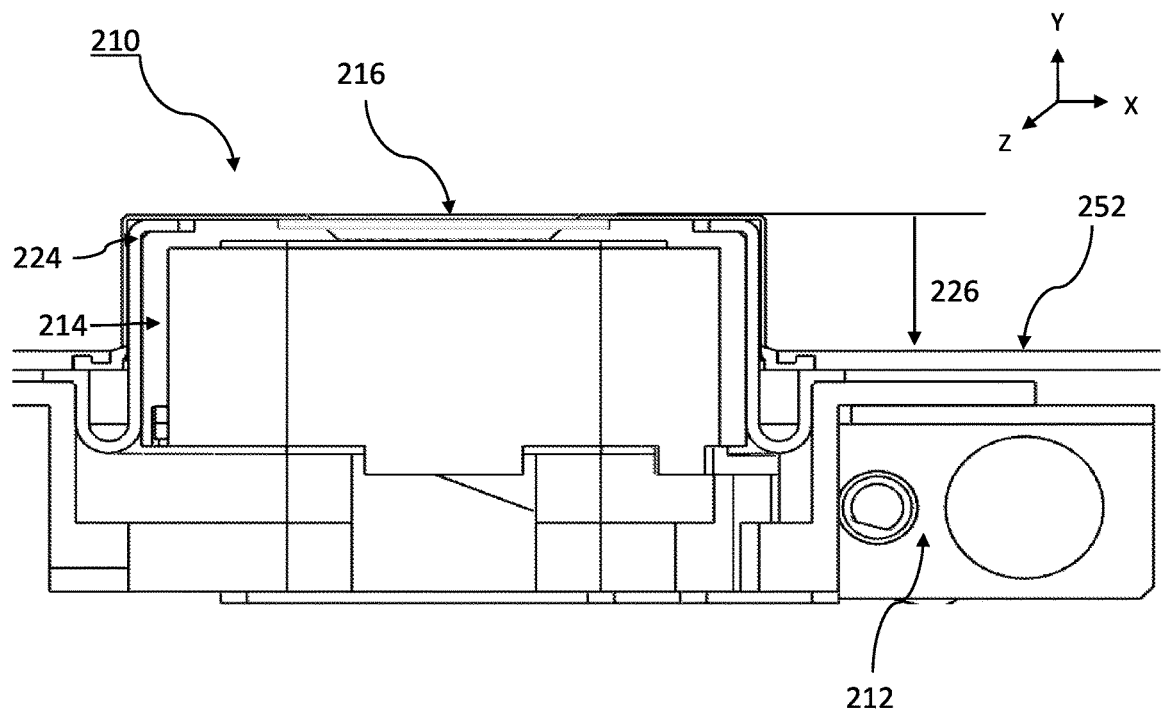
FIG. 2B shows a cross-sectional view of pop-out mechanism of the camera of FIG. 2A in a pop-out state.
Figure 3A:
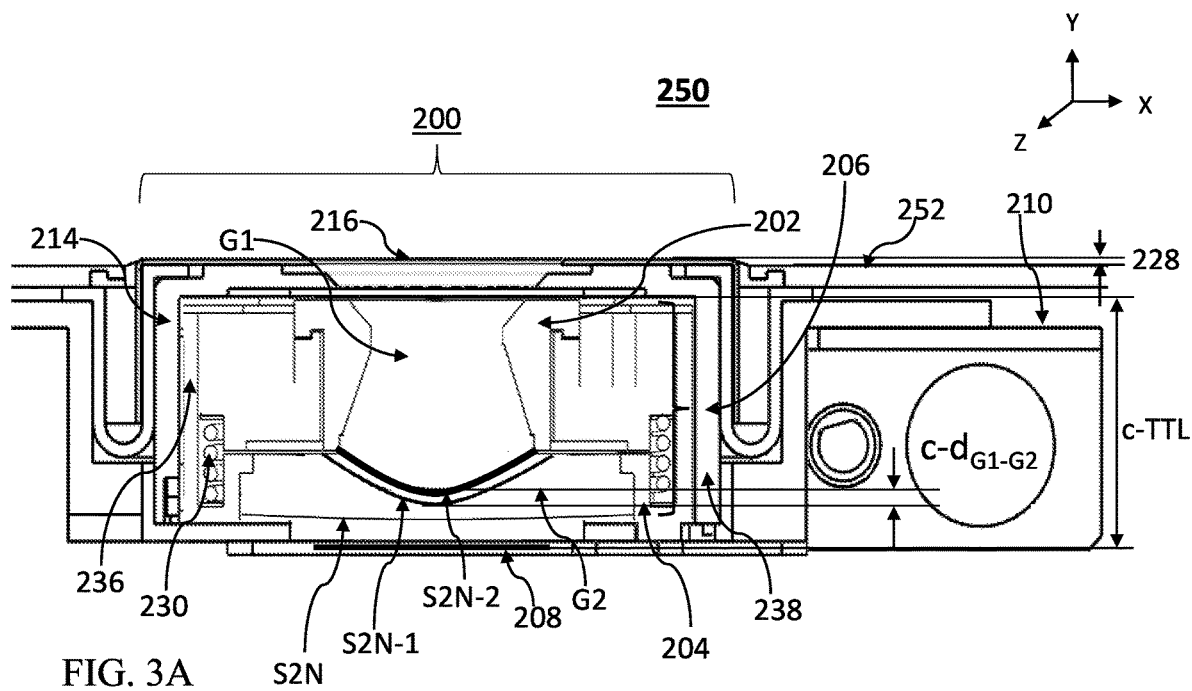
FIG. 3A shows the pop-out camera of FIG. 2A in a collapsed or non-operative state.
Figure 3B:
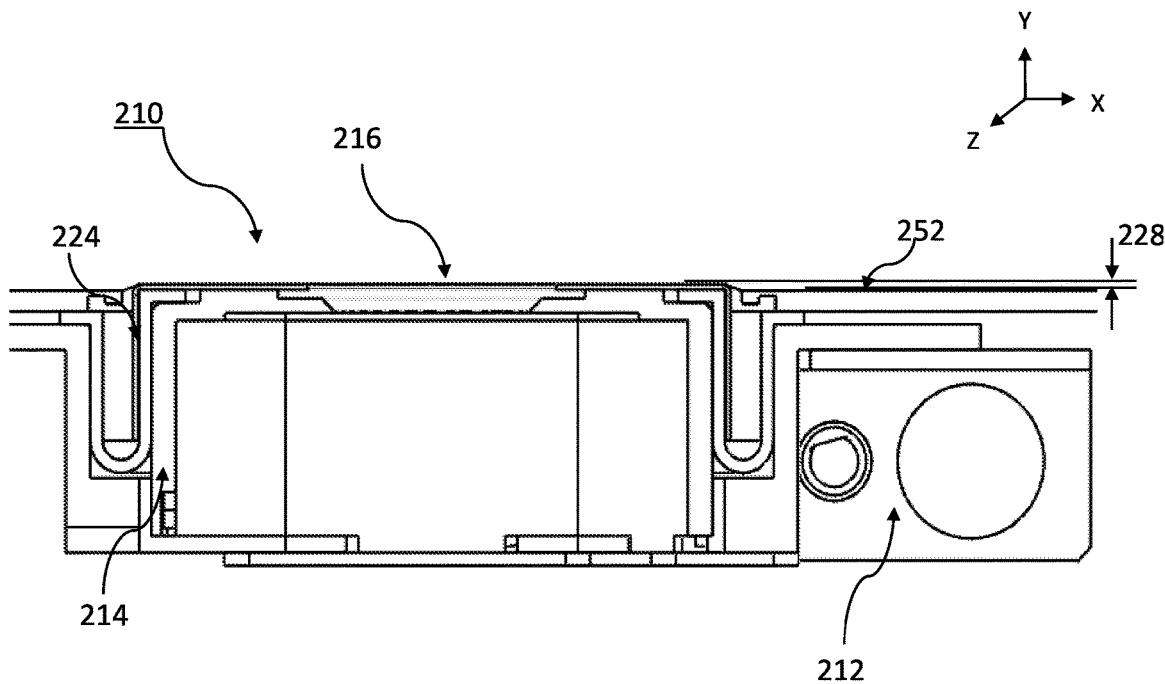
FIG. 3B shows the pop-out mechanism in the camera of FIG. 3A in the respective collapsed state.

FIG. 2B shows a cross-sectional view of an embodiment of pop-out mechanism 210 in a pop-out state. Pop-out mechanism 210 is essentially camera 200 without optics module 240. Camera 200 has also a collapsed ("c" or "non-operative") state, shown in FIGS. 3A-B. FIG. 3A shows a cross-sectional view of camera 200 in the collapsed state. FIG. 3B shows a cross-sectional view of pop-out mechanism 210 in the respective collapsed state. Camera 200 switches between a pop-out state and a collapsed state according to a first method, where the gap $d_{G1-G2}$ between G1 and G2 collapses. The BFL does not change. Lens system 800 switches according to the first method.

Pop-out optics module 240 and window frame 214 form an air-gap (or simply "gap") 222 between lens 206 and window 216, which gap may be for example 0.15-1.2 mm. Air-gap 222 allows for a combined movement of about 0.1-1.1 mm of a first lens barrel section 202 and a second lens barrel section 204 by for performing auto-focus (AF) and OIS by moving the lens. First lens barrel section 202 includes G1. Second lens barrel section 204 includes G2. In other embodiments, air-gap 222 may be significantly larger, e.g. 6 mm. A module seal 224 prevents particles and fluids from entering the camera.

Camera 200 exceeds an exterior surface 252 of host device 250 by a significant pop-out bump height $H_{P-O-B}$ 226. "Significant" may be for example 1.0 mm-15.0 mm. In the extended state, camera 200 increases the height of host device 250 to a "height in a pop-out state" $H_{P-O}$ (not shown). $H_{P-O}$ is given by adding $H_{P-O-B}$ 226 to a device height $H_0$ that does not include the bump, see e.g. $H_0$ 606, $H_{P-O}=H_0+H_{P-O-B}$. In FIG. 2A, a single spring 230 pushes first lens barrel section 202 towards window frame 214. In other embodiments, the single spring may be replaced by a plurality of springs. In the pop-out state, the spring is in an extended state (characterized by an increased gap between G1 and G2), see also FIG. 4A. A guiding pin 236 and a guiding pin 238 guide movements of first lens barrel section 202.

In general, lens 206 includes N≥5 lens elements. In some embodiments, there may be more than two lens barrel sections with one lens groups each. For example, there may be 3, 4, lens barrel sections, with each lens barrel section carrying a lens group. Examples of lens systems with two lens groups are lens systems 206-1, 206-2, 206-3, 206-4, 206-6, 206-7, 206-8, 206-9, 206-10 and 206-11 shown in FIGS. 8-13 and FIGS. 17-20. Examples with lens systems with three lens groups are lens systems 206-5 and 206-12 shown in FIG. 12B and in FIG. 21A-B respectively. The lens barrel sections may be divided into fixed lens barrel sections and movable lens barrel sections. In lens 206, G1 may include lens elements L1-LN-1 and G2 includes lens element LN. Air-gaps of changing thickness d may be formed between lens groups according to their relative movement. In examples with more than two lens barrel sections, some or all lens barrel sections may be movable and have respective air-gaps formed between the lens groups. In some examples, all air-gaps between lens groups may collapse in a non-operative camera state. In other examples, only some but not all of the air-gaps between lens groups may collapse in a non-operative state. The total length of such air-gaps may be 1-9.5 mm.

Lens groups may be determined by the largest air-gaps between consecutive lens elements. For example, the largest air-gap present between two consecutive lens elements may be used to divide a lens into two lens groups, the largest air-gap and the second largest air-gap present between two consecutive lens elements may be used to define three lens groups, etc. In some examples, collapsible air-gaps are formed between two consecutive lens elements. In other examples, the collapsible air-gaps are formed between a lens element and another optical component, e.g. between a lens element and an optical filter, or between a lens element and an image sensor (i.e. the air-gap is the BFL).

For examples that support two or three or four particular lens states, there may be two or three or four particular values for air-gaps. For other embodiments that support a continuous change of lens states, values for air-gaps may change continuously.

In the extended state and with reference to FIG. 2A, air-gap $d_{G1-G2}$ may be 1-9 mm. Guiding pins 236 and 238 may guide the movement of first barrel section 202 and G1 in the X-Z plane for providing mechanical stability and repeatability in X-Z plane.

In some embodiments, a guiding and positioning mechanism such as described in PCT/IB2020/058697 may be based on a kinematic coupling mechanism.

An optical system such as camera 200 may be designed to support, e.g. by means of a guiding and positioning mechanism based on kinematic coupling mechanism, in some examples, accuracy tolerances for decenter of e.g. ±20 μm in the X-Z plane and of e.g. ±10 μm in the Y direction, as well as for a tilt of 0.5°. Repeatability tolerances for decenter may be e.g. ±10 μm in the X-Z plane and of e.g. ±5 μm in the Y direction, as well as for a tilt of 0.25°. In other examples, accuracy tolerances for decenter may be e.g. ±10 μm in the X-Z plane and of e.g. ±5 μm in the Y direction, as well as e.g. +0.15°. Repeatability tolerances for decenter may be e.g. ±5 μm in the X-Z plane and of e.g. ±2.5 μm in the Y direction, as well as for a tilt of ±0.08°. In yet other examples, accuracy tolerances for decenter may be e.g. ±5 μm in the X-Z plane and of e.g. ±2.5 μm in the Y direction, as well as e.g. ±0.1°. Repeatability tolerances for decenter may be e.g. ±1.5 μm in the X-Z plane and of e.g. ±0.8 μm in the Y direction, as well as for a tilt of 0.05°.

"Accuracy tolerances" refer here to a maximum variation of the distances between optical elements and between mechanical elements. "Repeatability tolerances" refer here to a maximum variation of the distances between optical elements and between mechanical elements in different pop-out cycles, i.e. the capability of the mechanical and optical elements to return to their prior positions after one or many pop-out (or collapse) events. Tolerances in the Y direction may be less important, as variations in Y can be compensated by optical feedback and moving the lens for auto-focus.

FIG. 3A shows pop-out camera 200 in a collapsed or non-operative state. To switch optics module 240 to the collapsed state, actuator 212 decreases air-gap $d_{G1-G2}$ by moving window frame 214 to apply pressure to first (and here collapsible) lens barrel section 202 that translates into a movement of the collapsible lens barrel section towards the image sensor. The TTL of the camera is now a collapsed TTL (c-TTL) and may be 4.5-12 mm. A "collapsed air-gap" c-$d_{G1-G2}$ may be 0.05-2.5 mm. Examples of lens systems for a pop-out camera with a collapsible air gap $d_{G1-G2}$ and a non-collapsible BFL include lens systems 800, 1200 and 1300.

In FIG. 3A, camera 200 forms a collapsed bump (c-bump) height $H_{C-B}$ 228 with respect to device exterior surface 252. $H_{C-B}$ may be 0-3 mm. In the collapsed state, the camera increases the height of host device 250 to a "height in the collapsed state" $H_C = H_0 + H_{C-B}$.

A plurality of lens states such as shown in FIGS. 1C-F may be achieved by modifying air-gaps such as e.g. $d_{G1-G2}$. In other examples, a pop-out mechanism may have more than 2 lens states, e.g. 3 states or 4 states. The 3 lens states may include one collapsed state and two pop-out (operative) states having 2 different or identical pop-out bump heights. The 4 lens states may include one collapsed state and three pop-out (operative) states having 3 different or identical pop-out bump heights.

Figure 4A:
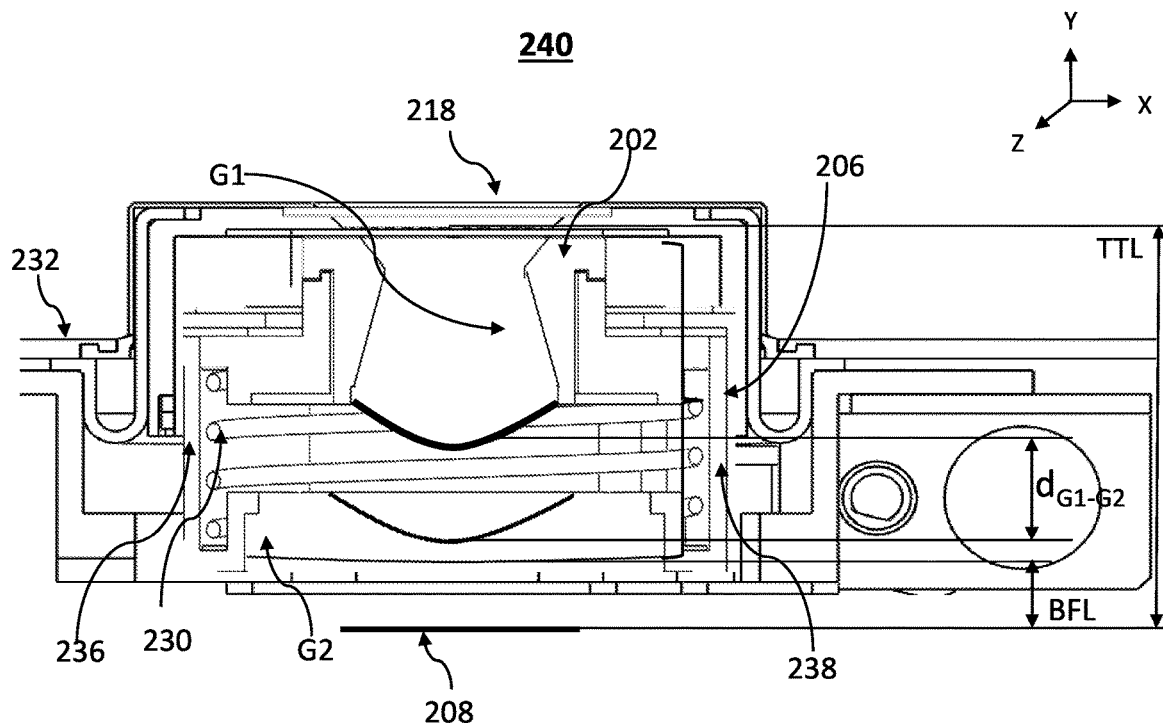
FIG. 4A shows in cross-sectional view an optics module in a pop-out state.
Figure 4B:
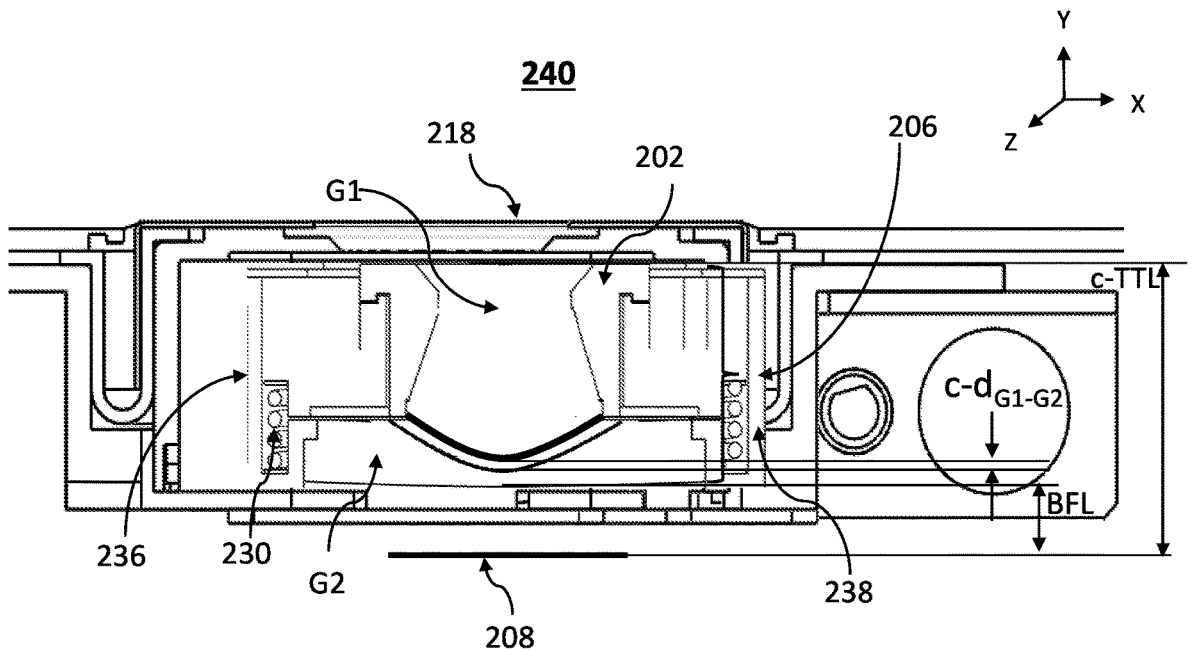
FIG. 4B shows the optics module of FIG. 4A in a collapsed state with a collapsed c-TTL.
Figure 4C:
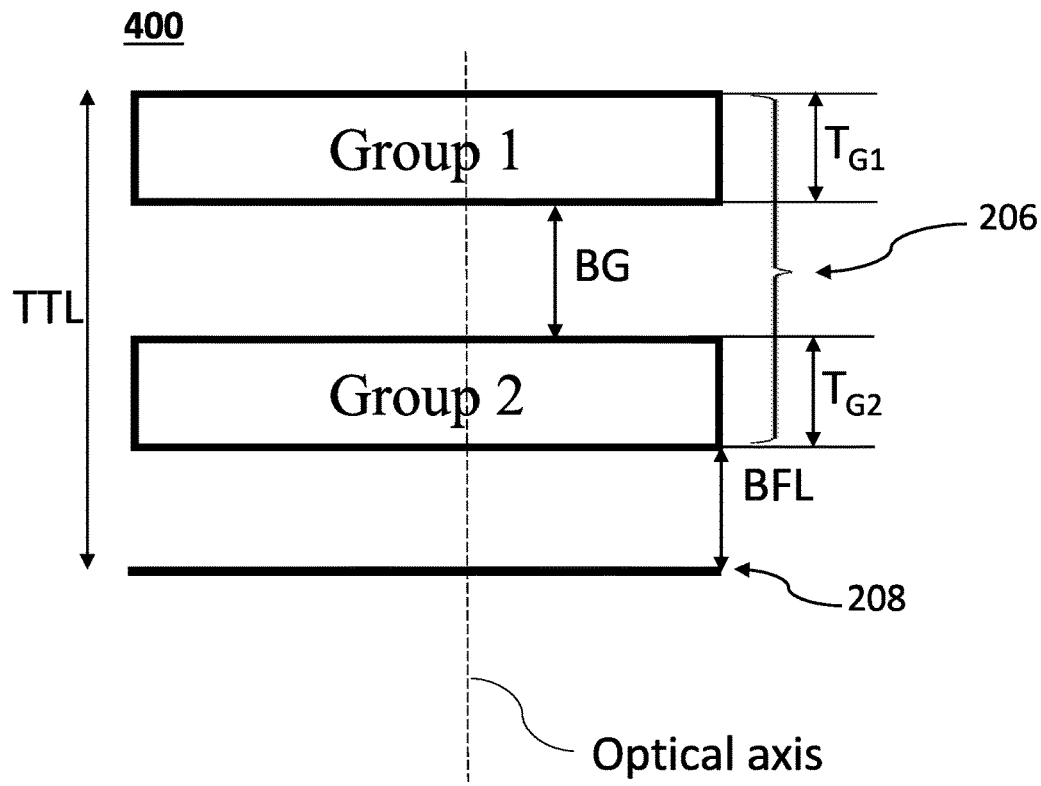
FIG. 4C shows schematically in cross-sectional view a lens system in a pop-out state.
Figure 4D:
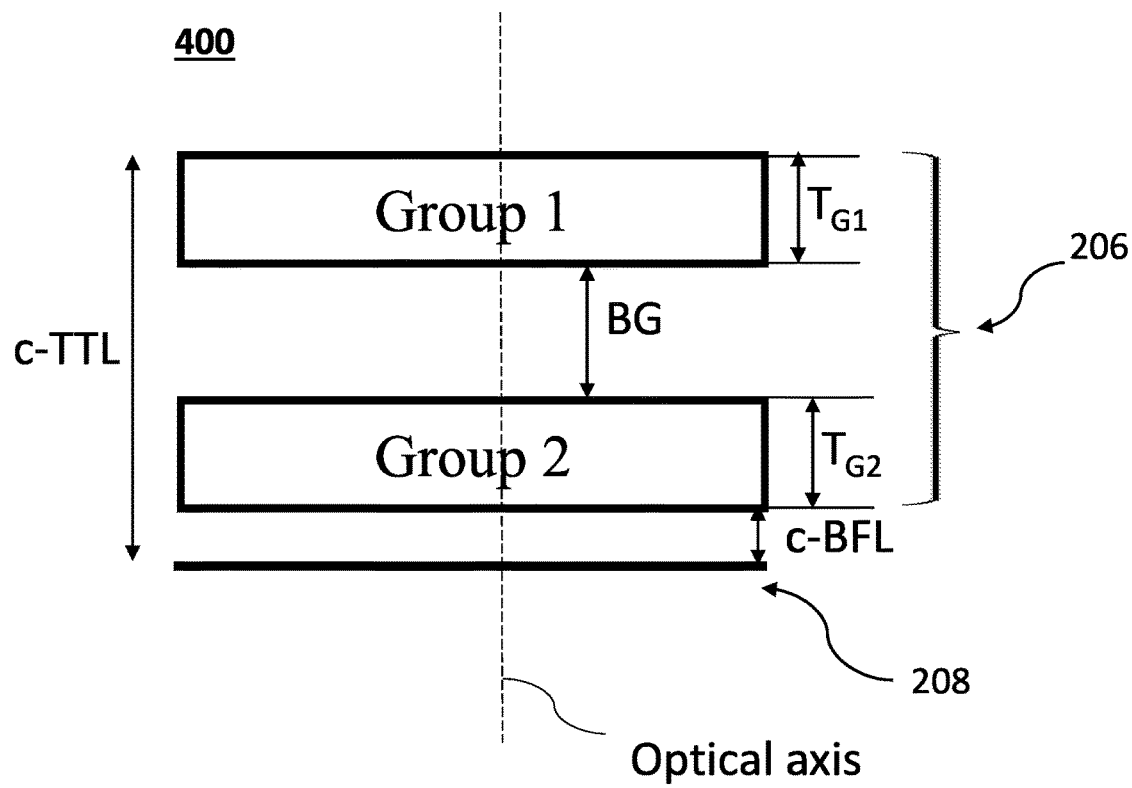
FIG. 4D shows schematically in cross-sectional view the lens system of FIG. 4C in a first collapsed state.

FIG. 4A shows in cross-sectional view optics module 240 in a pop-out state. FIG. 4B shows in cross-sectional view optics module 240 in a collapsed state with a collapsed c-TTL. The BFL does not change when switching from the pop-out to the collapsed state. Camera 240 switches between a pop-out state and a collapsed state according to the first method. FIG. 4C shows schematically in cross-sectional view a lens system 400 in a pop-out state. System 200 comprises a pop-out lens 206 and an image sensor 208. Lens 206 includes two lens groups (G1 and G2 respectively) separated by a big gap (BG). The thickness (along an optical axis of the lens) of G1 and G2 is indicated by $T_{G1}$ and $T_{G2}$ respectively. FIG. 4D shows schematically in cross-sectional view lens system 400 in a first collapsed state. Camera 400 switches between a pop-out state and a collapsed state according to a second method, where the BFL collapses to a c-BFL, but the gap between G1 and G2 does not change. Lens systems 850, 900, 1000, 1700 and 1800 switch between a pop-out state and a collapsed state according to the second method.

Figure 5A:
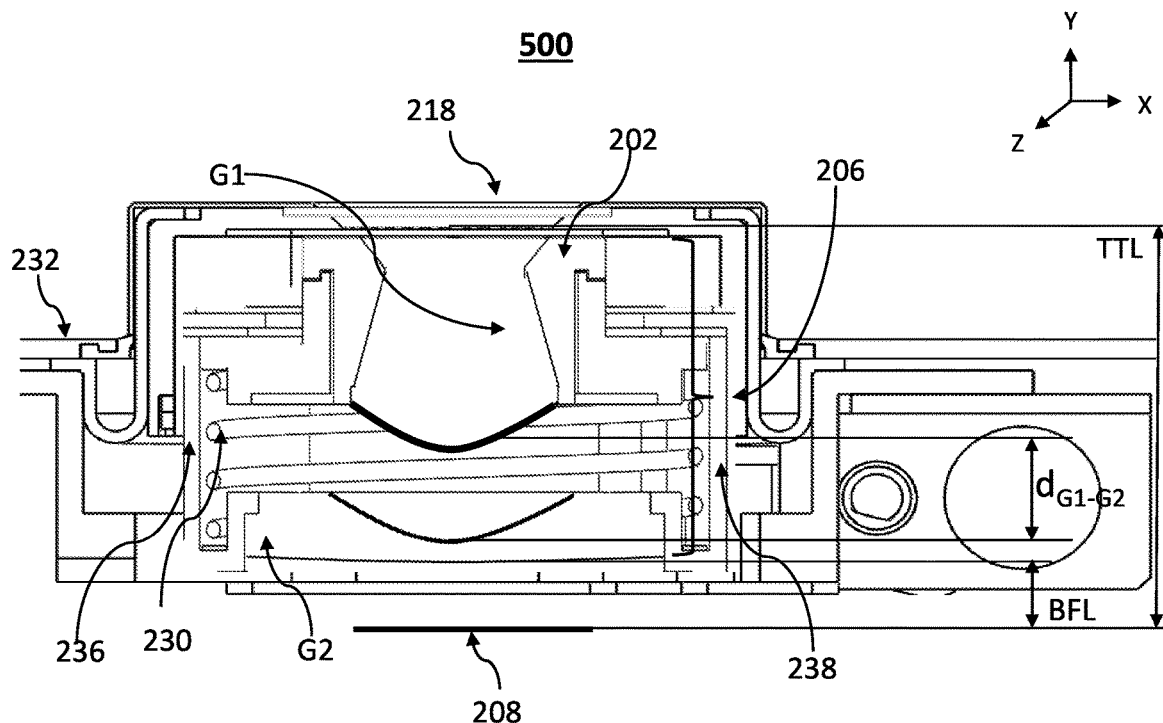
FIG. 5A shows in cross-sectional another optics module in a pop-out state.
Figure 5B:
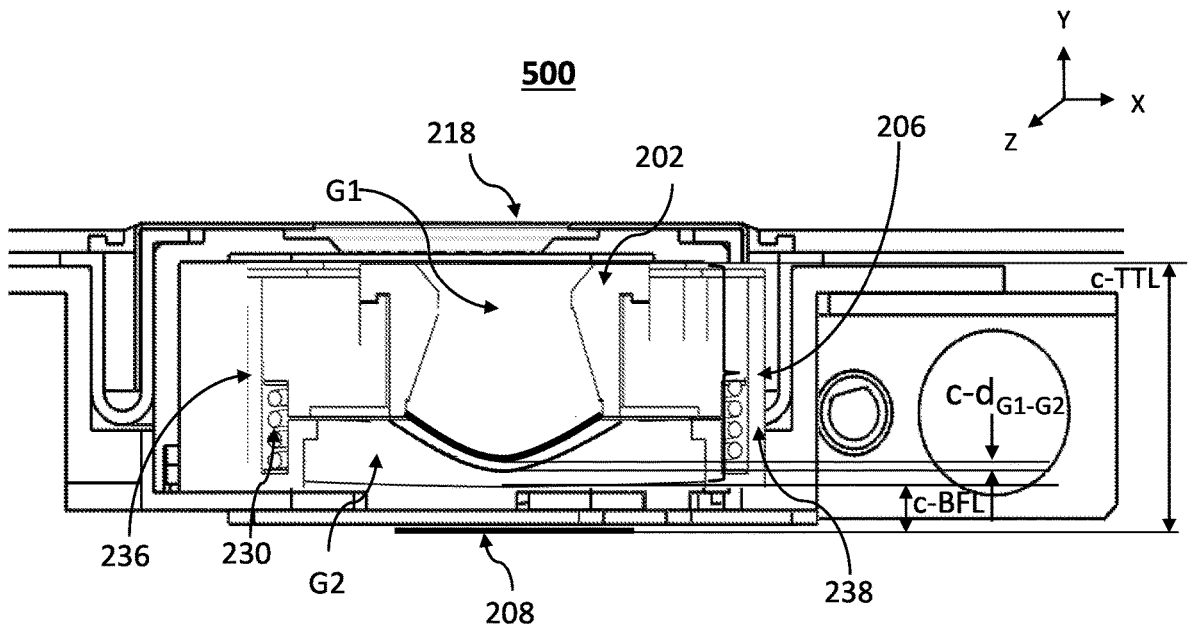
FIG. 5B shows the optics module of FIG. 5A in a collapsed state.

FIG. 5A shows in cross-sectional view optics module 500 in a pop-out state. FIG. 5B shows in cross-sectional view optics module 500 in a collapsed state. To form a pop-out camera, optics module 500 may be integrated into a pop-out mechanism such as 210 (not shown here) having a window 216 covering an aperture 518. In the collapsed state, c-$d_{G1-G2}$ may be 0.05-1.5 mm and c-BFL may be 0.05-2.5 mm. Here, the BFL does change when switching from the pop-out to the collapsed state. The difference between c-TTL and TTL stems from two modified distances: a modified distance between G1 and G2, given by the difference of $d_{G1-G2}$ and c-$d_{G1-G2}$, and a modified distance between G2 and image sensor 208, given by the difference between BFL and c-BFL. Camera 500 switches between a pop-out state and a collapsed state according to a third method, where a gap between two lens groups collapses and additionally the BFL collapses. Lens systems 850, 900, 1000, 1900 and 2000 switch between a pop-out state and a collapsed state according to the third method.

Figure 5C:
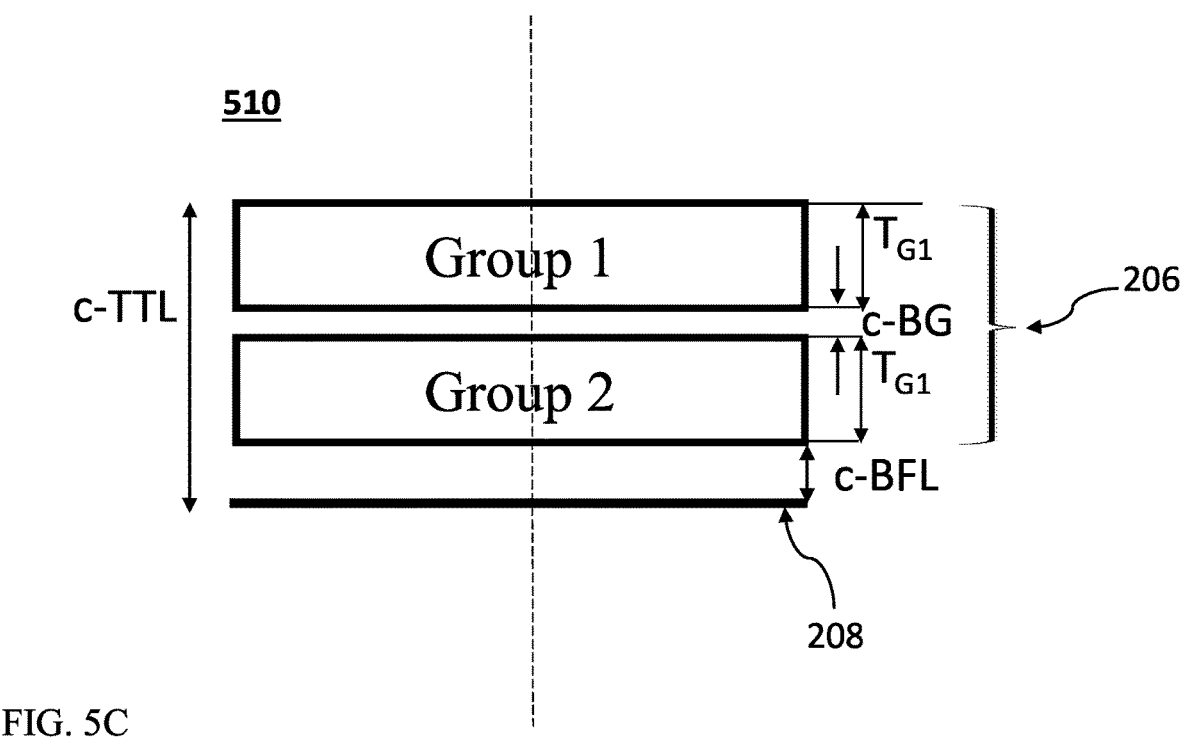
FIG. 5C shows schematically in cross-sectional view another lens system in a collapsed state.

FIG. 5C shows schematically in cross-sectional view another lens system 510 in a collapsed state. In a pop-out state, camera 510 is identical with camera 400. Camera 510 switches between a pop-out state and a collapsed state according to the third method.

Figure 5D:
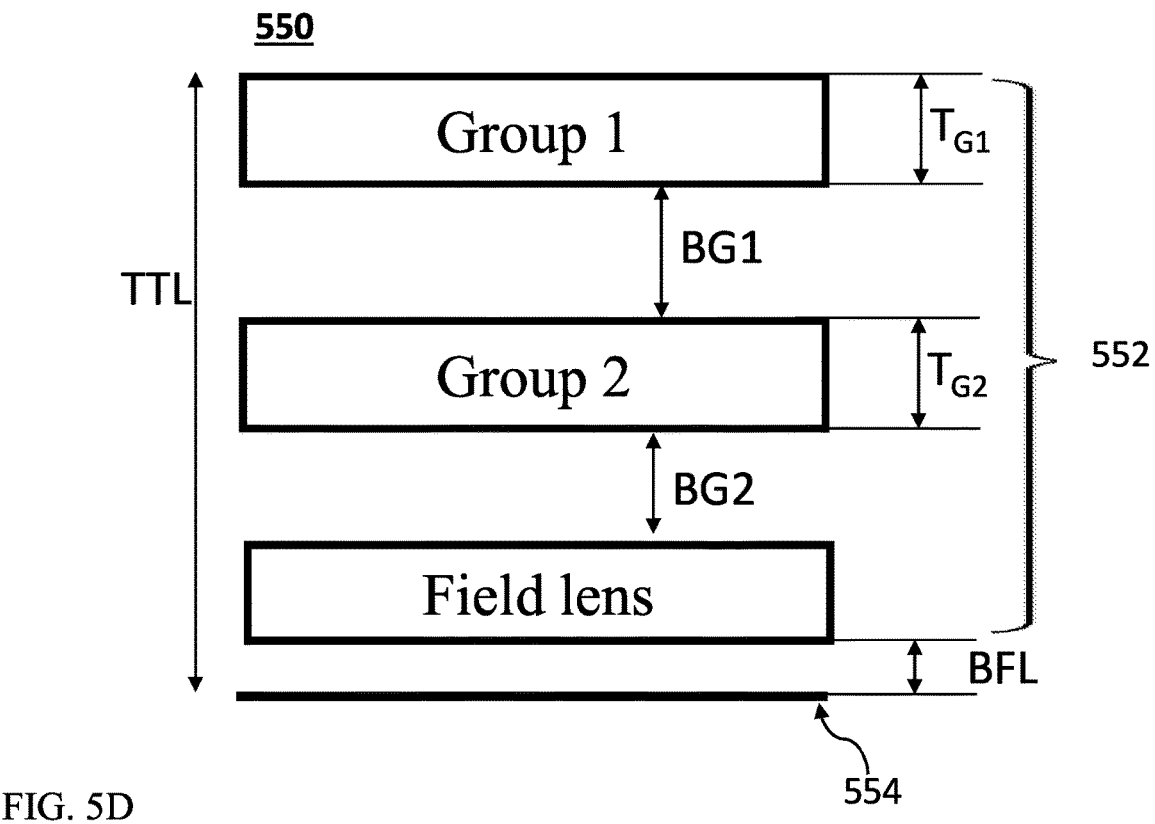
FIGS. 5D and 5E show an embodiment of yet another lens system that switches between a pop-out state and a collapsed state.
Figure 5E:
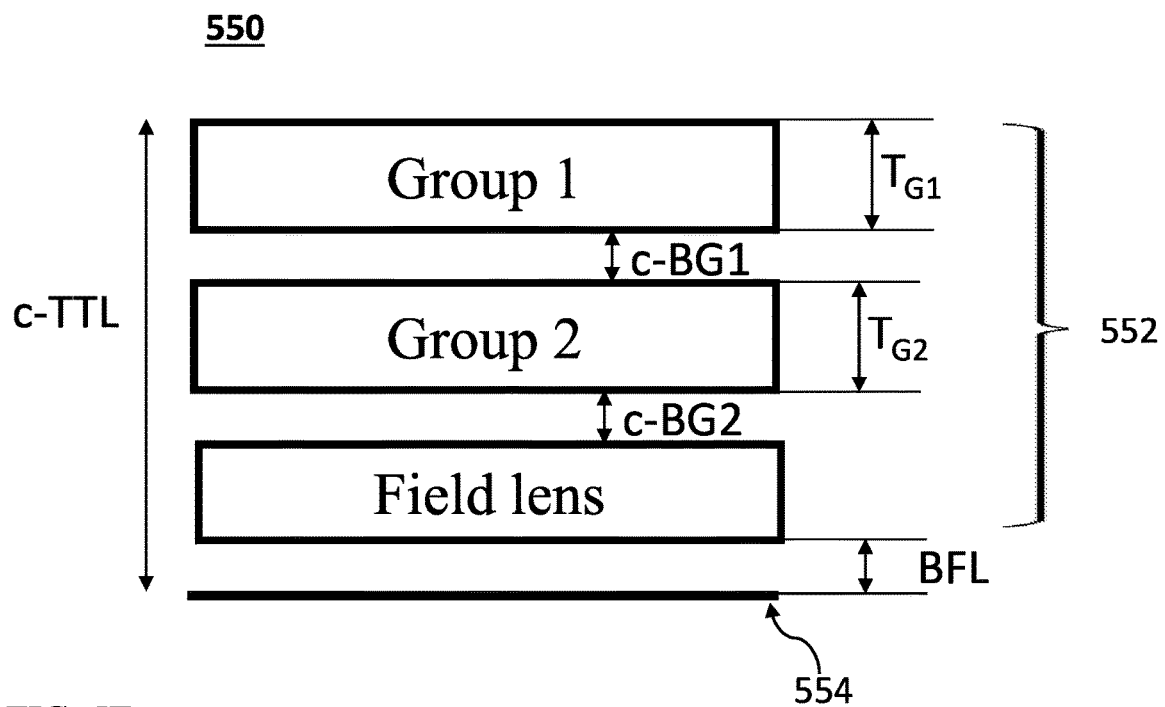

FIGS. 5D-5E show an embodiment of a lens system 550 disclosed herein which switches between a pop-out state and a collapsed state according to a fourth method, where two gaps between three lens groups collapse. System 550 comprises a pop-out lens 552 and an image sensor 554. FIG. 5D shows system 550 in a pop-out state. Lens 552 includes two lens groups G1 and G2 separated by a first big gap (BG1), and a field lens separated from G2 by a second big gap (BG2).

Figure 6A:
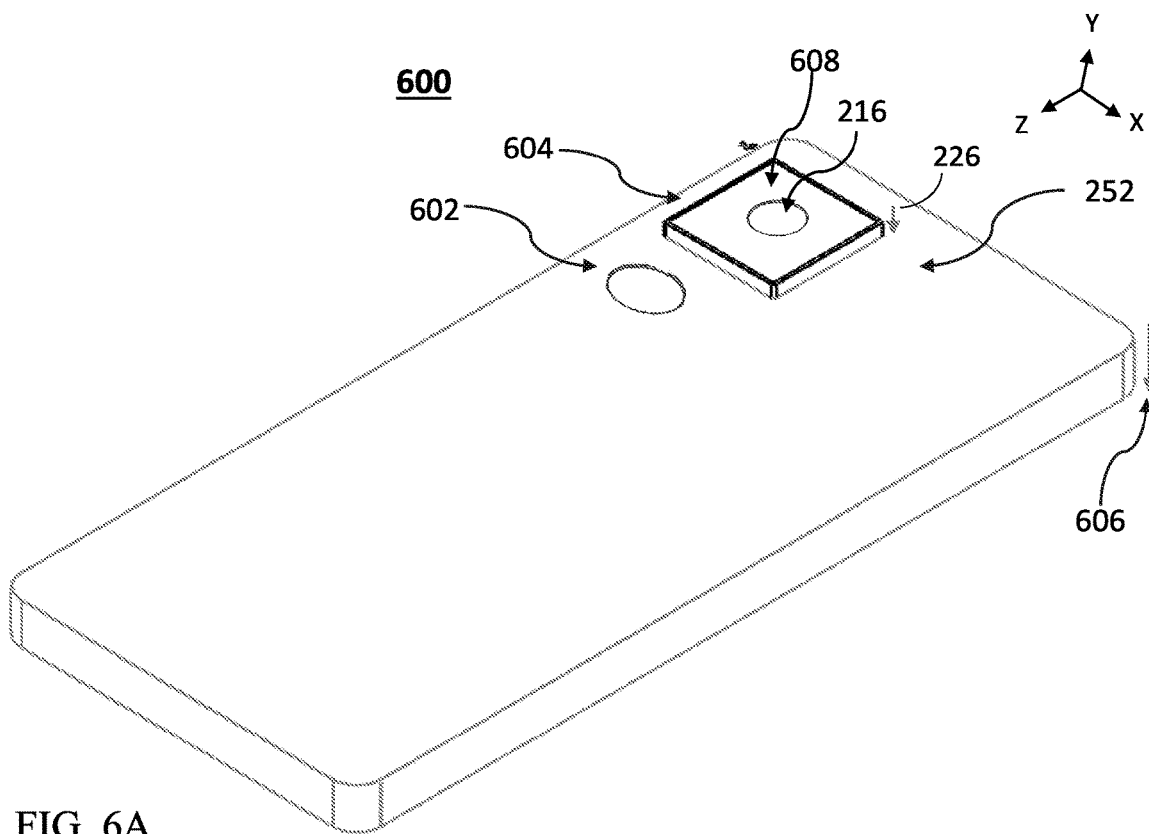
FIG. 6A shows an embodiment of a handheld electronic device with a camera system comprising an upright Wide camera and a pop-out Tele camera in a pop-out state.

FIG. 5E shows lens system 550 in a collapsed state. BG1 is collapsed to a collapsed BG1 ("c-BG1") and BG2 is collapsed to a collapsed BG2 ("c-BG2"). The BFL does not change. Lens systems 1100, 1200, 1300 and 2100 switch between a pop-out state and a collapsed state according to the fourth method. FIG. 6A shows an embodiment of a handheld electronic device (e.g. smartphone) 600 with a camera system comprising a regular (upright) Wide camera 602 and a pop-out Tele camera 604 in an operative pop-out state. Height $H_O$ 606 is the height of device 600 (not including a "camera bump"). In the pop-out state, the Tele pop-out camera extends (raises) the device's exterior surface 252 by a camera bump 608 of height $H_{P-O-B}$ 226. A large image sensor such as 208 (not visible here) and a pop-out mechanism such as pop-out mechanism 210 (not fully visible here) required for switching between a collapsed and a pop-out camera state may define a minimum area of the device's exterior surface 252 that is covered by the pop-out camera (in the X-Z plane).

Figure 6B:
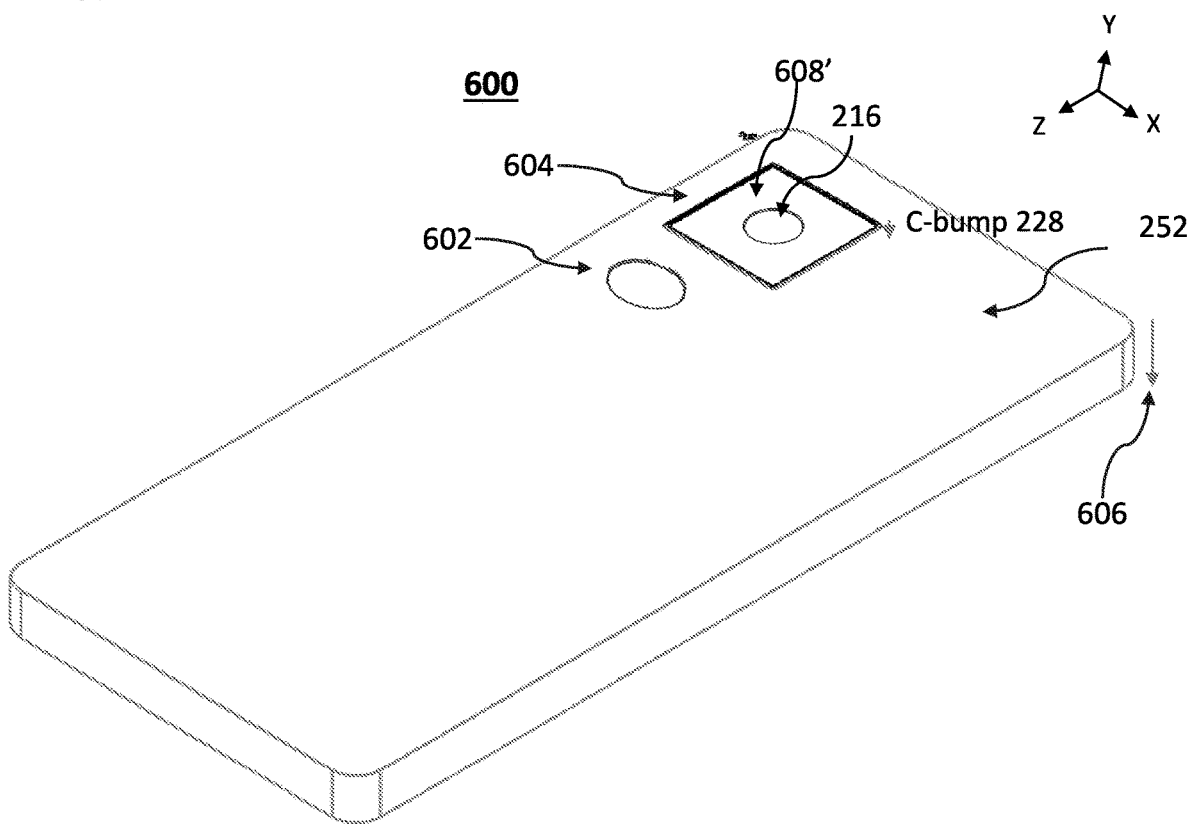
FIG. 6B shows the device of FIG. 6A with the pop-out Tele camera in a collapsed state.

FIG. 6B shows host device 600 with pop-out Tele camera 604 in a collapsed state, illustrating the small height $H_{C-B}$ 228 of the c-bump 608' when Tele camera 604 is in the collapsed state.

Figure 7A:
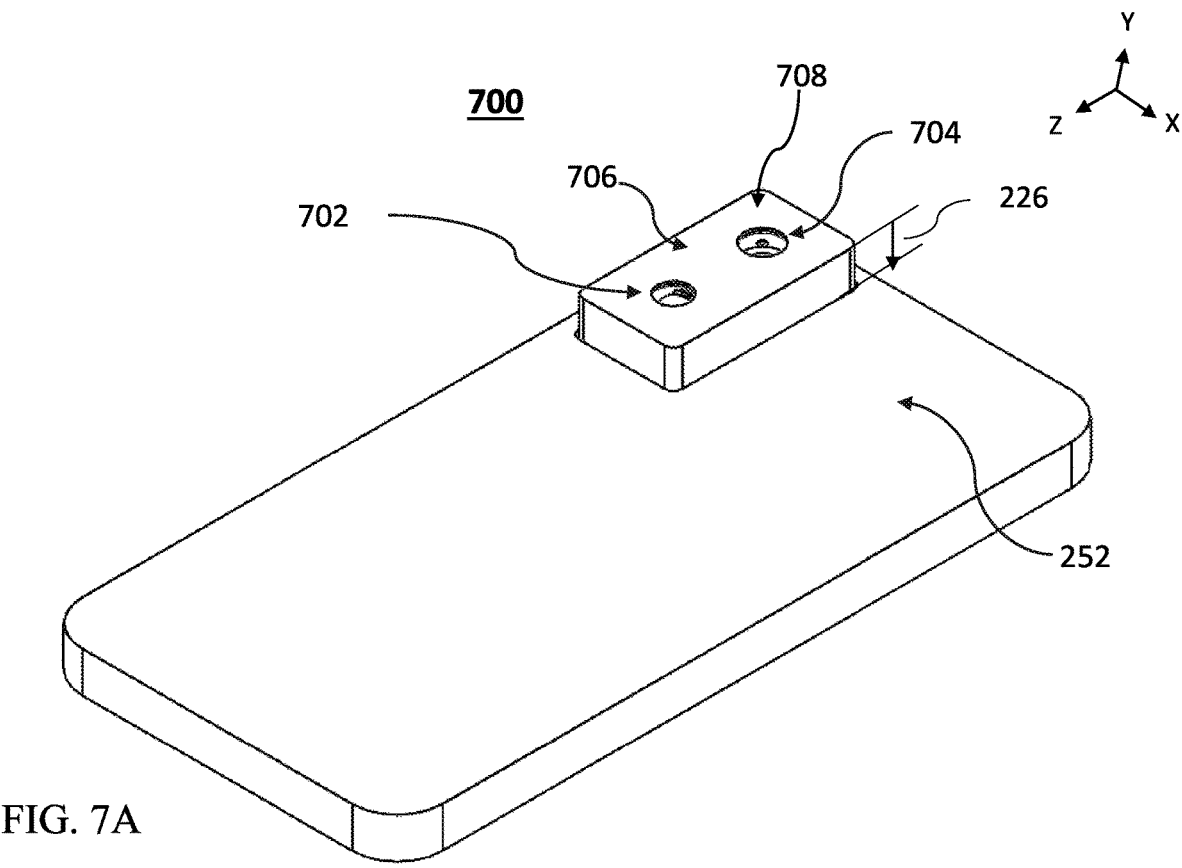
FIG. 7A shows another embodiment of a handheld electronic device with a camera system comprising an upright Wide camera and a pop-out Tele camera in a pop-out state.
Figure 7B:
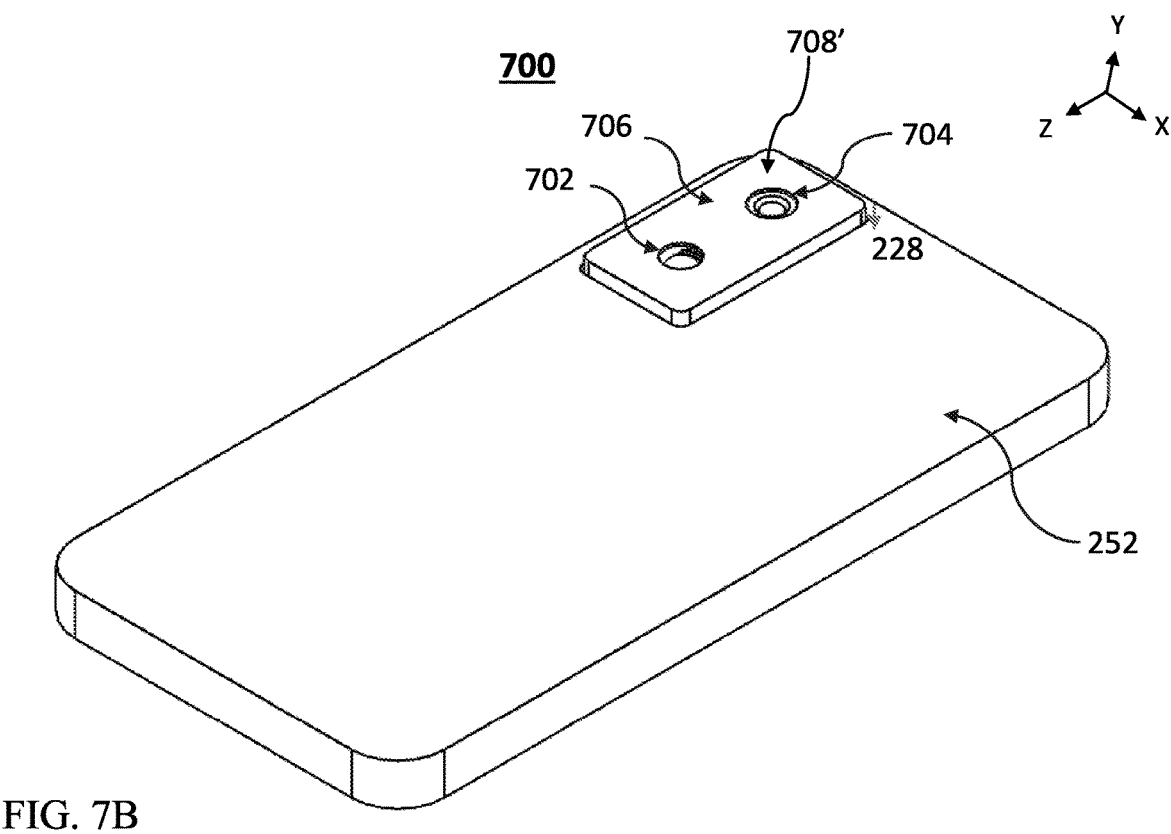
FIG. 7B shows the device of FIG. 7A with the pop-out Tele camera in a collapsed state.

FIG. 7A shows another embodiment of a device 700 with a camera system comprising a Wide pop-out camera 702 and a Tele pop-out camera 704 as disclosed herein in an operative pop-out state. Pop-out bump 708 of height $H_{P-O-B}$ 226 is visible. A pop-out mechanism cover 706 covers both the Tele and the Wide cameras. A pop-out mechanism like mechanism 210 (not shown) switches the Tele and the Wide camera between one or more pop-out states and a collapsed state together and simultaneously, i.e. an actuator for state switching such as actuator 212 may control one or more air-gaps of both the Tele and the Wide camera. FIG. 7B shows host device 700 with the cameras in a collapsed state, with c-bump 708' of height $H_{C-B}$ 228 visible. A collapsed TTL of the Wide camera, c-TTL$_W$ may be similar to the collapsed TTL of the Tele camera, c-TTL$_T$, e.g. c-TTL$_W$=c-TTL$_T$±10% or cTTL$_2$=cTTL±20%.

All lens systems shown in the following may be included in a pop-out optics module such as 240 or 500 and in a pop-out camera such as 200.

Figure 8A:
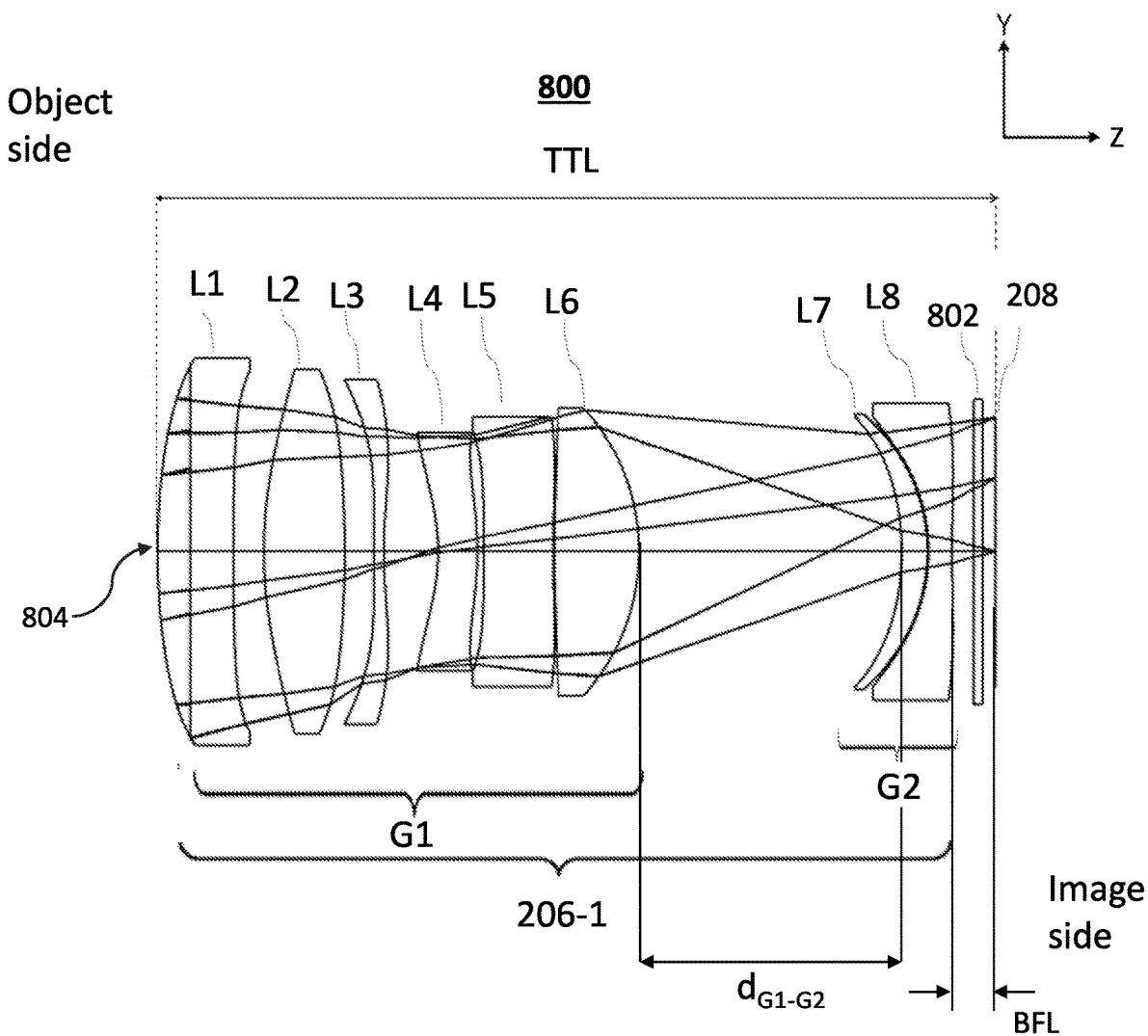
FIG. 8A shows an embodiment of a lens system disclosed herein.

FIG. 8A shows a lens system 800 in a pop-out state. Lens system 800 comprises a first embodiment of a lens numbered 206-1. Lens 206-1 includes eight lens elements marked L1-L8, starting with L1 on an object side facing the object and ending with L8 on an image side toward the image sensor. The lens elements are arranged in two lens groups G1 and G2. G1 includes lens elements L1-L6, and G2 includes L7 and L8. An optional window 802 may e.g. be an optical filter. The optical axis is indicated 804. Lens 206-1 is shown in a first zoom state having ZF1 with EFL$_T$=13 mm, F #=1.1-1.8 and TTL=19.84 mm. Lens 206-1 may be switched to further zoom states continuously or discretely (having particular ZF2 or ZF3) by modifying $d_{G1-G2}$ and/or BFL.

In the pop-out state, G1 is separated from G2 by an air-gap $d_{G1-G2}$=6.22 mm (i.e. T13, the distance between $S_{13}$ and $S_{14}$ in Table 1) and G2 is separated from window 802 by an air-gap d17=0.51 mm (T17, the distance between $S_{13}$ and $S_{14}$ in Table 1). The BFL is 1.02 mm.

In a collapsed state with a collapsed c-TTL, G1 may be separated from G2 by c-$d_{G1-G2}$=0.02-2.5 mm and G2 may be separated from image sensor 208 by c-BFL=0.2-0.8 mm. The c-TTL of lens system 800 may be c-TTL=12.6-16 mm, c-TTL/EFL may be equal to or greater than 0.97 and c-TTL/TTL may be equal to or greater than 0.64.

In other examples, when switching between a pop-out state and a collapsed state only air-gap $d_{G1-G2}$ may be modified to c-$d_{G1-G2}$, which may be 0.2-2.5 mm. BFL may remain unchanged.

In some examples, G1+G2 are movable together relative to image sensor 208 in a range $R_{AF}$ for focusing of camera 200 from infinity down to 1 m or even down to 4 cm. $R_{AF}$ may be up to 1 mm for focusing down to 1 m, and up to 7 mm for focusing down to 4 cm.

Lens system 800 is represented by Tables 1-2. Table 1 provides optical data for lens 206-1 in the pop-out state, and Table 2 provides aspheric data.

TABLE 1

| Group | Lens | Surface | Type | R [mm] | T [mm] | Nd | Vd | D [mm] |
|---|---|---|---|---|---|---|---|---|
|  | Object | $S_0$ | Flat | Infinity | Infinity |  |  |  |
|  | Stop | $S_1$ | Flat | Infinity | −0.775 |  |  | 9.000 |
| G1 | L1 | $S_2$ | QFORB type 1 | 17.302 | 1.786 | 1.5661 | 37.43 | 8.577 |
| G1 | L1 | $S_3$ | QFORB type 1 | 62.771 | 0.725 |  |  | 8.652 |
| G1 | L2 | $S_4$ | QFORB type 1 | 10.090 | 1.928 | 1.5449 | 55.91 | 8.557 |
| G1 | L2 | $S_5$ | QFORB type 1 | −23.147 | 0.689 |  |  | 8.086 |
| G1 | L3 | $S_6$ | QFORB type 1 | 80.507 | 0.232 | 1.6991 | 19.44 | 8.073 |
| G1 | L3 | $S_7$ | QFORB type 1 | 10.360 | 1.287 |  |  | 5.509 |
| G1 | L4 | $S_8$ | QFORB type 1 | −4.430 | 0.928 | 1.5449 | 55.91 | 5.543 |
| G1 | L4 | $S_9$ | QFORB type 1 | −7.104 | 0.144 |  |  | 5.555 |
| G1 | L5 | $S_{10}$ | QFORB type 1 | 440.072 | 1.646 | 1.6991 | 19.44 | 6.397 |
| G1 | L5 | $S_{11}$ | QFORB type 1 | 28.935 | 0.033 |  |  | 6.494 |
| G1 | L6 | $S_{12}$ | QFORB type 1 | 39.391 | 2.010 | 1.5449 | 55.91 | 6.726 |
| G1 | L6 | $S_{13}$ | QFORB type 1 | −5.075 | 6.224 |  |  | 6.322 |
| G2 | L7 | $S_{14}$ | QFORB type 1 | −6.250 | 0.601 | 1.6991 | 19.44 | 6.435 |

TABLE 1-continued

| Group | Lens | Surface | Type | R [mm] | T [mm] | Nd | Vd | D [mm] |
|---|---|---|---|---|---|---|---|---|
| G2 | L7 | $S_{15}$ | QFORB type 1 | −4.314 | 0.033 | | | 6.292 |
| G2 | L8 | $S_{16}$ | QFORB type 1 | −4.226 | 0.553 | 1.5449 | 55.91 | 6.944 |
| G2 | L8 | $S_{17}$ | QFORB type 1 | 45.368 | 0.510 | | | 7.179 |
| Glass window | | $S_{18}$ | Flat | Infinity | 0.21 | 1.5168 | 64.17 | 7.235 |
| | | $S_{19}$ | Flat | Infinity | 0.3 | | | 7.000 |
| Image sensor | | $S_{20}$ | Flat | Infinity | 0 | | | 7.000 |

TABLE 2

| Surface | Conic (k) | NR | $A_2$ | $A_2$ | $A_3$ | $A_4$ |
|---|---|---|---|---|---|---|
| $S_2$ | 0 | 4.500 | 1.937E−01 | 3.246E−02 | 1.318E−03 | 2.280E−04 |
| $S_3$ | 0 | 4.500 | 2.594E−01 | 8.795E−02 | 5.484E−03 | 3.649E−03 |
| $S_4$ | 0 | 4.000 | −1.694E−01 | 7.487E−04 | −3.651E−03 | 1.653E−03 |
| $S_5$ | 0 | 4.000 | −8.607E−02 | −4.556E−02 | 9.328E−03 | −1.115E−04 |
| $S_6$ | 0 | 4.000 | −8.318E−01 | 8.107E−02 | −3.312E−03 | 1.627E−04 |
| $S_7$ | 0 | 3.600 | −7.475E−01 | 6.703E−02 | −6.921E−03 | 5.168E−04 |
| $S_8$ | 0 | 3.540 | 1.184E+00 | −7.816E−02 | 6.294E−03 | −5.495E−03 |
| $S_9$ | 0 | 3.540 | 1.068E+00 | −3.634E−02 | 4.046E−03 | −3.309E−03 |
| $S_{10}$ | 0 | 3.540 | −7.538E−01 | −8.548E−02 | −3.579E−02 | −4.211E−03 |
| $S_{11}$ | 0 | 3.540 | −3.354E−01 | 5.277E−03 | −9.014E−03 | −8.400E−04 |
| $S_{12}$ | 0 | 3.540 | −6.434E−02 | −5.113E−04 | 3.479E−04 | −1.573E−03 |
| $S_{13}$ | 0 | 3.540 | 5.865E−03 | 1.176E−03 | 3.052E−03 | 5.638E−04 |
| $S_{14}$ | 0 | 3.540 | −3.496E−01 | −4.291E−02 | −1.806E−02 | −1.974E−03 |
| $S_{15}$ | 0 | 3.540 | −9.519E−03 | 2.425E−02 | −8.039E−03 | −5.814E−03 |
| $S_{16}$ | 0 | 3.540 | 2.311E−01 | 7.899E−02 | 9.116E−03 | −5.414E−03 |
| $S_{17}$ | 0 | 3.540 | −2.319E−01 | 8.502E−03 | −2.231E−04 | −1.988E−04 |

Figure 8B:
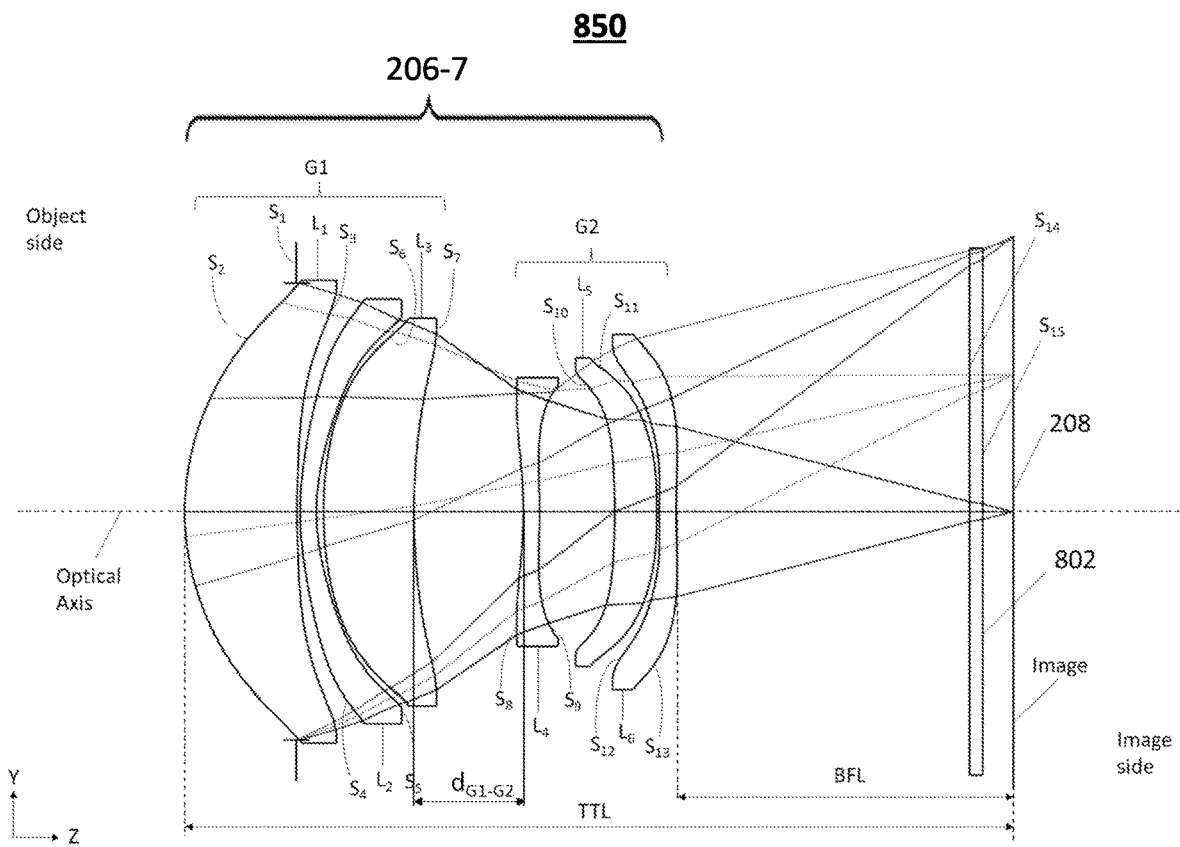
FIG. 8B shows an embodiment of another lens system disclosed herein.

FIG. 8B shows another lens system 850. Lens system 850 is shown in a pop-out state. The design data is given in Tables 3-5. Lens system 850 includes a lens 206-7 having six lens elements L1-L6, optical window 802 and image sensor 208. L1-L3 form G1, and L4-L6 form G2. The TTL is 13.5 mm and the BFL is 5.49 mm. Focal length is EFL=15.15 mm, F number=2.0 and the FOV=32.56 deg. Air-gap $d_{G1\text{-}G2}$ is 1.78 mm.

In a collapsed state, a "collapsed" cTTL may be 5-11 mm. The difference between cTTL and TTL stems from a modified air-gap between L3 and L4, which is a collapsed air-gap c-$d_{G1\text{-}G2}$ and which may be 0.05-1.0 mm and a modified BFL which is a c-BFL and may be 0.1-1.5 mm. For lens system 850, a ratio TTL/EFL is 0.89, i.e. EFL>TTL. The ratio cTTL/EFL may be 0.35-0.75.

TABLE 3

Embodiment 850
EFL = 15.15 mm, F number = 2.0, FOV = 32.56 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.823 | 3.731 | | | | |
| 2 | Lens 1 | ASP | 4.314 | 1.837 | 3.731 | Plastic | 1.54 | 55.91 | 9.50 |
| 3 | | | 21.571 | 0.048 | 3.560 | | | | |
| 4 | Lens 2 | ASP | 4.978 | 0.265 | 3.419 | Plastic | 1.67 | 19.44 | −17.41 |
| 5 | | | 3.422 | 0.113 | 3.139 | | | | |
| 6 | Lens 3 | ASP | 5.764 | 1.473 | 3.113 | Plastic | 1.67 | 19.44 | 20.20 |
| 7 | | | 11.201 | 1.780 | 2.909 | | | | |
| 8 | Lens 4 | ASP | −6.075 | 0.260 | 2.143 | Plastic | 1.67 | 19.44 | −14.33 |
| 9 | | | −17.446 | 1.230 | 2.008 | | | | |
| 10 | Lens 5 | ASP | −18.298 | 0.688 | 2.264 | Plastic | 1.54 | 55.91 | 184.98 |
| 11 | | | −16.202 | 0.040 | 2.468 | | | | |
| 12 | Lens 6 | ASP | 10.235 | 0.273 | 2.679 | Plastic | 1.54 | 55.91 | −93.97 |
| 13 | | | 8.454 | 4.783 | 2.848 | | | | |
| 14 | Filter | Plano | Infinity | 0.210 | — | Glass | 1.52 | 64.17 | |
| 15 | | | Infinity | 0.500 | — | | | | |
| 16 | Image | Plano | Infinity | — | — | | | | |

TABLE 4

Aspheric Coefficients

| Surface # | Conic | A4 | A6 | A8 | A10 |
|---|---|---|---|---|---|
| 2 | 0 | −4.57E−04 | −5.55E−05 | 2.46E−05 | −4.65E−06 |
| 3 | 0 | 8.55E−04 | 7.37E−04 | −1.07E−04 | 9.78E−06 |
| 4 | 0 | −1.51E−02 | 3.43E−03 | −6.33E−04 | 8.54E−05 |
| 5 | 0 | −2.21E−02 | 5.71E−03 | −1.50E−03 | 2.85E−04 |
| 6 | 0 | −3.61E−03 | 3.56E−03 | −1.08E−03 | 2.29E−04 |

TABLE 4-continued

Aspheric Coefficients

| Surface # | Conic | A4 | A6 | A8 | A10 |
|---|---|---|---|---|---|
| 7 | 0 | −1.74E−04 | 2.47E−04 | 5.66E−05 | −3.21E−05 |
| 8 | 0 | 1.75E−02 | 2.27E−03 | −2.24E−03 | 7.99E−04 |
| 9 | 0 | 1.79E−02 | 5.45E−03 | −3.71E−03 | 1.37E−03 |
| 10 | 0 | −4.37E−03 | −1.59E−02 | 1.33E−02 | −6.54E−03 |
| 11 | 0 | −7.77E−02 | 4.02E−02 | −1.21E−02 | 1.65E−03 |
| 12 | 0 | −1.39E−01 | 7.50E−02 | −2.44E−02 | 4.78E−03 |
| 13 | 0 | −5.32E−02 | 1.90E−02 | −4.73E−03 | 6.11E−04 |

TABLE 5

Aspheric Coefficients

| Surface # | A12 | A14 | A16 |
|---|---|---|---|
| 2 | 4.92E−07 | −2.88E−08 | 5.71E−10 |
| 3 | −6.44E−07 | 1.90E−08 | −1.21E−10 |
| 4 | −6.96E−06 | 3.18E−07 | −6.61E−09 |
| 5 | −3.28E−05 | 2.13E−06 | −6.25E−08 |
| 6 | −2.83E−05 | 1.87E−06 | −5.35E−08 |
| 7 | 5.30E−06 | −4.54E−07 | 1.54E−08 |
| 8 | −1.70E−04 | 1.94E−05 | −9.28E−07 |
| 9 | −2.64E−04 | 2.29E−05 | −1.78E−07 |
| 10 | 1.83E−03 | −2.76E−04 | 1.73E−05 |
| 11 | −8.43E−06 | −2.54E−05 | 2.18E−06 |
| 12 | −5.86E−04 | 4.30E−05 | −1.42E−06 |
| 13 | −2.86E−05 | −1.51E−06 | 1.53E−07 |

Figure 9:
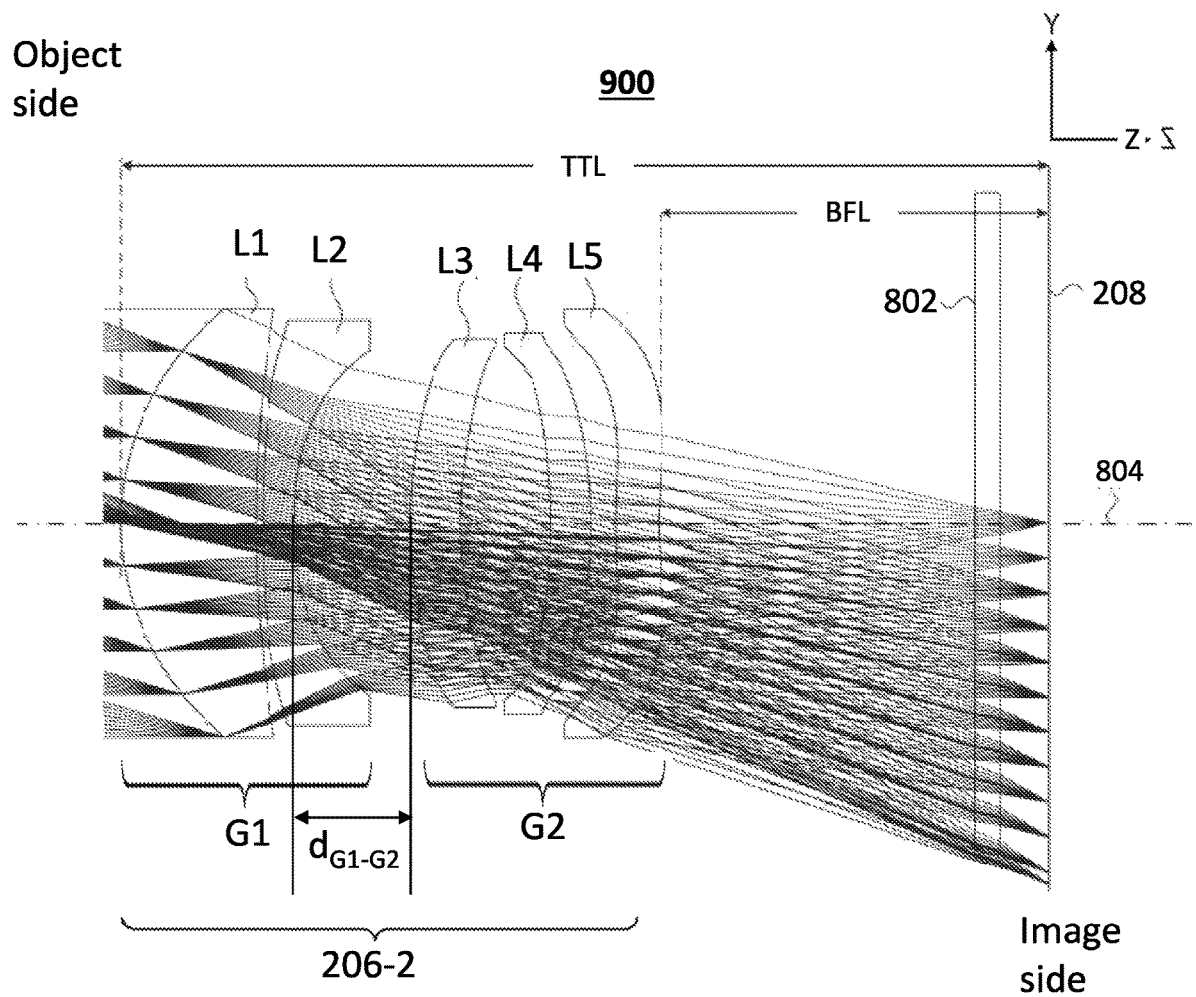
FIG. 9 shows yet another lens system disclosed herein in a pop-out lens state.

FIG. 9 shows a lens system 900 in a pop-out state. Lens system 900 comprises a second embodiment of a lens numbered 206-2. Lens 206-2 includes five lens elements marked L1-L5 arranged in G1 (L1 and L2) and G2 (L3, L4 and L5). Lens 206-2 is shown in a first zoom state having ZF1 with $EFL_T$=7.97 mm, F #=1.2-2.0 and TTL=7.78 mm. Lens 206-2 may be switched to further zoom states continuously or discretely (having particular ZF2 or ZF3) by modifying $d_{G1-G2}$ and/or BFL.

In the pop-out state, G1 is separated from G2 by an air-gap $d_{G1-G2}$=0.974 mm (T4 in Table 3) and G2 is separated from window 802 by an air-gap d10=2.66 mm (T10). The BFL is 3.27 mm.

In a collapsed state with a collapsed c-TTL, G1 may be separated from G2 by c-$d_{G1-G2}$=0.02-0.75 mm and G2 may be separated from image sensor 208 by c-BFL=0.2-2.5 mm.

In other examples, when switching between a pop-out state and a collapsed state only BFL may be modified to c-BFL=0.2-2.5 mm and air-gap $d_{G1-G2}$ may not change. The c-TTL of lens system 900 may be 3.6-7.7 mm. Ratio c-TTL/EFL may be equal to or greater than 0.45, and ratio c-TTL/TTL may be equal to or greater than 0.46.

G1+G2 are movable together relative to image sensor 208 and in a range $R_{AF}$. Lens system 900 is represented by Tables 6-7.

TABLE 6

| # | Type | Comments | | R | T | Nd | Vd | CA/2 | k |
|---|---|---|---|---|---|---|---|---|---|
| 1 | Evn-asph | L1 | S1 | 2.271 | 1.127 | 1.67 | 54.96 | 1.8 | 7.979E−07 |
| 2 | Evn-asph | | S2 | 11.822 | 0.06 | | | 1.725 | 2.410 |
| 3 | Evn-asph | L2 | S3 | 14.756 | 0.27 | 1.64 | 23.52 | 1.7 | 13.805 |
| 4 | Evn-asph | | S4 | 2.728 | 0.974 | | | 1.45 | 2.902E−03 |
| 5 | Evn-asph | L3 | S5 | 3.713 | 0.416 | 1.64 | 23.52 | 1.55 | −2.868 |
| 6 | Evn-asph | | S6 | 3.524 | 0.764 | | | 1.5 | −8.486 |
| 7 | Evn-asph | L4 | S7 | −5.301 | 0.338 | 1.64 | 23.52 | 1.48 | 2.743 |
| 8 | Evn-asph | | S8 | −4.321 | 0.212 | | | 1.6 | 2.578 |
| 9 | Evn-asph | L5 | S9 | 4.327 | 0.352 | 1.53 | 55.66 | 1.68 | −9.755 |
| 10 | Evn-asph | | S10 | 3.771 | 2.656 | | | 1.8 | −6.534 |
| 11 | Flat | | | Infinity | 0.210 | 1.52 | 64.16 | 2.894 | |
| 12 | Flat | | | Infinity | 0.401 | | | 2.938 | |
| 13 | Flat | | | Infinity | — | | | 3.028 | |

TABLE 7

| # | A1 | A2 | A3 | A4 | A5 | A6 | A7 |
|---|---|---|---|---|---|---|---|
| 1 | 4.421E−05 | −2.009E−04 | −1.152E−04 | −6.051E−10 | | | |
| 2 | 6.027E−03 | −1.244E−03 | −5.380E−08 | | | | |
| 3 | 0.020 | 7.012E−04 | −1.081E−03 | −6.297E−08 | | | |
| 4 | 0.024 | 0.011 | 4.241E−04 | −9.114E−08 | | | |
| 5 | −0.022 | 8.939E−03 | 2.200E−03 | −1.002E−06 | | | |
| 6 | −0.012 | 6.756E−03 | −2.299E−03 | 1.314E−03 | 1.758E−04 | −1.030E−05 | |
| 7 | −0.017 | 0.053 | −0.044 | 7.968E−03 | −1.599E−03 | 6.117E−04 | 7.436E−09 |
| 8 | −0.086 | 0.159 | −0.117 | 0.041 | −9.090E−03 | 1.280E−03 | 2.793E−07 |
| 9 | −0.252 | 0.182 | −0.084 | 0.016 | −6.759E−04 | −1.940E−06 | |
| 10 | −0.175 | 0.095 | −0.040 | 8.597E−03 | −7.751E−04 | −8.160E−07 | |

TABLE 7-continued

| # | A1 | A2 | A3 | A4 | A5 | A6 | A7 |
|---|----|----|----|----|----|----|----|

Figure 10:
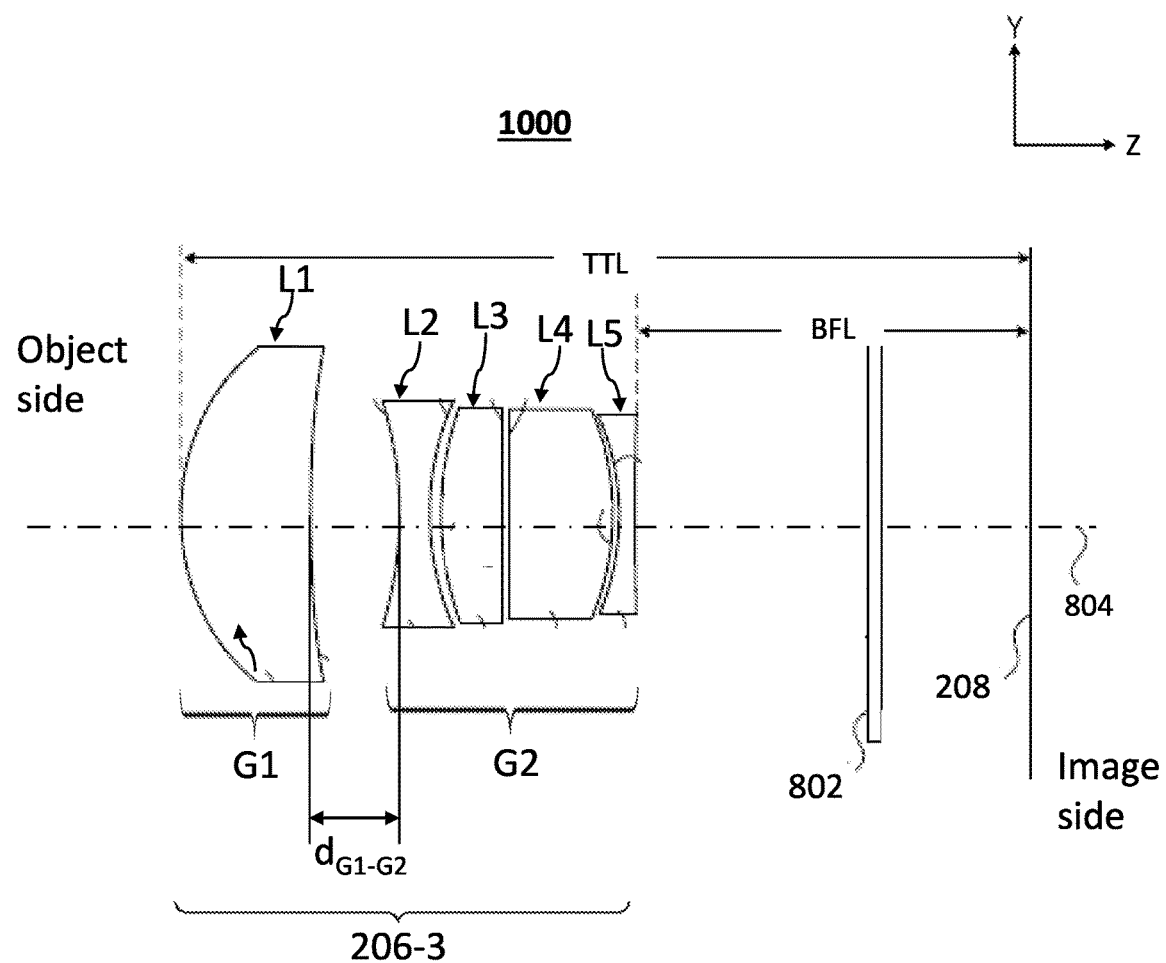
FIG. 10 shows yet another lens system disclosed herein in a pop-out lens state.

FIG. 10 shows a lens system 1000 in a pop-out state. Lens system 1000 comprises a third embodiment of a lens numbered 206-3. Lens 206-3 includes five lens elements L1-L5 arranged in G1 (L1) and G2 (L2-L5) and is shown in a first zoom state having ZF1 with $EFL_T=16$ mm and TTL=15 mm. Lens 206-3 may be switched to further zoom states continuously or discretely (having particular ZF2 or ZF3) by modifying $d_{G1-G2}$ and/or BFL.

In the pop-out state, G1 is separated from G2 by an air-gap $d_{G1-G2}=1.547$ mm (T2 in Table 5) and G2 is separated from window 802 by an air-gap d10=4.115 mm (T10). The BFL 6.998 mm.

In a collapsed state with a collapsed c-TTL, G1 may be separated from G2 by c-$d_{G1-G2}=0.02$-0.75 mm and G2 may be separated from image sensor 208 by c-BFL=0.2-5 mm. In other examples, when switching between a pop-out state and a collapsed state only BFL may be modified to c-BFL=0.2-2.5 mm and air-gap $d_{G1-G2}$ may not change. The c-TTL of lens system 1000 may be 6.2-13 mm. Ratio c-TTL/EFL may be equal to or greater than 0.39 and ratio c-TTL/TTL may be equal to or greater than 0.41.

G1+G2 are movable together relative to image sensor 208 and in a range $R_{AF}$. $R_{AF}$ may be up to 0.6 mm for focusing down to 1 m, and up to 8 mm for focusing down to 0.04 m.

Lens system 1000 is represented by Tables 8-9. Table 5 provides optical data for lens 206-3 being in a pop-out state Table 6 provides aspheric data.

TABLE 8

| # | R | Thickness | Material | CA/2 | Conic coefficient K |
|---|---|-----------|----------|------|---------------------|
| 0 | Infinity | 1.00E+06 | | | |
| 1 | 4.009 | 2.271 | H–ZK3 | 2.96 | 0 |
| 2 | 18.115 | 1.547 | | 2.55 | 0 |
| 3 | −5.167 | 0.562 | EP6000L | 2.00 | −2.296 |
| 4 | 6.968 | 0.162 | | 2.00 | 9.483 |
| 5 | 4.666 | 1.082 | K26R | 1.90 | −2.619 |
| 6 | 52.645 | 0.121 | | 1.90 | 10.398 |
| 7 | 28.168 | 1.851 | EP6000L | 1.83 | −367.355 |
| 8 | −5.062 | 0.101 | | 1.83 | −10.130 |
| 9 | −5.098 | 0.291 | K26R | 1.76 | −10.587 |
| 10 | 15.000 | 4.115 | | 1.76 | −9.745 |
| 11 | Infinity | 0.210 | BK7 | 2.44 | |
| 12 | Infinity | 2.673 | | 2.47 | |
| 13 | Infinity | | | 2.94 | |

TABLE 9

| # | A1 | A2 | A3 | A4 | A5 | A6 | A7 |
|---|----|----|----|----|----|----|----|
| 1 | 0 | 0 | 0 | 0 | 0 | 0 | 0 |
| 2 | 0 | 0 | 0 | 0 | 0 | 0 | 0 |
| 3 | 7.1296E−03 | −1.3791E−04 | −2.8926E−05 | 3.7349E−06 | 0 | 0 | 0 |
| 4 | −2.8741E−03 | 8.8769E−04 | −1.2786E−04 | 2.0275E−05 | 0 | 0 | 0 |
| 5 | −2.1504E−03 | −3.1621E−04 | −3.2758E−06 | −2.2831E−07 | 0 | 0 | 0 |
| 6 | 4.1139E−03 | −1.9087E−03 | 1.9639E−04 | −3.2249E−05 | 0 | 0 | 0 |
| 7 | −4.3880E−03 | −7.7699E−04 | 1.8992E−04 | −6.8854E−06 | 0 | 0 | 0 |
| 8 | −6.5726E−03 | −5.8651E−04 | 1.3315E−04 | −2.0025E−05 | 0 | 0 | 0 |
| 9 | −7.8205E−03 | −1.1425E−03 | 2.7014E−04 | −4.0371E−05 | 0 | 0 | 0 |
| 10 | −5.0642E−03 | 3.6557E−04 | −9.7321E−05 | 1.7319E−05 | 0 | 0 | 0 |

Figure 11A:
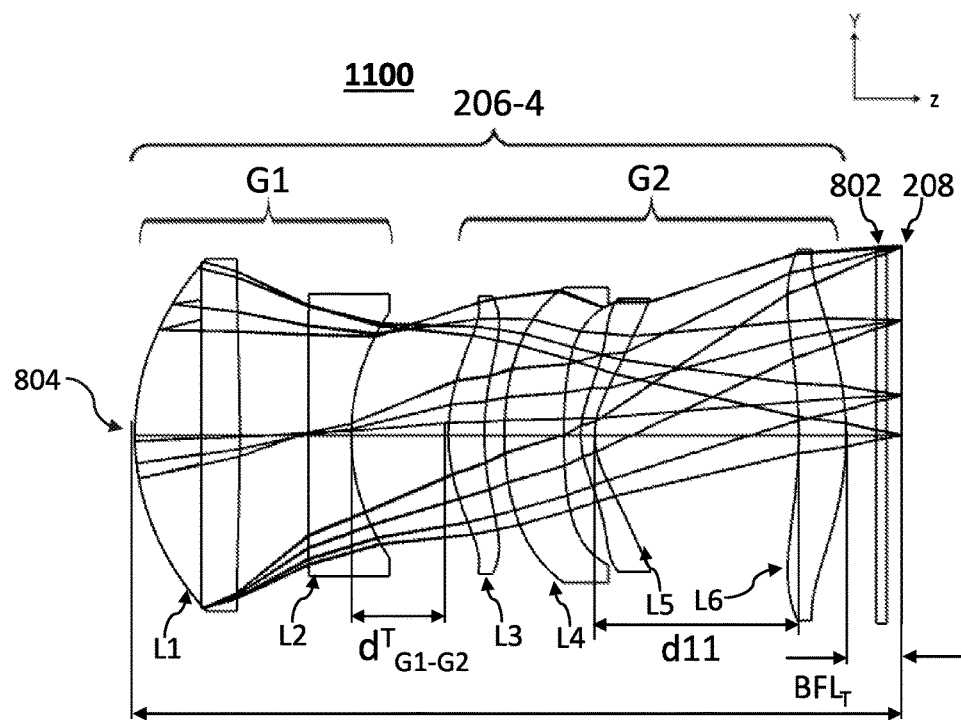
FIG. 11A shows yet another lens system disclosed herein in a first pop-out lens state.
Figure 11B:
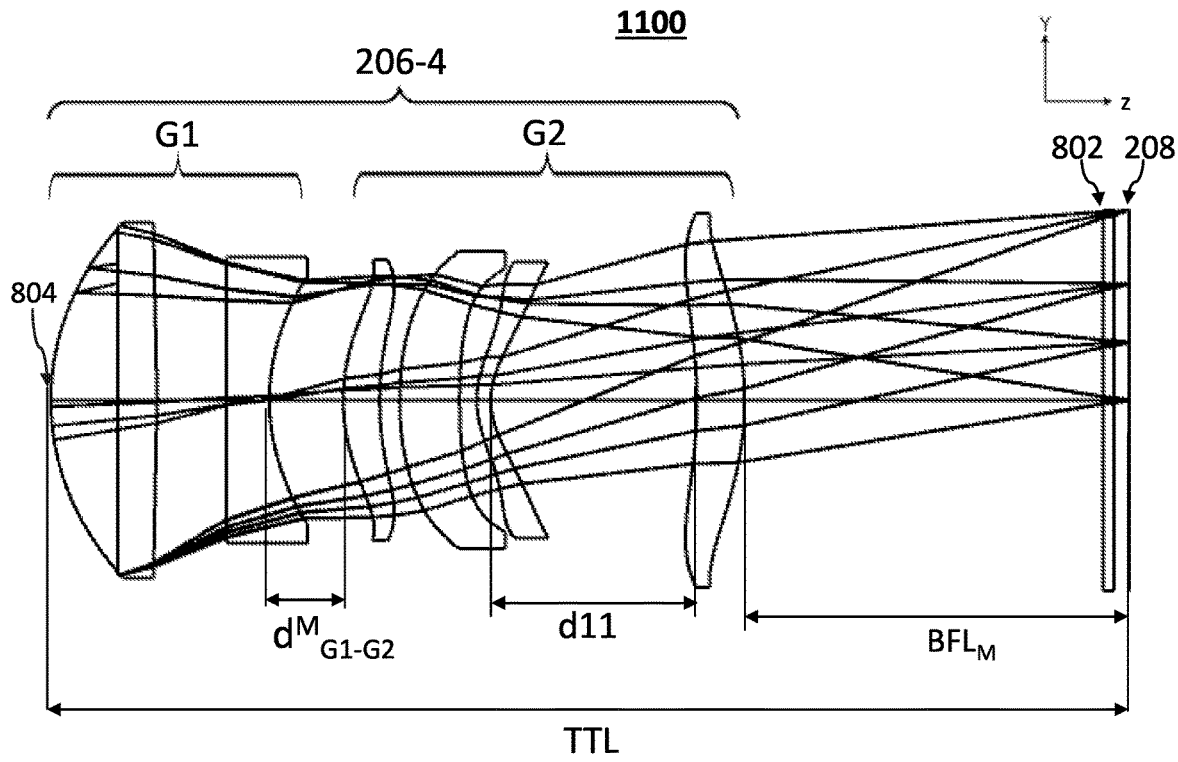
FIG. 11B shows the lens system of FIG. 11A in a second, Macro pop-out lens state.

FIG. 11A-B show a lens system 1100 in two pop-out states. Lens system 1100 comprises a fourth embodiment of a lens numbered 206-4. Lens 206-4 includes six lens elements L1-L6 arranged in G1 (L1-L2) and G2 (L3-L6) separated by air-gap $d_{G1-G2}$. Lens system 1100 may be able to focus continuously from infinity to e.g. 5 cm. FIG. 11A shows lens system 1100 in a Tele lens state focused at infinity. FIG. 11B shows lens system 1100 in a Macro lens state focused at 5 cm. For focusing lens 206-4, $d_{G1-G2}$ and BFL are modified, i.e. two air-gaps present in 1100 are modified. The TTL changes continuously and in dependence on u from TTL=15 mm (focus at infinity) to TTL=20.9 mm (focus at 5 cm).

In the Tele state (see FIG. 11A) having ZF1 and being focused at infinity, 206-4 has F/#=1.3-1.9, $EFL_T=14.98$ mm and TTL=15 mm. In the Tele state, G1 is separated from G2 by an air-gap $d^T_{G1-G2}=1.909$ mm (i.e. T5, the distance between S5 and S6 in Table 8) and G2 is separated from image sensor by $BFL_T=0.586$ mm (i.e. T13 in Table 8). For the Tele state, a ratio of c-TTL/EFL may be c-TTL/EFL≥0.57, a ratio of c-TTL/TTL may be c-TTL/EFL≥0.57. 206-4 may be switched to further zoom states continuously or discretely (having particular ZF2 or ZF3) by modifying $d_{G1-G2}$ and/or BFL.

In the Macro configuration (see FIG. 11B) with focus at 5 cm, 206-4 has F/#=1.7-2.8, $EFL_M=14.8$ mm and TTL=20.9 mm. In the Macro state, G1 is separated from G2 by an air-gap $d^M_{G1-G2}=1.441$ mm and G2 is separated from image sensor by $BFL_M=6.955$ mm. According to thin lens equation (Eq. 2)

$$\frac{1}{EFL} = \frac{1}{u} + \frac{1}{v}$$

for EFL≈15 mm and u=50 mm the effective lens-image distance v is v≈21 mm and a M of about 2.4:1 is achieved.

In a collapsed state with a collapsed c-TTL, G1 may be separated from G2 by e.g. c-$d_{G1-G2}=0.02$-1.4 mm and G2 may be separated from image sensor 208 by c-BFL=0.2-0.8 mm. A c-TTL of lens system 1100 may be c-TTL=8.5-14 mm. For the Macro state, ratio c-TTL/EFL may be equal to or greater than 0.57 and ratio c-TTL/TTL may be equal to or greater than 0.41.

In some examples, another (large) air gap such as air gap d11 between L5 and L6 may be collapsed when switching to a collapsed state. For an example with a collapsible air gap d11, c-TTL of lens system 1100 may be 8.5-11 mm.

In other examples, when switching between a pop-out state and a collapsed state only $d_{G1-G2}$=0.02-1.4 mm may be modified to c-$d_{G1-G2}$=0.02-1.4 mm and BFL may not change. In yet other examples, when switching between a pop-out state and a collapsed state only BFL may be modified to c-BFL=0.2-0.8 mm and air-gap $d_{G1-G2}$ may not change.

Lens system 1100 is represented by Tables 10-13. Table 10 and Table 11 provide optical data for lens 206-4 being in pop-out state and (focused at infinity (left) and at 5 cm (right)). Table 12 provides aspheric data and Table 13 provides data on the focus lengths of L1-L6 as well as on G1 and G2.

TABLE 10

| Group | Lens | Surface | Type | R [mm] | T [mm] | Nd | Vd | D [mm] |
|---|---|---|---|---|---|---|---|---|
| Object | | $S_0$ | Flat | Infinity | See Table 11 | | | |
| Stop | | $S_1$ | Flat | Infinity | −1.297 | | | 3.39 |
| G1 | L1 | $S_2$ | Even Asphere | 4.760 | 2.049 | 1.5348 | 3.40 | 8.577 |
| G1 | L1 | $S_3$ | Even Asphere | −40.471 | 1.341 | | 3.25 | 8.652 |
| G1 | L2 | $S_4$ | Even Asphere | −208.624 | 0.838 | 1.6397 | 2.72 | 8.557 |
| G1 | L2 | $S_5$ | Even Asphere | 3.942 | See table 11 | | 2.35 | 8.086 |
| G2 | L3 | $S_6$ | Even Asphere | 3.675 | 0.703 | 1.5348 | 2.60 | 8.073 |
| G2 | L3 | $S_7$ | Even Asphere | 5.768 | 0.391 | | 2.68 | 5.509 |
| G2 | L4 | $S_8$ | Even Asphere | 6.436 | 1.160 | 1.6397 | 2.84 | 5.543 |
| G2 | L4 | $S_9$ | Even Asphere | 13.466 | 0.330 | | 2.51 | 5.555 |
| G2 | L5 | $S_{10}$ | Even Asphere | 1.745 | 0.270 | 1.5348 | 2.63 | 6.397 |
| G2 | L5 | $S_{11}$ | Even Asphere | 1.377 | 4.000 | | 2.61 | 6.494 |
| G2 | L6 | $S_{12}$ | Even Asphere | −8.989 | 0.924 | 1.5348 | 3.57 | 6.726 |
| G2 | L6 | $S_{13}$ | Even Asphere | −6.006 | See table 11 | | 3.59 | 6.322 |
| Glass window | | $S_{18}$ | Flat | Infinity | 0.210 | 1.5168 | 64.17 | 3.68 |
| | | $S_{19}$ | Flat | Infinity | 0.290 | | | 3.69 |
| Image sensor | | $S_{20}$ | Flat | Infinity | 0 | | | 3.71 |

TABLE 11

| Object position | | at infinity | at 50 mm |
|---|---|---|---|
| T [mm] | $S_0$ | Infinity | 50 |
| | $S_5$ | 1.909 | 1.441 |
| | $S_{13}$ | 0.586 | 6.955 |

TABLE 12

| Surface | Conic (k) | $A_2$ | $A_3$ | A4 | A4 | A8 |
|---|---|---|---|---|---|---|
| $S_2$ | −0.630 | 0 | 4.4054E−04 | 1.2583E−05 | −2.9783E−07 | 6.0963E−09 |
| $S_3$ | −17.322 | 0 | 1.1175E−03 | −7.2647E−05 | 3.0989E−06 | −5.5328E−08 |
| $S_4$ | 10.896 | 0 | 2.8072E−04 | −1.8071E−05 | 1.0399E−05 | −5.1263E−07 |
| $S_5$ | −3.542 | 0 | 4.3261E−03 | −2.3939E−04 | 4.7495E−05 | −1.4155E−06 |
| $S_6$ | 0.550 | 0 | −4.6101E−03 | −6.4645E−04 | −5.5036E−05 | −9.0004E−06 |
| $S_7$ | 2.038 | 0 | −1.9132E−03 | −9.1925E−04 | −1.1892E−04 | 7.4560E−06 |
| $S_8$ | −0.407 | 0 | 7.3254E−03 | −9.5079E−04 | 1.4267E−04 | −4.1002E−06 |
| $S_9$ | 10.906 | 0 | 9.1614E−03 | −7.9578E−04 | 1.5907E−04 | 1.1780E−05 |
| $S_{10}$ | −1.309 | 0 | −5.7321E−02 | 7.4146E−03 | −5.5742E−04 | 3.4068E−05 |
| $S_{11}$ | −1.653 | 0 | −4.4174E−02 | 7.6947E−03 | −6.6729E−04 | 2.6326E−05 |
| $S_{12}$ | −8.851 | 0 | 1.5094E−03 | 1.3664E−04 | 2.1531E−06 | −1.9460E−07 |
| $S_{13}$ | 1.231 | 0 | 2.2125E−03 | 7.1788E−05 | 7.8923E−06 | 1.8970E−07 |

TABLE 13

| Lens # | Lens or group focal length [mm] |
|---|---|
| L1 | 8.057 |

TABLE 13-continued

| Lens # | Lens or group focal length [mm] |
|---|---|
| L2 | −5.978 |
| L3 | 16.869 |
| L4 | 17.921 |
| L5 | −16.324 |
| L6 | 30.404 |
| G1 | 49.457 |
| G2 | 12.122 |

Figure 12A:
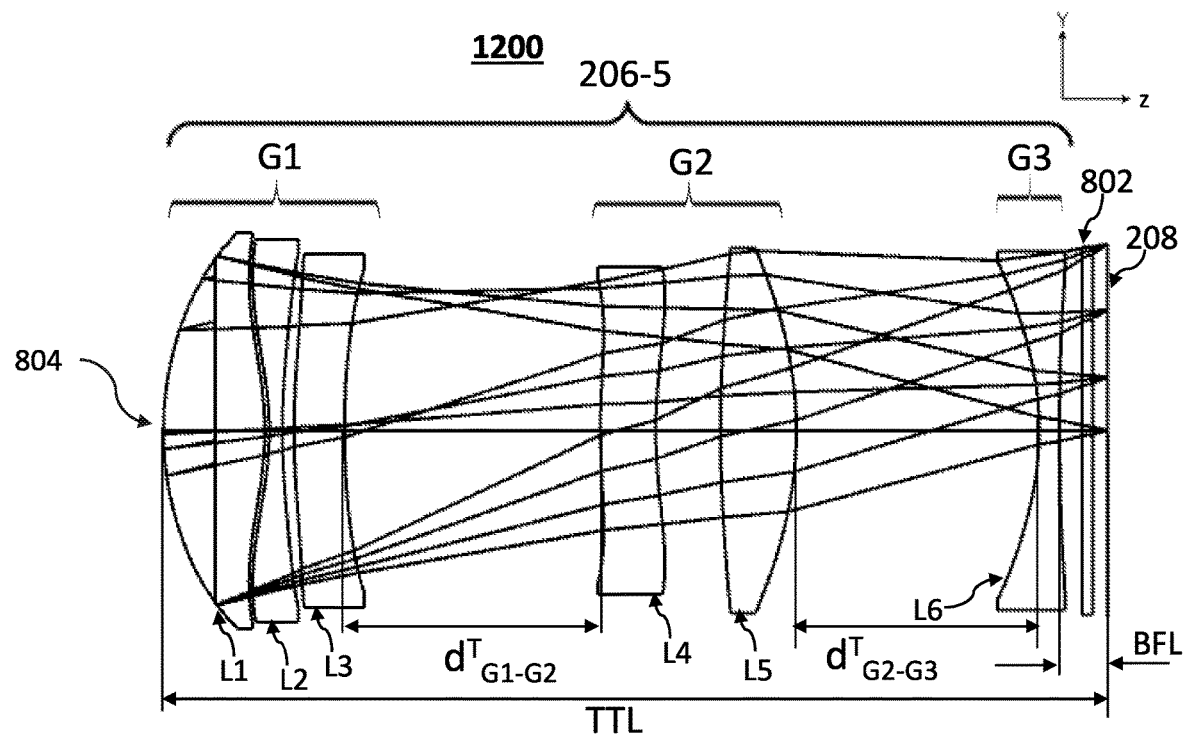
FIG. 12A shows yet another lens system disclosed herein in a first pop-out lens state.
Figure 12B:
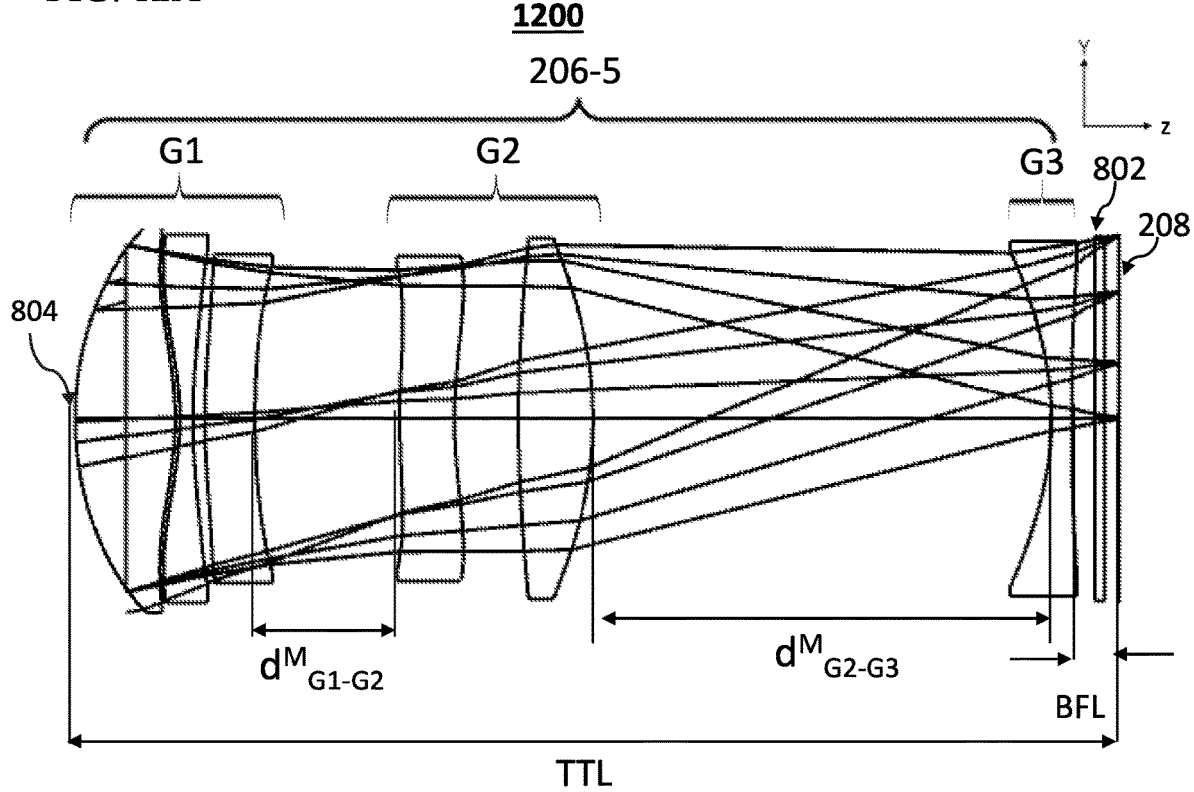
FIG. 12B shows the lens system of FIG. 12A in a second, Macro pop-out lens state.

FIG. 12A-B show a lens system 1200 in two pop-out states. Lens system 1200 comprises a fifth embodiment of a lens 206-5. Lens 206-5 comprises six lens elements L1-L6 in three lens groups G1 (L1-L3), G2 (L4-L5) and G3 (L6). G1 and G2 are separated by an air-gap $d_{G1-G2}$ and G2 and G3 are separated by an air-gap $d_{G2-G3}$. Lens system 1200 may be able to focus continuously from infinity to e.g. 5 cm. FIG. 12A shows lens system 1200 in a Tele lens state focused at infinity. FIG. 12B shows lens system 1200 in a Macro lens state focused at 5 cm. For focusing lens 206-5, $d_{G1-G2}$ and $d_{G2-G3}$ are increased or decreased. The TTL changes continuously from TTL=15 mm (focus at infinity) to TTL=20.9 mm (focus at 5 cm).

In the Tele state (see FIG. 12A) having ZF1 and being focused at infinity, 206-5 has F/#=1.2-1.8, $EFL_T$=15 mm and TTL=18.7 mm. In the Tele state, $d^T_{G1-G2}$=5.073 mm (i.e. T7, the distance between $S_7$ and $S_8$ in Table 11) and G2 is separated from G3 by $d^T_{G2-G3}$=4.813 mm (i.e. T11). For the Tele state, ratio c-TTL/EFL may be equal to or greater than 0.59, and ratio c-TTL/TTL may equal to or greater than 0.48. 206-5 may be switched to further zoom states continuously or discretely (having particular ZF2 or ZF3) by modifying $d_{G1-G2}$, $d_{G2-G3}$ and/or BFL.

In the Macro configuration (see FIG. 12B) with focus at 5 cm, 206-5 has F/#=1.3-1.9, $EFL_M$=9.8 mm and TTL=20.9 mm. In the Macro state, $d^M_{G1-G2}$=2.908 mm and $d^M_{G2-G3}$=9.175 mm. The BFL of 206-5 is =0.95 mm and is not modified for focusing. According to eq. 2 for EFL≈10 mm and u=50 mm, the lens-image distance ("v") is v≈12.5 mm and a M of about 4:1 is achieved.

In a collapsed state with a collapsed c-TTL, G1 may be separated from G2 by c-$d_{G1-G2}$=0.02-2.5 mm and G2 may be separated from G3 by c-$d_{G2-G3}$=0.02-4.5 mm. When switching between a pop-out state and a collapsed state two air-gaps may be modified. A c-TTL of lens system 1200 may be 8.8-15 mm. For the Macro state, ratio c-TTL/EFL may be equal to or greater than 0.89 and ratio c-TTL/TTL may be equal to or greater than 0.43.

In some examples, another (large) air gap such as air gap d9 between L4 and L5 may be collapsed when switching to a collapsed state. For an example with a collapsible air gap d9, c-TTL of lens system 1200 may be 7.6-15 mm, corresponding to a ratio c-TTL/EFL≥0.76.

In other examples, when switching between a pop-out state and a collapsed state only $d_{G1-G2}$ may be modified to c-$d_{G1-G2}$=0.02-1.4 mm and $d_{G2-G3}$ may not change. In yet other examples, when switching between a pop-out state and a collapsed state only $d_{G2-G3}$ may be modified to c-$d_{G2-G3}$=0.02-4.5 mm $d_{G1-G2}$ may not change.

Lens system 1200 is represented by Tables 14-17. Table 14 and Table 15 provide optical data for lens 206-5 being in pop-out state (focus at infinity and at 5 cm), Table 16 provides aspheric data, and Table 17 provides data on the focus lengths of each lens element and on G1, G2 and G3.

TABLE 14

| Group | Lens | Surface | Type | R [mm] | T [mm] | Nd | Vd | D [mm] |
|---|---|---|---|---|---|---|---|---|
| Object | | $S_0$ | Flat | Infinity | See Table 15 | | | |
| Stop | | $S_1$ | Flat | Infinity | −1.015 | | | 3.46 |
| G1 | L1 | $S_2$ | Even Asphere | 6.387 | 2.000 | 1.5449 | 55.913 | 8.577 |
| G1 | L1 | $S_3$ | Even Asphere | −6.110 | 0.093 | | | 8.652 |
| G1 | L2 | $S_4$ | Even Asphere | −5.663 | 0.260 | 1.5661 | 37.426 | 8.557 |
| G1 | L2 | $S_5$ | Even Asphere | 12.316 | 0.236 | | | 8.086 |
| G1 | L3 | $S_6$ | Even Asphere | 13.536 | 1.000 | 1.6397 | 23.529 | 8.073 |
| G1 | L3 | $S_7$ | Even Asphere | 16.733 | See table 15 | | | 5.509 |
| G2 | L4 | $S_8$ | Even Asphere | 16.483 | 1.093 | 1.651 | 21.514 | 5.543 |
| G2 | L4 | $S_9$ | Even Asphere | 9.528 | 1.279 | | | 5.555 |
| G2 | L5 | $S_{10}$ | Even Asphere | 26.649 | 1.500 | 1.5449 | 55.913 | 6.397 |
| G2 | L5 | $S_{11}$ | Even Asphere | −7.769 | See table 15 | | | 6.494 |
| G3 | L6 | $S_{12}$ | Even Asphere | −5.892 | 0.402 | 1.5449 | 55.913 | 6.726 |
| G3 | L6 | $S_{13}$ | Even Asphere | 66.620 | 0.450 | | | 6.322 |
| Glass window | | $S_{18}$ | Flat | Infinity | 0.210 | 1.5168 | 64.17 | 3.62 |
| | | $S_{19}$ | Flat | Infinity | 0.290 | | | 3.65 |
| Image sensor | | $S_{20}$ | Flat | Infinity | 0 | | | 3.70 |

TABLE 15

| | Object position | at infinity | at 50 mm |
|---|---|---|---|
| T [mm] | $S_0$ | Infinity | 50 |
| | $S_7$ | 5.073 | 2.908 |
| | $S_{11}$ | 4.813 | 9.175 |

TABLE 16

| Surface | Conic (k) | $A_2$ | $A_3$ | A4 | A4 | A8 |
|---|---|---|---|---|---|---|
| $S_2$ | 0.677 | 0 | −3.662E−04 | 1.359E−05 | 0.000E+00 | −3.662E−04 |
| $S_3$ | −4.775 | 0 | 4.898E−03 | −1.397E−04 | 1.591E−06 | 4.898E−03 |
| $S_4$ | −6.366 | 0 | 4.765E−03 | −1.692E−04 | 3.254E−06 | 4.765E−03 |
| $S_5$ | 5.346 | 0 | −3.075E−03 | 9.482E−05 | 9.656E−07 | −3.075E−03 |
| $S_6$ | −8.028 | 0 | −2.837E−03 | 1.380E−04 | −1.763E−06 | −2.837E−03 |
| $S_7$ | 16.045 | 0 | 1.797E−04 | −1.949E−05 | 1.044E−06 | 1.797E−04 |
| $S_8$ | −6.134 | 0 | −3.752E−03 | −7.964E−06 | −3.621E−07 | −3.752E−03 |
| $S_9$ | −1.248 | 0 | −3.976E−03 | 2.575E−05 | −3.337E−07 | −3.976E−03 |
| $S_{10}$ | 26.732 | 0 | −5.210E−04 | −6.374E−06 | 5.625E−07 | −5.210E−04 |
| $S_{11}$ | −1.100 | 0 | −1.300E−04 | 1.134E−05 | 9.762E−07 | −1.300E−04 |
| $S_{12}$ | −0.839 | 0 | 1.998E−03 | −1.041E−04 | 2.466E−06 | 1.998E−03 |
| $S_{13}$ | 26.744 | 0 | 5.185E−04 | 3.489E−06 | −3.179E−06 | 5.185E−04 |

TABLE 17

| Lens # | Lens or group focal length [mm] |
|---|---|
| L1 | 6.054 |
| L2 | −6.785 |
| L3 | 97.901 |
| L4 | −36.686 |
| L5 | 11.176 |
| L6 | −9.882 |
| G1 | 21.183 |
| G2 | 15.420 |
| G3 | −9.882 |

Figure 13A:
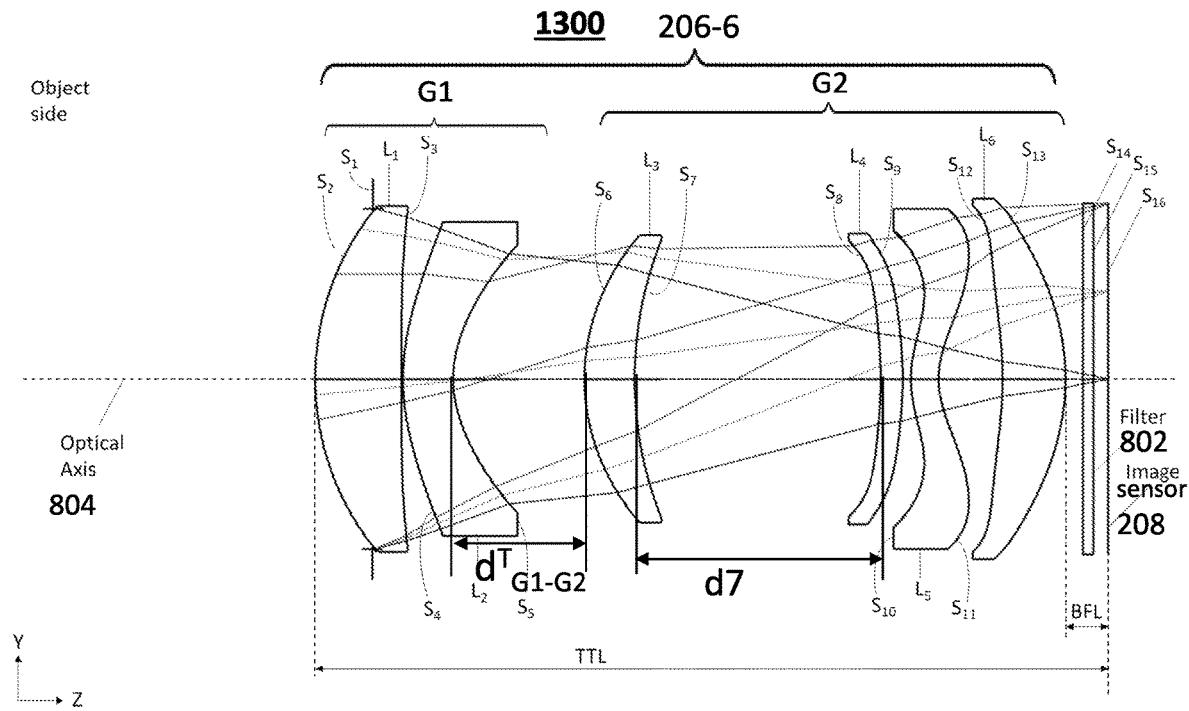
FIG. 13A shows yet another lens system disclosed herein in a first pop-out lens state.
Figure 13B:
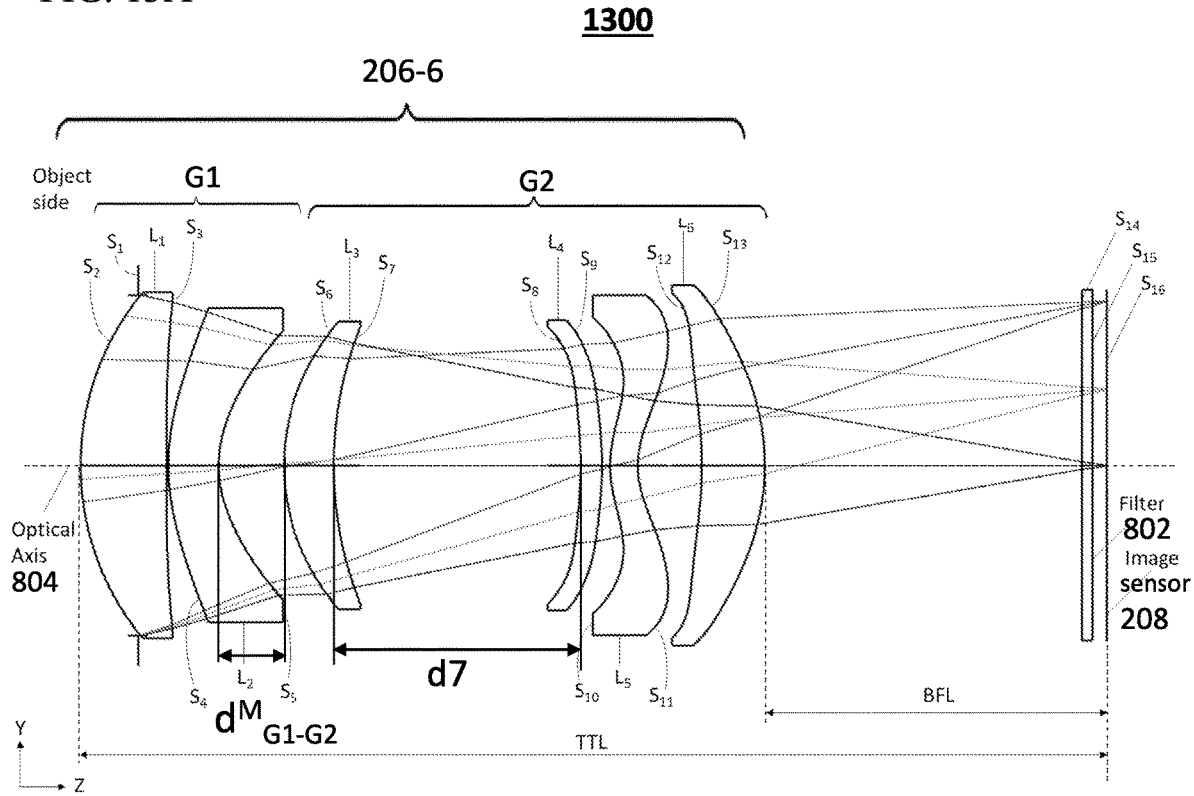
FIG. 13B shows the lens system of FIG. 13A in a second, Macro pop-out lens state.

FIG. 13A-B show a lens system 1300 in two pop-out states. Lens system 1300 comprises a sixth embodiment of a lens 206-6. FIG. 13A shows lens system 1300 in a Tele lens state focused at infinity ("Config. A"). FIG. 13B shows lens system 1300 in a Macro lens state focused at 5 cm ("Config. C"). Lens 206-6 comprises two lens groups G1 (L1-L2) and G2 (L3-L6), separated by an air-gap $d_{G1\text{-}G2}$. Lens system 1300 may be able to focus continuously from infinity to e.g. 5 cm. For focusing lens 206-6, $d_{G1\text{-}G2}$ and the BFL are changed. The TTL changes continuously and depending on u from TTL=15.8 mm (focus at infinity) to TTL=20.4 mm (focus at 5 cm). I.e. for focusing, there is a relative movement of G1 and G2 and in addition a movement of G1 and G2 together (see Table 20).

In the Tele state (see FIG. 13A) having ZF1 and being focused at infinity, lens 206-6 has F/#=1.3-1.9, $EFL_T$=15 mm and TTL=15.8 mm. In the Tele state, $d^T_{G1\text{-}G2}$=2.625 mm (i.e. T5, the distance between $S_5$ and $S_6$ in Table 20) and BFL=0.844 mm. 206-6 may be switched to further zoom states continuously or discretely (having particular ZF2 or ZF3) by modifying $d_{G1\text{-}G2}$ and/or BFL.

In the Macro configuration (see FIG. 13B) with focus at 5 cm, 206-6 has F/#=1.5-2.6, $EFL_M$=15 mm and TTL=20.4 mm. In the Macro state, $d^M_{G1\text{-}G2}$=1.303 mm and BFL=6.818 mm. AM of about 2.5:1 is achieved.

In a collapsed state with a collapsed c-TTL, G1 may be separated from G2 by e.g. c-$d_{G1\text{-}G2}$=0.02-1.5 mm and L3 may be separated from L4 by c-$d_7$=0.02-2.5 mm. A c-TTL of lens system 1200 may be 9.5-13.5 mm.

In other examples, when switching between a pop-out state and a collapsed state only $d_7$ may be modified to c-$d_7$=0.02-2.5 mm and $d_{G1\text{-}G2}$ may not change. In yet other examples, when switching between a pop-out state and a collapsed state only $d_{G1\text{-}G2}$ may be modified to c-$d_{G1\text{-}G2}$=0.02-1.5 mm $d_7$ may not change.

The lens system 1300 is represented by Tables 18-21. FOV is given as half FOV (HFOV). Table 18 and Table 19 provide optical data for lens 206-5 being in pop-out state. Table 20 provides aspheric data.

Table 20 shows three focus configurations of lens system 1300: focused to infinity ("Config. A"), focused to 100 mm ("Config. B", no Figure shown) and focused to 50 mm ("Config. C"). The u which is focused on is given by Surface 0 in Table 20. Table 21 provides data on the half FOV (HFOV), M and f/#. Lens system 1300 can focus continuously from Infinity to 50 mm. For changing focus of lens system 1300 continuously, the values of $d_{G1\text{-}G2}$ and BFL change continuously.

TABLE 18

Embodiment 1300
EFL = 15.0 mm, F number = 2.2, HFOV = 13.1 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S | Plano | Infinity | −1.138 | 3.394 | | | | |
| 2 | Lens 1 | ASP | 5.548 | 1.713 | 3.399 | Plastic | 1.53 | 55.66 | 10.11 |
| 3 | | | −225.776 | 0.031 | 3.268 | | | | |
| 4 | Lens 2 | ASP | 4.454 | 1.000 | 3.084 | Plastic | 1.64 | 23.52 | −9.96 |
| 5 | | | 2.401 | 2.625 | 2.627 | | | | |
| 6 | Lens 3 | ASP | 4.197 | 1.000 | 2.722 | Plastic | 1.53 | 55.66 | 15.25 |
| 7 | | | 7.888 | 4.910 | 2.661 | | | | |
| 8 | Lens 4 | ASP | −6.881 | 0.435 | 2.717 | Plastic | 1.66 | 20.37 | 1841.21 |
| 9 | | | −7.016 | 0.162 | 2.848 | | | | |
| 10 | Lens 5 | ASP | 2.335 | 0.551 | 2.906 | Plastic | 1.53 | 55.66 | −24.20 |
| 11 | | | 1.816 | 1.274 | 3.339 | | | | |
| 12 | Lens 6 | ASP | −7.488 | 1.251 | 3.393 | Plastic | 1.53 | 55.66 | 20.05 |
| 13 | | | −4.675 | 0.344 | 3.546 | | | | |

TABLE 18-continued

Embodiment 1300
EFL = 15.0 mm, F number = 2.2, HFOV = 13.1 deg.

| Surface # | Comment | Type | Curvature Radius | Thickness | Aperture Radius (D/2) | Material | Index | Abbe # | Focal Length |
|---|---|---|---|---|---|---|---|---|---|
| 14 | Filter | Plano | Infinity | 0.210 | — | Glass | 1.52 | 64.17 | |
| 15 | | | Infinity | 0.290 | — | | | | |
| 16 | Image | Plano | Infinity | — | — | | | | |

TABLE 19

Aspheric Coefficients

| Surface # | Conic | A4 | A6 | A8 | A10 |
|---|---|---|---|---|---|
| 2 | −4.21E−01 | 6.50E−04 | −1.01E−05 | 1.56E−06 | −5.69E−08 |
| 3 | −2.24E+02 | 2.36E−03 | −1.58E−04 | 5.38E−06 | −7.57E−08 |
| 4 | −4.52E+00 | −5.19E−04 | 5.31E−05 | −6.85E−06 | 3.53E−07 |
| 5 | −2.24E+00 | 2.21E−03 | 1.61E−05 | −1.54E−06 | 7.95E−07 |
| 6 | −8.98E−03 | −7.71E−05 | −5.52E−05 | 5.85E−06 | −8.17E−07 |
| 7 | 6.54E−01 | 6.97E−04 | −2.34E−05 | −6.13E−07 | −5.58E−07 |
| 8 | −6.59E+01 | 4.55E−03 | −1.90E−03 | 2.62E−05 | 3.32E−06 |
| 9 | −4.32E−01 | 1.47E−02 | −3.66E−03 | 2.57E−04 | −5.76E−06 |
| 10 | −4.54E+00 | −2.21E−02 | −1.28E−03 | 3.91E−04 | −2.22E−05 |
| 11 | −1.73E+00 | −3.64E−02 | 4.33E−03 | −2.94E−04 | 6.72E−06 |
| 12 | −2.40E+01 | 1.32E−03 | 3.07E−04 | −3.67E−05 | −4.21E−07 |
| 13 | −1.13E+00 | 6.63E−04 | −3.99E−04 | 6.48E−05 | −3.13E−06 |

TABLE 20

Embodiment 1300
Variation of surface thicknesses

| Surface # | Config. A | Config. B | Config. C |
|---|---|---|---|
| 0 | 1.00E+06 | 100 | 50 |
| 5 | 2.625 | 1.946 | 1.303 |
| 13 | 0.344 | 2.941 | 6.318 |

TABLE 21

Embodiment 1300

| Config. # | HFOV | Magnification | f/# |
|---|---|---|---|
| A | 13.1 deg | 0 | 1.2-1.9 |
| B | 11.3 deg | −0.17 | 1.3-2.2 |
| C | 9.3 deg | −0.40 | 1.7-2.5 |

The focusing range of some examples of lens systems such as 800, 850, 900, 1000, 1100, 1200 and 1300 may be from infinity to less than 150 mm, from infinity to e.g. 1 m or 2 m, and from e.g. 350 mm to less than 150 mm, e.g. to 50 mm. The focusing range of a lens system is defined as all u that can be focused to by means of a camera mechanism that controls the distance between lens and image sensor. That is, for each object that is located within the focus range, a focusing mechanism can set a particular v that results in maximum contrast for the object's image. Maximum contrast means that for lens-image sensor distances other than the particular lens-image sensor distance, the object's contrast will decrease. A minimal object distance (MIOD) is defined as the lower limit of the focusing range, i.e. the MIOD is the smallest u that the lens system can focus to. For example, some embodiments shown above can focus from infinity to 50 mm, i.e. MIOD is 50 mm.

Figure 14A:
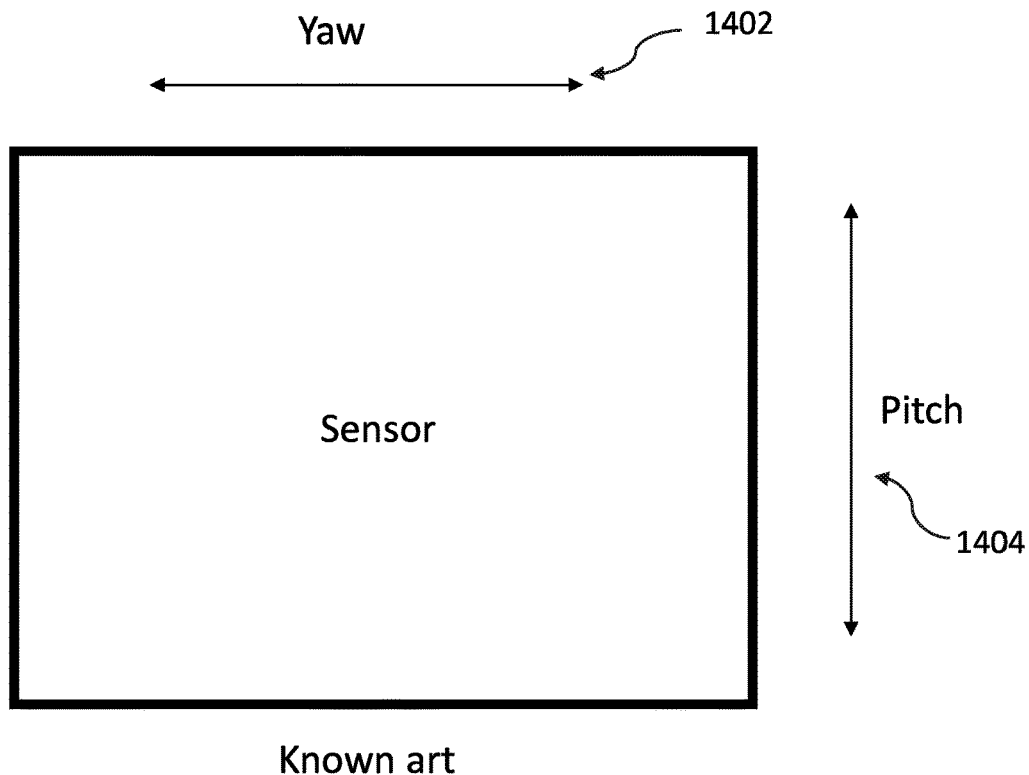
FIG. 14A shows a known sensor shift setup.

FIG. 14A shows a known sensor shift setup. The sensor is shown from a viewing point on the camera's optical axis (camera not shown). Most of today's mobile devices equipped with OIS correct for undesired device motion in Yaw and Pitch directions. As indicated by arrow 1402, for correction in Yaw direction, the sensor is moved parallel to X. As indicated by arrow 1404, for Pitch correction, the sensor is moved parallel to Y.

Figure 14B:
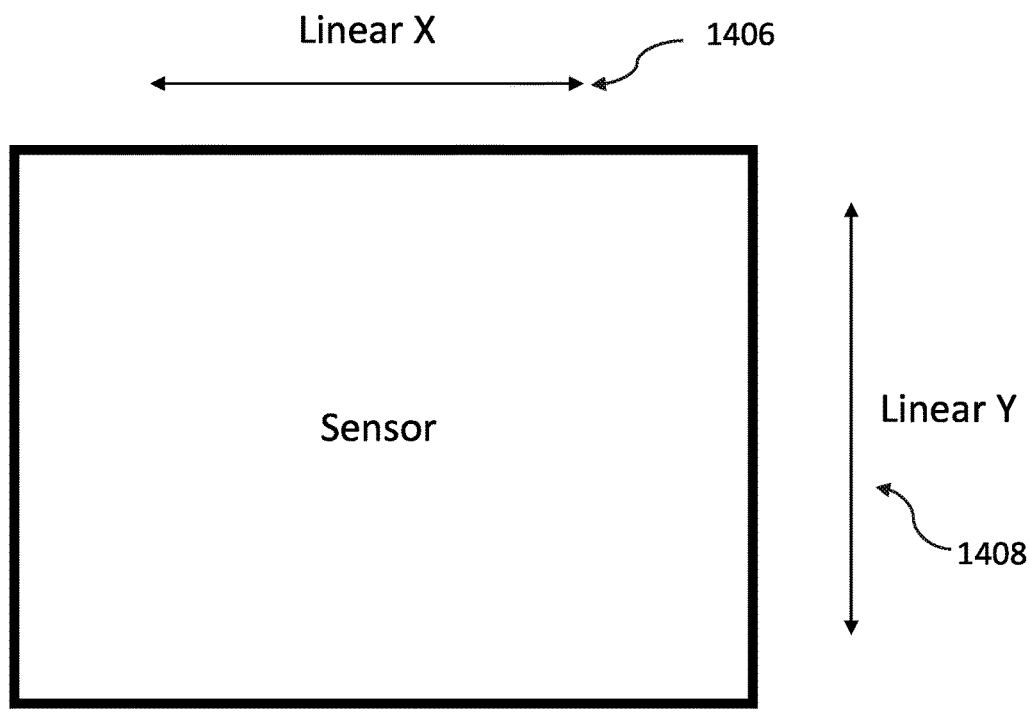
FIG. 14B shows a sensor shift setup disclosed herein.

FIG. 14B shows a sensor shift setup disclosed herein. The sensor is shown in the same perspective as in FIG. 14A. As shown in FIG. 14B, a correction of undesired linear motion in X (indicated by arrow 1406) and Y direction (indicated by arrow 1408) may be performed along the same axes used for Yaw and Pitch correction respectively. Correction for undesired linear motion in X and Y may be superposed on correction of rotational hand motion in Yaw and Pitch.

Figure 15A:
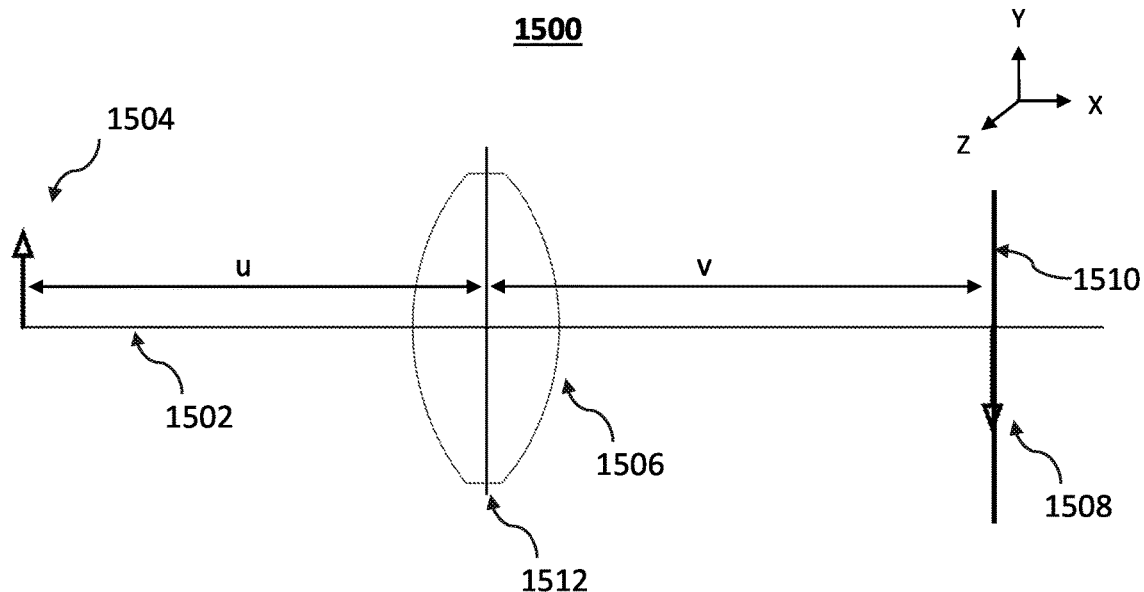
FIG. 15A shows an exemplary optical system at an initial time, e.g. when starting image sensor exposure for image capture.

FIG. 15A shows an exemplary optical system 1500 having an optical axis 1502 parallel to X that comprises an object 1504, a lens 1506 and an image 1508 of object 1504 formed at an image sensor 1510. Lens 1506 may have a principal plane 1512. FIG. 15A shows optical system 1500 at an initial time, e.g. when starting image sensor exposure for image capture. Optical system 1500 has a M of 1:1.

Figure 15B:
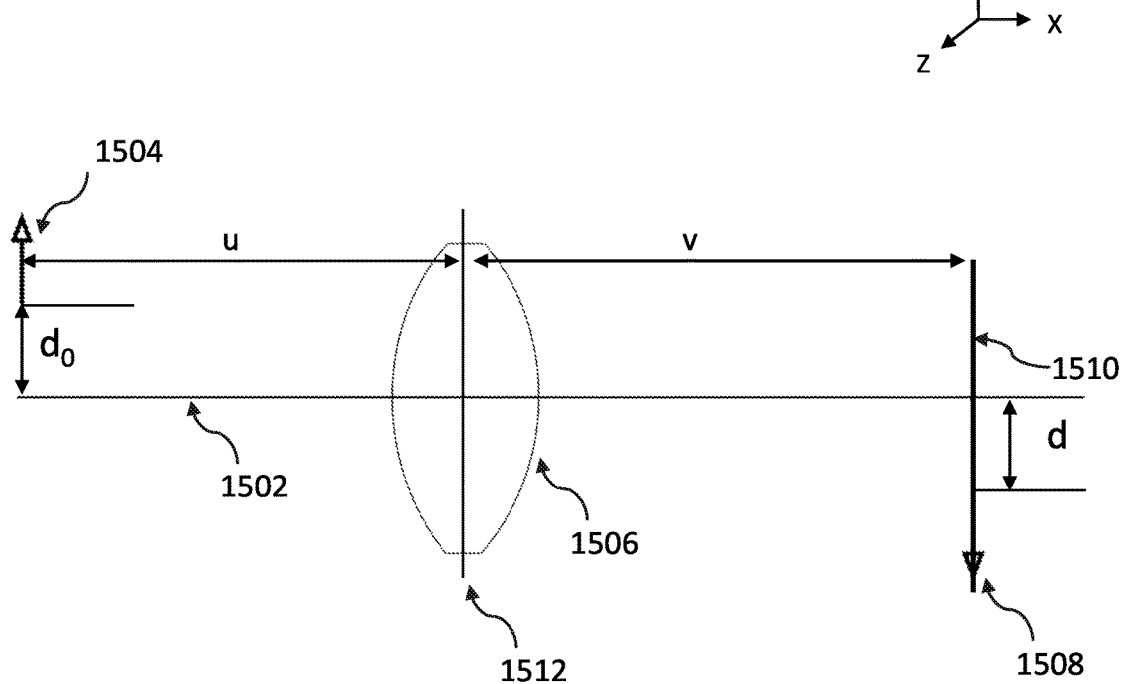
FIG. 15B shows the optical system of FIG. 15A at a later time during exposure of its image sensor for image capture and after the camera hosting handheld device underwent an undesired linear motion in the negative Y direction by a distance do relative to an object at rest.

FIG. 15B shows optical system 1500 at a later time during exposure of image sensor 1510 for image capture and after the camera hosting device underwent an undesired linear motion in the negative Y direction by a distance do (relative to the object at rest). The undesired linear motion results in a linear shift of an object point in the positive Y direction by a distance do. On image sensor 1510, this results in a linear image shift in the negative Y direction by a distance d and eventually in image blurring. d does not only depend on the magnitude and direction of the actual undesired linear motion, but also on u: on image sensor 1510, the actual undesired linear motion is amplified or attenuated according to $$M = \frac{v}{u}$$

with u and v. According to eq. 2, $d_{sensor}$ relates to do according to:

$$d_{sensor} = d_0 \frac{EFL}{u - EFL}. \quad \text{(Eq. 3)}$$

From eq. 3 we learn that for a typical image capture scenario for a Wide camera (Wide example: EFL=5 mm, u>10 cm) or a Tele camera (Tele example: EFL=13 mm, u>100 cm) a linear shift at the object plane do leads to a linear shift $d_S$ at image sensor 1510 of $d_S \approx 0.05 \cdot d_0$ for the Wide example (u=10 cm) and $d_S \approx 0.01 \cdot d_0$ for the Tele example (u=100 cm). In general, it is assumed that u>>EFL and that an undesired linear motion such as do does not deteriorate image quality significantly. However, this assumption is not valid for cameras with large magnifications M such as the pop-out camera in Macro configuration described herein. Consider as an example a Tele camera having EFL=13 mm that is focused to u=10 cm (first Macro example: EFL=13 mm, u=10 cm) and u=5 cm object-lens distance (second Macro example: EFL=13 mm, u=5 cm). For the first Macro example $d_S \approx 0.15 \cdot d_0$, for the second Macro example $d_S \approx 0.35 \cdot d_0$. This shows that significant image quality deterioration caused by undesired linear motion in X and Y is expected. An undesired linear motion of a handheld device may be sensed by a motion sensor such as an inertial measurement unit (IMU). An IMU provides data on the linear acceleration which is to be integrated for determining the linear shift.

Figure 16A:
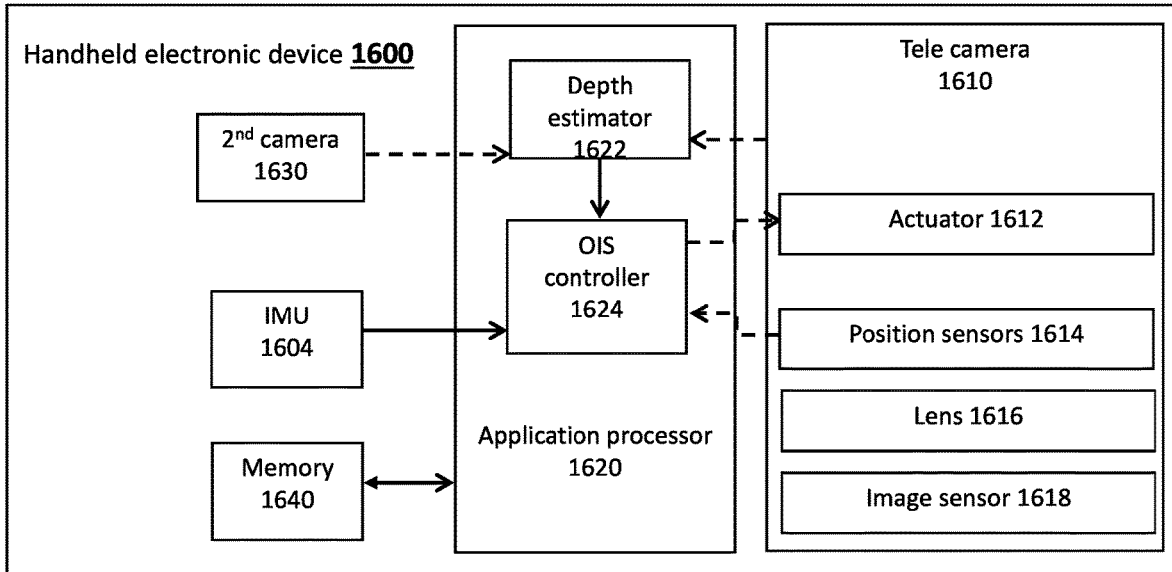
FIG. 16A shows schematically in a block diagram a handheld electronic device operative to perform OIS for correcting undesired linear motion in X and Y directions as described herein.

FIG. 16A shows schematically in a block diagram a device 1600 operative to perform OIS for correcting undesired linear motion in X and Y directions as described herein. Device 1600 comprises a Tele camera 1610 having $FOV_T$. In some examples, camera 1610 is a Macro capable (upright) pop-out camera. In other examples, camera 1610 is a Macro capable folded or upright Tele camera. Tele camera 1610 comprises of an actuator 1612 and a position sensor 1614 (e.g. a Hall sensor) for closed loop actuation and control, a lens 1616 and an image sensor 1618. If Tele camera 1610 is a pop-out camera, lens 1616 may comprise a collapsible lens. If Tele camera 1610 is a folded camera, it may comprise an optical path folding element (OPFE, not shown) for folding an optical path, in general by 90 degrees. If Tele camera 1610 is a double-folded camera, it may comprise two OPFEs (not shown) for folding an optical path twice, in general by 90 degrees per folding. OIS may be performed as "lens shift" OIS or as "sensor shift" OIS. In a folded Tele camera, OIS may be performed as "prism OIS", i.e. the one or two OPFEs may be rotated or moved linearly for performing OIS as described herein. For sensor shift OIS, image sensor 1618 is moved relative to lens 1616 and to device 250. For sensor shift OIS, a sensor shift by $d_S$ is required for correcting an undesired linear motion by do as given by eq. 3. In lens shift OIS, the lens is moved relative to image sensor 1618 and to device 250. For lens shift OIS a lens shift by $d_L$ is required for correcting an undesired linear motion by do. Lens shift $d_L$ depends on $d_S$ (eq. 4) and do (eq. 5) according to:

$$d_{Lens} = d_{sensor} \frac{u}{u+v} \quad \text{(Eq. 4)}$$

and $$d_{Lens} = d_0 \frac{EFL}{u} \quad \text{(Eq. 5)}$$

In other examples, OIS may be performed by moving the entire Tele camera, i.e. the Tele camera's components such as lens, image sensor etc. do not move relative to each other for performing OIS, but they move together relative to device 1600. Device 1600 comprises an application processor (AP) 1620 that includes a depth estimator 1622, an OIS controller 1624 and a microcontroller unit (MCU, not shown). Device 1600 further comprises an IMU 1604, at least one second camera 1630 and a memory 1640. The MCU may be used to read and process data of IMU 1604. In some examples, the MCU may be controlled by an OIS controller 1624 which is part of AP 1620. Camera 1630 may e.g. be a W camera or an UW camera. $FOV_W$ may e.g. be 60-90 degrees, $FOV_{UW}$ may e.g. be 90-130 degrees. In other examples, 1600 may comprise additional cameras. The additional cameras may e.g. be a W camera, an UW camera, an additional Tele camera, a Time of Flight (ToF) camera. Memory 1640 may e.g. be a NVM (non-volatile memory) used to store calibration data. Calibration data may e.g. be for calibration between Tele camera 1610 and second camera 1630. In other examples, calibration data may be stored in memory element 1640 and/or in additional memory elements (not shown). The additional memory elements may be integrated in the camera 1610 and in the second camera 1630 or only in one of the camera modules and may be EEPROMs (electrically erasable programmable read-only memory). Memory 1640 may also store image data, depth data or metadata of a specific scene, scene segment or object. Metadata may e.g. be one or more depth values.

Figure 16B:
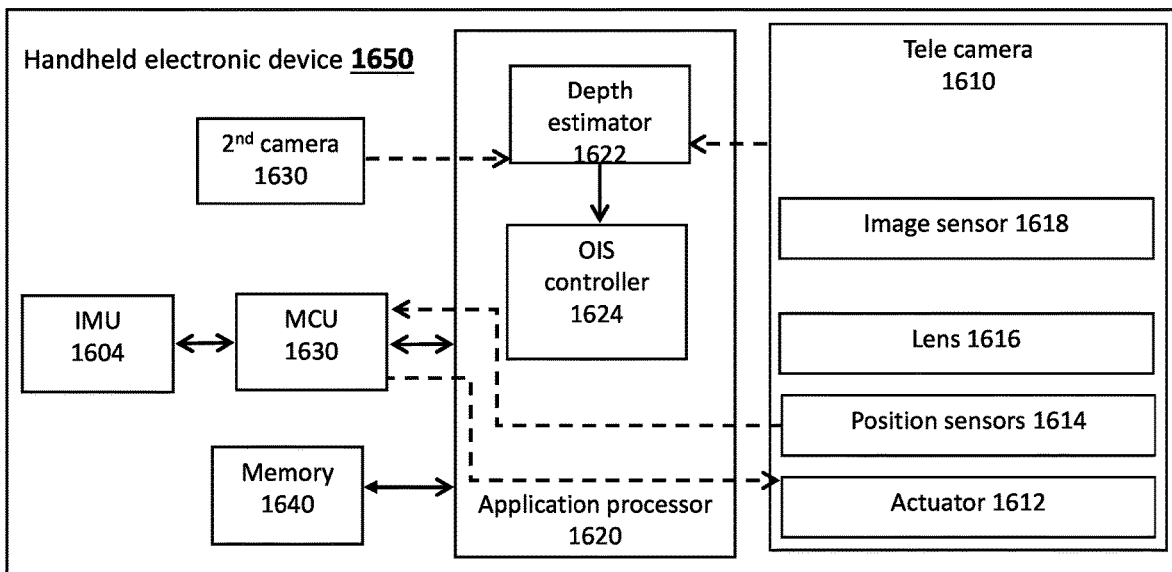
FIG. 16B shows schematically in a block diagram another handheld electronic device operative to perform OIS for correcting undesired linear motion in X and Y directions as described herein.

Another example of a device numbered 1650 and operative to perform OIS for correcting undesired linear motion in X and Y direction as described herein is shown in FIG. 16B. Device 1650 includes a MCU 1630 which is configured for reading and processing motion data provided by IMU 1604 and for reading and supplying OIS control signals to the Tele camera 1610, i.e. reading and processing of data from position sensor 1614 and supplying control signals to the driver of actuator 1612.

For depth estimation, image data from Tele camera 1610 or from camera 1630 or from additional cameras or components is transmitted to the depth estimator 1622. Depth estimator 1622 calculates depth as known in the art. In some examples, depth estimator 1622 calculates a depth map of the entire scene covered by $FOV_T$. In other examples, depth estimator 1622 calculates a depth map of the image segments of the scene that include a specific object of interest (OOI) or object of interest (ROI). In yet other examples, depth estimator 1622 calculates a single value only, whereas the single value corresponds to a depth range of an object in focus. In yet other examples, depth information may be provided by a laser range finder ("Laser AF") which performs a Time-of-Flight measurement. Image data transmitted to the depth estimator 1622 may e.g. be:

Phase detection auto focus (PDAF) data from the second camera 1630;
PDAF data from the Tele camera 1610;
Stereo image data, e.g. from Tele camera 1610 and from second camera 1630;
Focus stacking visual image data;
Focus stacking PDAF data;
Visual image data from Tele camera 1610 and/or from second camera 1630 (for estimating depth from defocus);
Visual image data from Tele camera 1610 and/or from second camera 1630 (for estimating depth from object motion);
Depth data from second camera 1630 that may be a Time of Flight (ToF) camera.

In some examples, visual image data from Tele camera 1610 and/or from camera 1630 may be used to estimate depth from motion, e.g. from a pre-view video stream comprising a plurality of images. Depth from motion may be estimated by turning OIS off, estimating do between two or more frames from IMU information, estimating $d_S$ from the movement of an image point between two or more frames and estimating u according to eq. 3.

OIS controller 1624 receives data on the linear acceleration of device 1600 from IMU 1604 and depth data on u of the object in focus (or larger segments of the scene) from depth estimator 1622. For OIS on undesired linear motion in X and Y, OIS controller 1624 and/or a MCU such as MCU

1630 estimates do from the IMU's data on linear acceleration and calculates $d_S$ or $d_L$ for sensor shift OIS or lens shift OIS respectively according to eq. 3 or eq. 5 respectively. OIS controller 1624 and/or MCU 1630 transmit control signals to actuator 1612. Actuator 1612 may actuate an image sensor for sensor shift OIS and/or a lens for lens shift OIS. OIS controller 1624 and/or MCU 1630 receive data on the position of lens 1616 (for lens shift OIS) or image sensor 1618 (for sensor shift OIS) from position sensors 1614 for performing closed loop control.

In all the lens examples, the EFL of the entire G1 group is marked $EFL_{G1}$ (or "EFL(G1)"), the EFL of the entire G2 group is marked $EFL_{G2}$ and focal lengths of individual lens elements are marked by the element number, i.e. the power of L1 is marked $f_1$ the focal length of L2 is marked $f_2$, etc.

A mean glass thickness ("MGT") of a lens group or an entire lens is defined by the average thickness of the single lens elements it includes. The mean glass thickness of a group, e.g. G1, is marked "MGT(G1)", while the mean glass thickness of an entire lens is marked "MGT".

A mean air gap ("MAG") of a lens group or an entire lens is defined by the average thickness of the air gaps along the optical axis between the single lens elements within its lens groups G1 and G2. This means that calculating the mean air gap takes into account only intra-lens group distances but not distances between lens groups. Specifically BG, BG1, BG2 and BFL are not considered for calculating MAG. The mean air gap of a group, e.g. G1, is marked "MAG(G1)", while the mean air gap of an entire lens marked "MAG".

All pop-out optical lens systems described below may be focused by moving an entire lens with respect to an image sensor.

Table 22 summarizes values and ratios thereof of various features that are included in the lens systems shown above and in the following (TTL, c-TTL, EFL, f, BG, c-BG, BFL, c-BFL, TG1, TG2, T1, T3, MGT, MAG given in mm, H-FOV given in degrees). For c-TTL, a minimum value is given. "P-O method" refers to the method used for switching the respective lens system between a pop-out and a collapsed state, wherein the number "i" refers to the i-th method embodiment (e.g. "1" refers to switching according to a $1^{st}$ method embodiment, "2" refers to switching according to a $2^{nd}$ method embodiment, etc.).

TABLE 22

|  | 1700 | 1800 | 1900 | 2000 | 2100 | Min. value | Max. value |
|---|---|---|---|---|---|---|---|
| TTL | 12.50 | 10.86 | 12.50 | 12.50 | 12.50 | 10.86 | 12.50 |
| c-TTL | 7.78 | 7.08 | 7.80 | 8.13 | 7.50 | 7.08 | 8.13 |
| EFL | 13.90 | 11.94 | 14.60 | 14.70 | 13.90 | 11.94 | 14.70 |
| BG | 0.97 | 0.58 | 3.32 | 3.53 | 1.58 | 0.58 | 3.53 |
| c-BG | 0.97 | 0.58 | 0.75 | 1.00 | 0.20 | 0.20 | 1.00 |
| BFL | 5.52 | 5.00 | 2.88 | 2.60 | 0.85 | 0.85 | 5.52 |
| c-BFL | 0.81 | 1.21 | 0.75 | 0.75 | 0.85 | 0.75 | 1.21 |
| TG1 | 3.68 | 2.76 | 3.73 | 3.91 | 3.46 | 2.76 | 3.91 |
| TG2 | 2.33 | 2.54 | 2.57 | 2.47 | 2.14 | 2.14 | 2.57 |
| H-FOV | 13.40 | 16.80 | 12.80 | 12.70 | 13.50 | 12.70 | 16.80 |
| EFL(G1) | 11.71 | 8.57 | 10.29 | 10.31 | 9.95 | 8.57 | 11.71 |
| EFL(G2) | −34.58 | −16.24 | −12.44 | −13.01 | −13.32 | −34.58 | −12.44 |
| T1 | 2.30 | 1.25 | 2.08 | 2.12 | 1.44 | 1.25 | 2.30 |
| T3 | 0.30 | 1.23 | 0.27 | 0.28 | 0.31 | 0.28 | 1.23 |
| Lens power sequence | ++−−−+ | +−+−−−+ | ++−−+− | ++−+−+ | ++−−−+− |  |  |
| MGT(G1) | 1.19 | 0.90 | 1.21 | 0.94 | 1.09 | 0.90 | 1.21 |
| MGT(G2) | 0.36 | 0.28 | 0.45 | 0.53 | 0.37 | 0.28 | 0.53 |
| MGT | 0.77 | 0.59 | 0.83 | 0.73 | 0.73 | 0.59 | 0.83 |
| MAG(G1) | 0.06 | 0.03 | 0.04 | 0.05 | 0.10 | 0.03 | 0.10 |
| MAG(G2) | 0.63 | 0.47 | 0.60 | 1.42 | 0.52 | 0.47 | 1.42 |
| MAG | 0.34 | 0.25 | 0.32 | 0.73 | 0.31 | 0.25 | 0.73 |
| BFL/c-BFL | 6.81 | 4.13 | 3.84 | 3.47 | 1.00 | 1.00 | 6.81 |
| EFL(G1)/EFL(G2) | −0.34 | −0.53 | −0.83 | −0.79 | −0.75 | −0.83 | −0.34 |
| EFL(G1)/EFL | 0.84 | 0.72 | 0.70 | 0.70 | 0.72 | 0.70 | 0.84 |
| EFL(G2)/EFL | −2.49 | −1.36 | −0.85 | −0.89 | −0.96 | −2.49 | −0.85 |
| BG/TTL | 0.08 | 0.05 | 0.27 | 0.28 | 0.13 | 0.05 | 0.28 |
| BFL/TTL | 0.44 | 0.46 | 0.23 | 0.21 | 0.07 | 0.07 | 0.46 |
| c-TTL/TTL | 0.62 | 0.65 | 0.62 | 0.65 | 0.60 | 0.60 | 0.65 |
| TG1/TTL | 0.29 | 0.25 | 0.30 | 0.31 | 0.28 | 0.25 | 0.31 |
| TTL/EFL | 0.90 | 0.91 | 0.86 | 0.85 | 0.90 | 0.85 | 0.91 |
| T1/TTL | 0.18 | 0.12 | 0.17 | 0.17 | 0.12 | 0.12 | 0.18 |
| T1/MGT | 2.99 | 2.12 | 2.55 | 2.90 | 1.97 | 1.97 | 2.99 |
| T1/T3 | 7.67 | 1.02 | 5.17 | 5.17 | 4.65 | 1.02 | 7.67 |
| TG1/(TTL-BFL) | 0.53 | 0.47 | 0.39 | 0.39 | 0.30 | 0.30 | 0.53 |
| MGT(G1)/MGT | 1.55 | 1.53 | 1.46 | 1.29 | 1.49 | 1.29 | 1.55 |
| MGT(G2)/MGT | 0.47 | 0.47 | 0.54 | 0.73 | 0.51 | 0.47 | 0.73 |
| MGT(G1)/MGT(G2) | 3.31 | 3.21 | 2.69 | 1.77 | 2.95 | 1.77 | 3.31 |
| MAG/MAG(G1) | 5.67 | 8.33 | 8.00 | 14.60 | 3.10 | 3.10 | 14.60 |
| MAG/MAG(G2) | 0.54 | 0.53 | 0.53 | 0.51 | 0.60 | 0.51 | 0.60 |
| MAG(G2)/MAG(G1) | 10.50 | 15.67 | 15.00 | 28.40 | 5.20 | 5.20 | 28.40 |
| MAG/MGT | 0.44 | 0.42 | 0.39 | 1.00 | 0.42 | 0.39 | 1.00 |
| MAG(G1)/MGT(G1) | 0.05 | 0.03 | 0.03 | 0.05 | 0.09 | 0.03 | 0.09 |
| MAG(G2)/MGT(G2) | 1.75 | 1.68 | 1.33 | 2.68 | 1.41 | 1.33 | 2.68 |
| P-O method | 2 | 2 | 3 | 3 | 4 |  |  |

|  | 800 | 850 | 900 | 1000 | 1100 Tele | 1100 Macro | 1200 Tele | 1200 Macro | 1300 Tele | 1300 Macro | MIN | MAX |
|---|---|---|---|---|---|---|---|---|---|---|---|---|
| TTL | 19.84 | 13.50 | 7.78 | 15.00 | 15.00 | 20.90 | 15.00 | 20.90 | 15.80 | 20.40 | 7.78 | 20.90 |

TABLE 22-continued

| | | | | | | | | | | | | |
|---|---|---|---|---|---|---|---|---|---|---|---|---|
| c-TTL | 12.60 | 5.00 | 3.60 | 6.20 | 8.50 | 8.50 | 8.90 | 8.90 | 9.50 | 9.50 | 3.60 | 12.60 |
| EFL | 13.00 | 15.15 | 7.97 | 16.00 | 14.98 | 14.80 | 15.00 | 9.80 | 15.00 | 15.00 | 7.97 | 16.00 |
| BG | 6.22 | 1.78 | 0.97 | 1.55 | 1.91 | 1.44 | 5.07 | 2.91 | 2.63 | 1.30 | 0.97 | 6.22 |
| BG2 | | | | | | | 4.81 | 9.18 | | | 4.81 | 9.18 |
| BFL | 1.02 | 5.49 | 3.27 | 6.99 | 0.59 | 6.96 | 0.95 | 0.95 | 0.84 | 6.82 | 0.59 | 6.99 |
| BG/TTL | 0.31 | 0.13 | 0.12 | 0.10 | 0.13 | 0.07 | 0.34 | 0.14 | 0.17 | 0.06 | 0.06 | 0.34 |
| BFL/TTL | 0.05 | 0.41 | 0.42 | 0.47 | 0.04 | 0.33 | 0.06 | 0.05 | 0.05 | 0.33 | 0.04 | 0.47 |
| c-TTL/TTL | 0.64 | 0.37 | 0.46 | 0.41 | 0.57 | 0.41 | 0.59 | 0.43 | 0.60 | 0.47 | 0.37 | 0.64 |
| TTL/EFL | 1.53 | 0.89 | 0.98 | 0.94 | 1.00 | 1.41 | 1.00 | 2.13 | 1.05 | 1.36 | 0.89 | 2.13 |
| Number lenses | 8 | 6 | 5 | 5 | 6 | 6 | 6 | 6 | 6 | 6 | 5 | 8 |
| Number lens groups | 2 | 2 | 2 | 2 | 2 | 2 | 3 | 3 | 2 | 2 | 2 | 3 |
| Number collapsible air gaps | 2 | 2 | 2 | 2 | 3 | 3 | 2 | 2 | 2 | 2 | 2 | 3 |
| P-O method | 1 | 2, 3 | 2, 3 | 2, 3 | 4 | 4 | 4 | 4 | 4 | 4 | | |

Figure 17A:
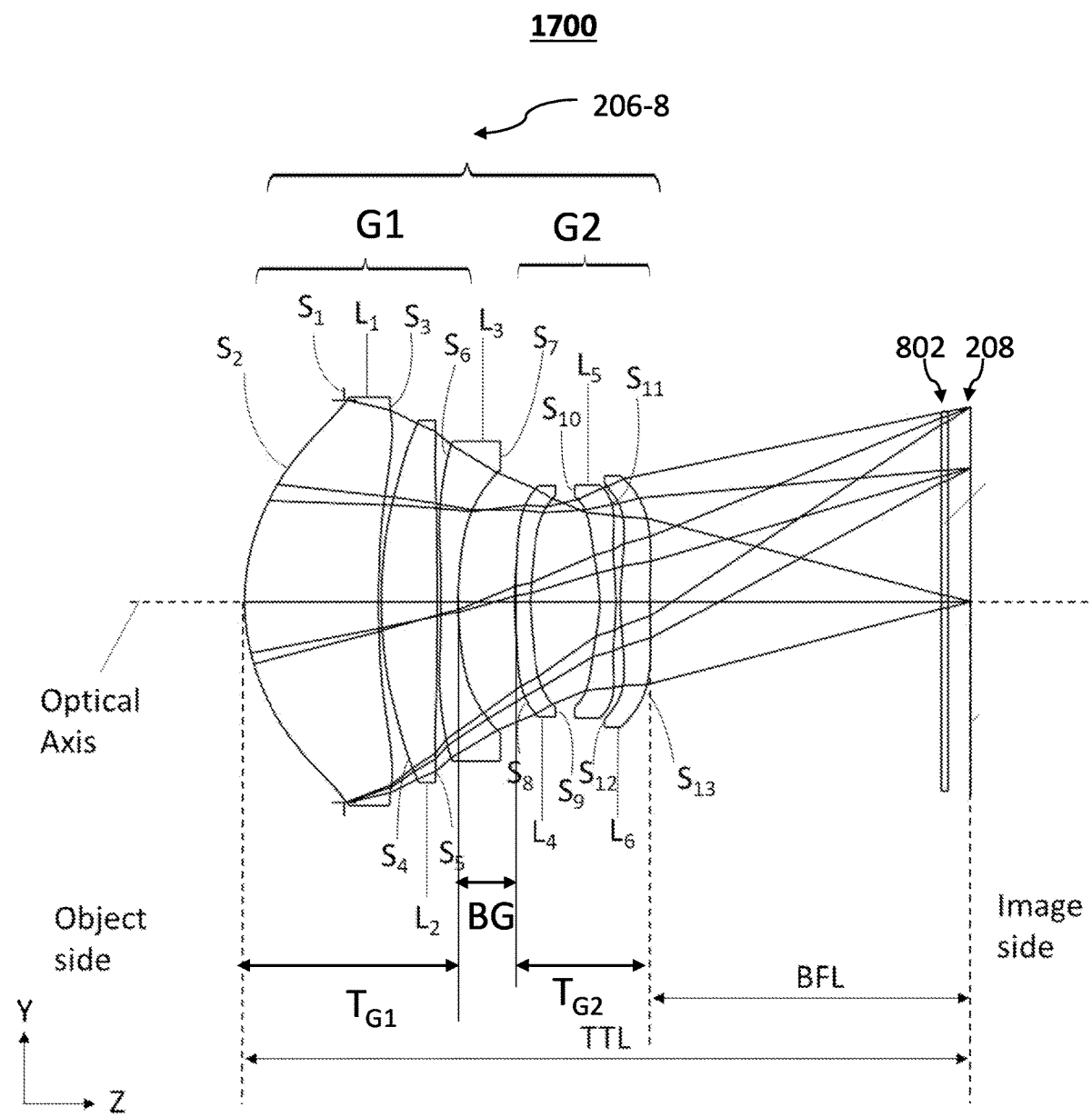
FIG. 17A shows an example of a pop-out optical lens system disclosed herein in a pop-out state.
Figure 17B:
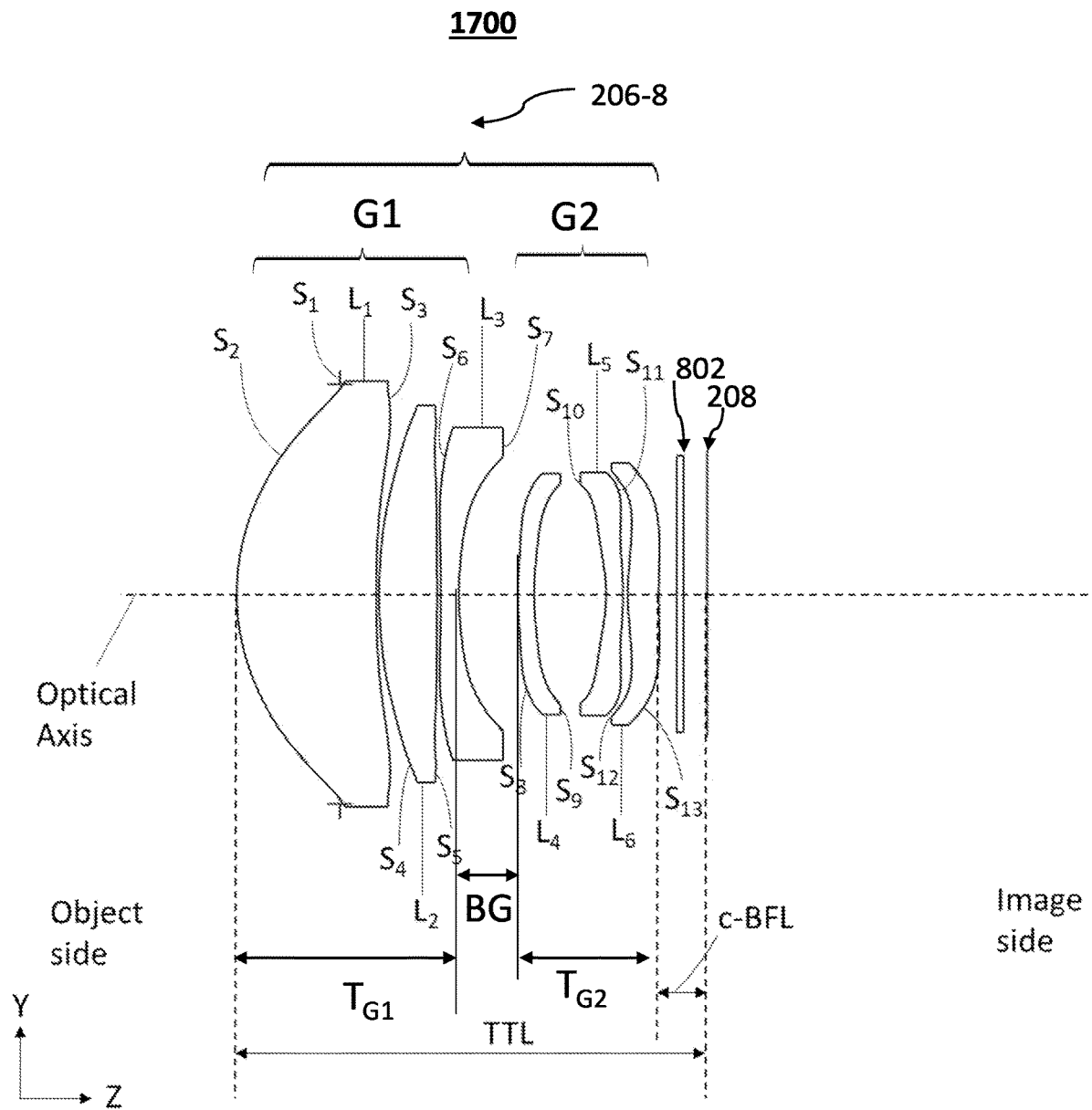
FIG. 17B shows the pop-out optical lens system of FIG. 17A in a collapsed state.

FIG. 17A shows an example of a pop-out optical lens system disclosed herein and numbered 1700 in a pop-out state. Lens system 1700 comprises a pop-out lens 206-8 divided into two lens groups G1 and G2, an image sensor 208 and, optionally, an optical element ("window") 802. FIG. 17B shows pop-out optical lens system 1700 in a collapsed state.

Optical element 802 may be for example infra-red (IR) filter, and/or a glass image sensor dust cover. Optical rays pass through lens 206-8 and form an image on image sensor 208. FIG. 17A shows 3 fields with 3 rays for each: the upper marginal-ray, the lower marginal-ray and the chief-ray. All further figures show these 3 rays as well.

Detailed optical data and surface data for pop-out lens 206-8 are given in Tables 23-26. Table 23 provides surface types, Table 24 provides aspheric coefficients, and Table 25 shows the BFL ("T") for lens 206-8 being in a pop-out state and c-BFL for lens 206-8 being in a collapsed state. Table 26 shows the distance of a first, second and third deflection point ("DP1", "DP2" and "DP3") respectively from the optical axis for lens elements $L_{N-1}$ and $L_N$. The surface types are:
a) Plano: flat surfaces, no curvature
b) Q type 1 (QT1) surface sag formula:

$$z(r) = \frac{cr^2}{1 + \sqrt{1-(1+k)c^2 r^2}} + D_{con}(u) \quad \text{(Eq. 1)}$$

$$D_{con}(u) = u^4 \sum_{n=0}^{N} A_n Q_n^{con}(u^2)$$

-continued $$u = \frac{r}{r_{norm}}, x = u^2$$

$$Q_0^{con}(x) = 1 \quad Q_1^{con} = -(5-6x) \quad Q_2^{con} = 15 - 14x(3-2x)$$

$$Q_3^{con} = -\{35 - 12x[14 - x(21-10x)]\}$$

$$Q_4^{con} = 70 - 3x\{168 - 5x[84 - 11x(8-3x)]\}$$

$$Q_5^{con} = -[126 - x(1260 - 11x\{420 - x[720 - 13x(45-14x)]\})]$$

where {z, r} are the standard cylindrical polar coordinates, c is the paraxial curvature of the surface, k is the conic parameter, $r_{norm}$ is generally one half of the surface's clear aperture (CA), and $A_n$ are the aspheric coefficients shown in lens data tables. The Z axis is positive towards image. Values for CA are given as a clear aperture radius, i.e. D/2. The reference wavelength is 555.0 nm. Units are in mm except for refraction index ("Index") and Abbe #. Each lens element Li has a respective focal length fi, and all lens elements of a group G1 together have a respective focal length fi, both given in Table 23. The FOV is given as half FOV (HFOV). The definitions for surface types, Z axis, CA values, reference wavelength, units, focal length and HFOV are valid for all following Tables.

TABLE 23

EFL = 13.9 mm, F# = 2, HFoV = 13.4 deg, Sensor Height Full Diagonal = 6.5 mm

| Group | Lens | Surface | Type | R [mm] | T [mm] | D/2 [mm] | Nd | Vd | Focal Length [mm] | |
|---|---|---|---|---|---|---|---|---|---|---|
| | Object | $S_0$ | Flat | Infinity | Infinity | | | | | |
| | Stop | $S_1$ | Flat | Infinity | −1.72 | 3.47 | | | | |
| G1 | L1 | $S_2$ | QTYP | 4.64 | 2.31 | 3.47 | 1.54 | 55.99 | 8.56 | 11.71 |
| | | $S_3$ | QTYP | 15.13 | 0.05 | 3.31 | | | | |
| | L2 | $S_4$ | QTYP | 7.31 | 0.96 | 3.09 | 1.51 | 56.81 | 14.08 | |
| | | $S_5$ | QTYP | −851.44 | 0.06 | 2.96 | | | | |
| | L3 | $S_6$ | QTYP | −24.50 | 0.30 | 2.73 | 1.66 | 20.27 | −7.31 | |
| | | $S_7$ | QTYP | 6.11 | 0.97 | 2.25 | | | | |
| G2 | L4 | $S_8$ | QTYP | 4.75 | 0.28 | 2.00 | 1.53 | 56.16 | −67.48 | −34.58 |
| | | $S_9$ | QTYP | 4.11 | 1.19 | 1.83 | | | | |
| | L5 | $S_{10}$ | QTYP | −2.36 | 0.28 | 1.76 | 1.54 | 55.93 | −8.83 | |
| | | $S_{11}$ | QTYP | −4.81 | 0.08 | 1.96 | | | | |
| | L6 | $S_{12}$ | QTYP | 4.07 | 0.51 | 1.98 | 1.66 | 20.37 | 10.38 | |

TABLE 23-continued

EFL = 13.9 mm, F# = 2, HFoV = 13.4 deg, Sensor Height Full Diagonal = 6.5 mm

| Group | Lens | Surface | Type | R [mm] | T [mm] | D/2 [mm] | Nd | Vd | Focal Length [mm] |
|---|---|---|---|---|---|---|---|---|---|
| | | $S_{13}$ | QTYP | 9.40 | See Table 25 | 2.12 | | | |
| Glass window | | $S_{14}$ | Flat | Infinity | 0.11 | | 1.52 | 64.17 | |
| | | $S_{15}$ | Flat | Infinity | 0.39 | | | | |
| Image sensor | | $S_{16}$ | | | | | | | |

Table 24 shows the aspheric coefficients.

TABLE 24

| Surface | Conic (k) | NR | $A_0$ | $A_1$ | $A_2$ | $A_3$ |
|---|---|---|---|---|---|---|
| $S_2$ | 0.00E+00 | 3.74E+00 | 1.05E+00 | −3.12E−01 | 1.88E−02 | 5.78E−02 |
| $S_3$ | 0.00E+00 | 3.34E+00 | −1.17E−01 | −5.93E−02 | −8.16E−03 | 1.01E−02 |
| $S_4$ | 0.00E+00 | 3.28E+00 | −9.90E−02 | −2.37E−03 | −1.87E−02 | −1.24E−02 |
| $S_5$ | 0.00E+00 | 3.08E+00 | −4.11E−02 | 2.68E−02 | −1.53E−02 | −9.81E−03 |
| $S_6$ | 0.00E+00 | 2.80E+00 | 3.89E−01 | −1.16E−02 | −7.22E−03 | 7.80E−03 |
| $S_7$ | 0.00E+00 | 2.18E+00 | 2.09E+00 | 3.99E−02 | −1.44E−02 | 2.71E−03 |
| $S_8$ | 0.00E+00 | 2.19E+00 | −7.23E−02 | 1.77E−01 | −6.07E−02 | −7.24E−03 |
| $S_9$ | 0.00E+00 | 2.00E+00 | −3.32E−02 | 1.14E−01 | −5.52E−02 | −2.03E−02 |
| $S_{10}$ | 0.00E+00 | 1.94E+00 | 5.79E−01 | −2.43E−01 | −2.56E−02 | −3.33E−02 |
| $S_{11}$ | 0.00E+00 | 2.04E+00 | 3.33E−01 | −1.98E−01 | 1.11E−02 | 4.27E−03 |
| $S_{12}$ | 0.00E+00 | 2.25E+00 | −1.23E+00 | 1.41E−02 | −2.02E−02 | 3.84E−03 |
| $S_{13}$ | 0.00E+00 | 2.29E+00 | −9.54E−01 | 2.44E−02 | −1.08E−02 | 3.70E−03 |

| Surface | $A_4$ | $A_5$ | $A_6$ | $A_7$ | $A_8$ |
|---|---|---|---|---|---|
| $S_2$ | −3.56E−02 | 5.97E−03 | 4.36E−03 | −3.56E−03 | 1.04E−03 |
| $S_3$ | −5.46E−03 | 2.97E−03 | −1.43E−03 | 4.94E−04 | −8.28E−05 |
| $S_4$ | −1.87E−02 | 2.49E−03 | −2.79E−03 | 6.86E−05 | 4.79E−05 |
| $S_5$ | −2.40E−02 | 2.79E−03 | −1.11E−03 | 5.21E−04 | −1.37E−04 |
| $S_6$ | −3.11E−03 | −2.70E−04 | 8.21E−04 | −2.32E−04 | 5.68E−05 |
| $S_7$ | 1.70E−03 | −1.06E−03 | −5.85E−05 | 2.45E−05 | 2.71E−05 |
| $S_8$ | −1.53E−02 | −7.79E−03 | −1.79E−03 | −8.27E−04 | −5.60E−05 |
| $S_9$ | −2.15E−02 | −1.26E−02 | −5.18E−03 | −1.83E−03 | −4.49E−04 |
| $S_{10}$ | −1.51E−02 | −7.29E−03 | −1.93E−03 | −5.05E−04 | 5.89E−05 |
| $S_{11}$ | −3.92E−03 | 4.72E−04 | −4.90E−04 | 3.78E−04 | −5.23E−05 |
| $S_{12}$ | −2.17E−02 | −8.24E−03 | −3.14E−03 | 5.49E−04 | −2.74E−04 |
| $S_{13}$ | −5.43E−03 | −2.52E−03 | −1.44E−03 | −2.31E−04 | −1.55E−04 |

TABLE 25

| | | On State (Pop Out) | Off State (Collapsed) |
|---|---|---|---|
| T [mm] | $S_{13}$ | 5.0156 | 0.2144 |

TABLE 26

| | | DP1 [mm] | DP2 [mm] | DP3 [mm] |
|---|---|---|---|---|
| L6 | $S_{12}$ | 0.5001 | 1.6672 | N/A |
| | $S_{13}$ | 0.5902 | N/A | N/A |
| L7 | $S_{14}$ | 2.0629 | N/A | N/A |
| | $S_{15}$ | 0.1689 | 1.1203 | 2.0314 |

Figure 18A:
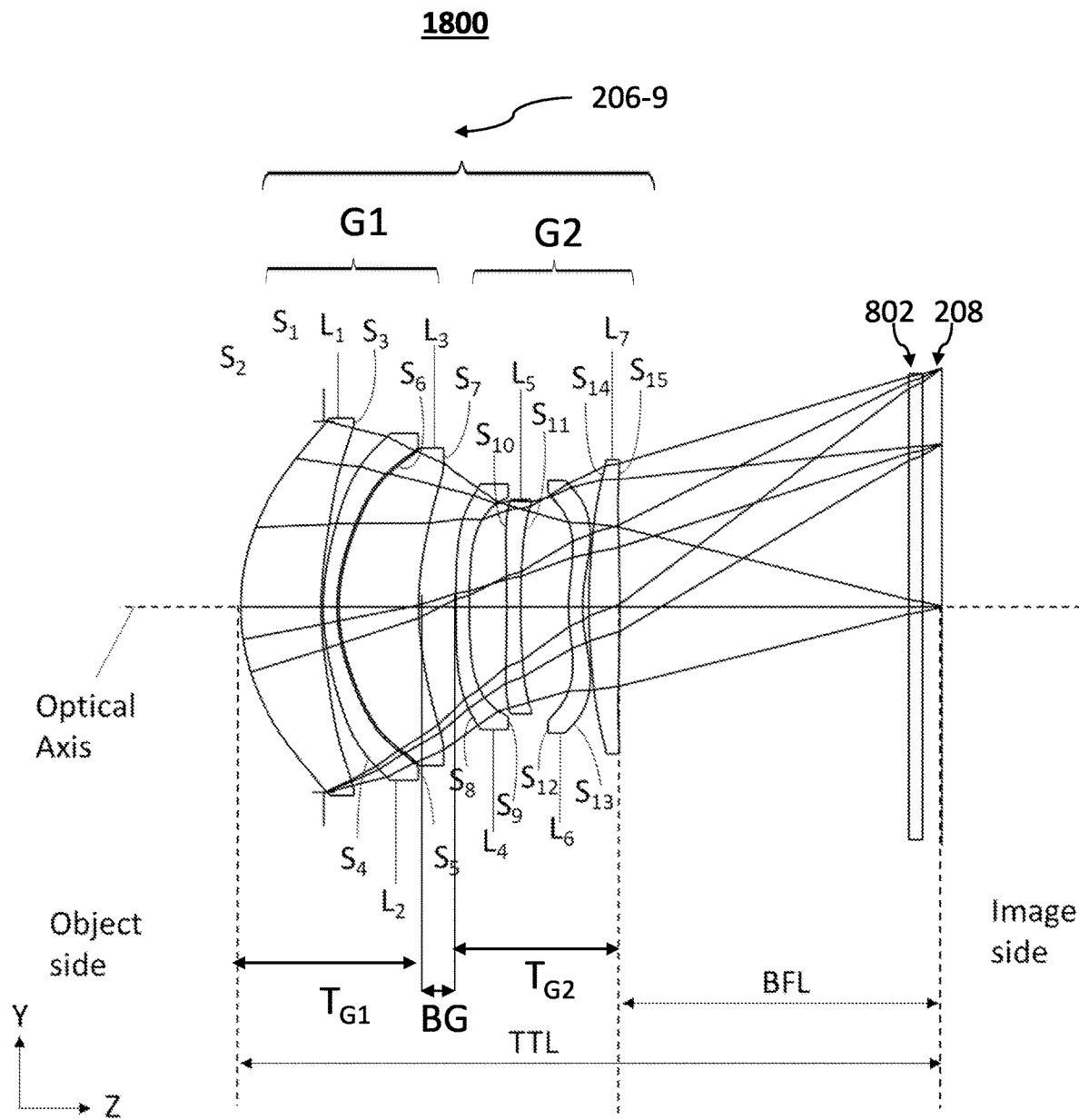
FIG. 18A shows another embodiment of a pop-out optical lens system disclosed herein in a pop-out state.
Figure 18B:
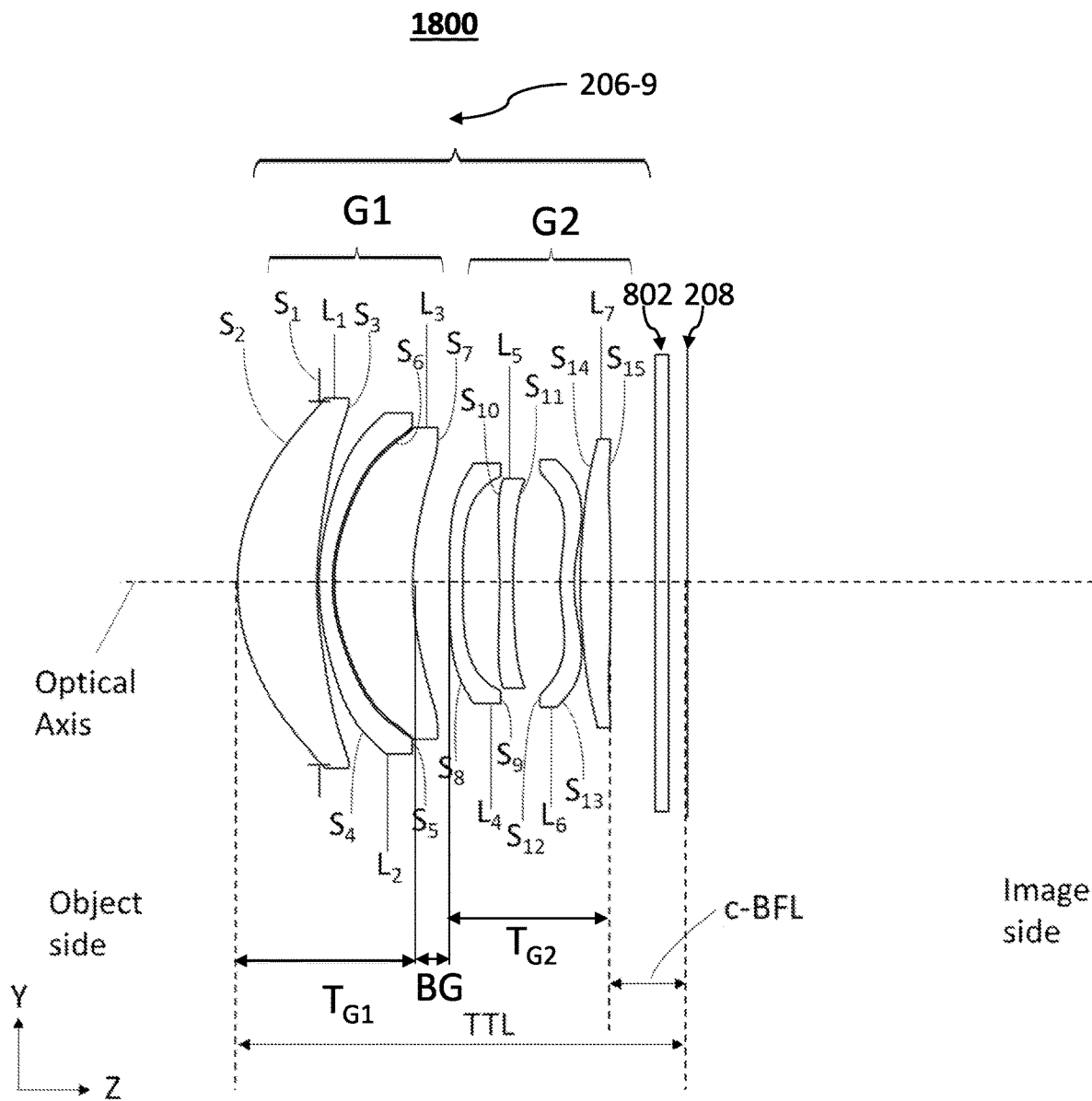
FIG. 18B shows the pop-out optical lens system of FIG. 18A in a collapsed state.

FIG. 18A shows another embodiment of a pop-out optical lens system disclosed herein and numbered 1800. FIG. 18B shows pop-out optical lens system 1800 in a collapsed state. Lens system 1800 comprises a pop-out lens 206-9 divided into two lens groups G1 and G2, an image sensor 208 and, optionally, an optical element 802. Table 27 provides surface types, Table 28 provides aspheric coefficients, Table 29 shows the BFL and c-BFL and Table 30 shows the deflection point distances from the optical axis.

TABLE 27

EFL = 11.94 mm, F# = 2.08, HFoV = 16.8 deg, Sensor Height Full Diagonal = 7 mm

| Group | Lens | Surface | Type | R [mm] | T [mm] | D/2 [mm] | Nd | Vd | Focal Length [mm] |
|---|---|---|---|---|---|---|---|---|---|
| | Object | $S_0$ | Flat | Infinity | Infinity | | | | |
| | Stop | $S_1$ | Flat | Infinity | −1.29 | 2.87 | | | |

TABLE 27-continued

EFL = 11.94 mm, F# = 2.08, HFoV = 16.8 deg, Sensor Height Full Diagonal = 7 mm

| Group | Lens | Surface | Type | R [mm] | T [mm] | D/2 [mm] | Nd | Vd | Focal Length [mm] | |
|---|---|---|---|---|---|---|---|---|---|---|
| G1 | L1 | $S_2$ | QTYP | 3.31 | 1.25 | 2.87 | 1.54 | 55.91 | 13.76 | 8.57 |
| | | $S_3$ | QTYP | 5.11 | 0.03 | 2.77 | | | | |
| | L2 | $S_4$ | QTYP | 3.48 | 0.21 | 2.64 | 1.67 | 19.44 | -17.72 | |
| | | $S_5$ | QTYP | 2.63 | 0.03 | 2.42 | | | | |
| | L3 | $S_6$ | QTYP | 2.61 | 1.23 | 2.41 | 1.54 | 55.91 | 9.48 | |
| | | $S_7$ | QTYP | 4.38 | 0.58 | 2.23 | | | | |
| G2 | L4 | $S_8$ | QTYP | 24.80 | 0.21 | 1.85 | 1.66 | 20.37 | -126.21 | -16.24 |
| | | $S_9$ | QTYP | 19.09 | 0.58 | 1.64 | | | | |
| | L5 | $S_{10}$ | QTYP | -22.16 | 0.21 | 1.65 | 1.64 | 23.53 | -10.42 | |
| | | $S_{11}$ | QTYP | 9.68 | 0.75 | 1.62 | | | | |
| | L6 | $S_{12}$ | QTYP | 2.87 | 0.22 | 1.72 | 1.54 | 56.18 | -23.25 | |
| | | $S_{13}$ | QTYP | 2.28 | 0.10 | 1.90 | | | | |
| | L7 | $S_{14}$ | QTYP | 7.40 | 0.48 | 2.19 | 1.67 | 19.44 | 11.69 | |
| | | $S_{15}$ | QTYP | 115.56 | See Table 29 | 2.23 | | | | |
| Glass window | | $S_{16}$ | Flat | Infinity | 0.21 | | 1.52 | 64.17 | | |
| | | $S_{17}$ | Flat | Infinity | 0.30 | | | | | |
| Image sensor | | $S_{18}$ | | | | | | | | |

TABLE 28

| Surface | Conic (k) | NR | $A_0$ | $A_1$ | $A_2$ | $A_3$ |
|---|---|---|---|---|---|---|
| $S_2$ | 0 | 2.21E+00 | -4.24E-02 | -7.81E-03 | -8.54E-04 | 5.91E-05 |
| $S_3$ | 0 | 2.21E+00 | -2.22E-01 | 3.42E-02 | -2.36E-03 | 6.05E-05 |
| $S_4$ | 0 | 1.56E+00 | -8.85E-02 | 5.13E-03 | 4.16E-04 | -1.19E-04 |
| $S_5$ | 0 | 2.21E+00 | -3.27E-01 | 4.50E-02 | 5.36E-03 | -2.18E-03 |
| $S_6$ | 0 | 1.56E+00 | -1.08E-01 | 2.21E-03 | 4.34E-04 | 2.13E-04 |
| $S_7$ | 0 | 1.56E+00 | -5.97E-02 | 2.50E-03 | 3.62E-04 | 2.70E-04 |
| $S_8$ | 0 | 1.52E+00 | 1.22E-01 | 8.04E-03 | -1.60E-03 | 8.07E-04 |
| $S_9$ | 0 | 1.52E+00 | 2.53E-01 | 2.11E-02 | 1.25E-03 | 1.53E-03 |
| $S_{10}$ | 0 | 1.63E+00 | 9.13E-02 | 1.50E-02 | -6.30E-04 | 1.66E-03 |
| $S_{11}$ | 0 | 1.63E+00 | 2.11E-02 | 2.33E-02 | -2.91E-03 | 1.68E-03 |
| $S_{12}$ | 0 | 1.47E+00 | -5.03E-01 | 1.75E-02 | -5.67E-04 | -8.94E-04 |
| $S_{13}$ | 0 | 1.47E+00 | -4.88E-01 | 1.82E-02 | -2.08E-03 | -2.28E-04 |
| $S_{14}$ | 0 | 1.49E+00 | -5.09E-02 | 1.08E-02 | -2.14E-03 | 4.66E-04 |
| $S_{15}$ | 0 | 1.49E+00 | -4.51E-02 | 1.15E-02 | -1.27E-03 | 1.12E-04 |

| Surface | $A_4$ | $A_5$ | $A_6$ | $A_7$ |
|---|---|---|---|---|
| $S_2$ | -3.02E-06 | -1.32E-05 | 1.12E-06 | 3.76E-08 |
| $S_3$ | -2.45E-04 | 6.08E-05 | -6.27E-06 | 4.05E-07 |
| $S_4$ | 1.49E-05 | -7.22E-07 | -3.42E-09 | 1.07E-10 |
| $S_5$ | -2.66E-04 | -3.74E-04 | -1.20E-04 | -7.15E-06 |
| $S_6$ | -5.64E-05 | 6.68E-06 | -4.46E-07 | -4.18E-09 |
| $S_7$ | -1.78E-04 | 2.85E-05 | -1.67E-06 | 2.44E-08 |
| $S_8$ | -5.47E-04 | 1.41E-04 | -1.73E-05 | 7.96E-07 |
| $S_9$ | -4.28E-04 | 2.76E-04 | -6.70E-06 | 2.25E-05 |
| $S_{10}$ | 3.67E-04 | 3.20E-04 | -2.29E-05 | 1.37E-05 |
| $S_{11}$ | 4.08E-04 | 3.09E-04 | -3.07E-05 | 3.00E-05 |
| $S_{12}$ | 1.82E-04 | 2.78E-04 | 4.51E-06 | 1.14E-06 |
| $S_{13}$ | 7.63E-05 | -4.39E-07 | -2.13E-06 | 2.57E-07 |
| $S_{14}$ | -8.85E-05 | 1.06E-05 | -6.23E-07 | 8.60E-09 |
| $S_{15}$ | -3.53E-05 | 7.82E-06 | -7.35E-07 | 2.27E-08 |

TABLE 29

| | | On State (Pop Out) | Off State (Collapsed) |
|---|---|---|---|
| T [mm] | $S_{15}$ | 4.4783 | 0.7000 |

TABLE 30

| | | DP1 [mm] | DP2 [mm] | DP3 [mm] |
|---|---|---|---|---|
| L6 | $S_{12}$ | 0.5001 | 1.6672 | N/A |

TABLE 30-continued

| | | DP1 [mm] | DP2 [mm] | DP3 [mm] |
|---|---|---|---|---|
| L7 | $S_{13}$ | 0.5902 | N/A | N/A |
| | $S_{14}$ | 2.0629 | N/A | N/A |
| | $S_{15}$ | 0.1689 | 1.1203 | 2.0314 |

Figure 19A:
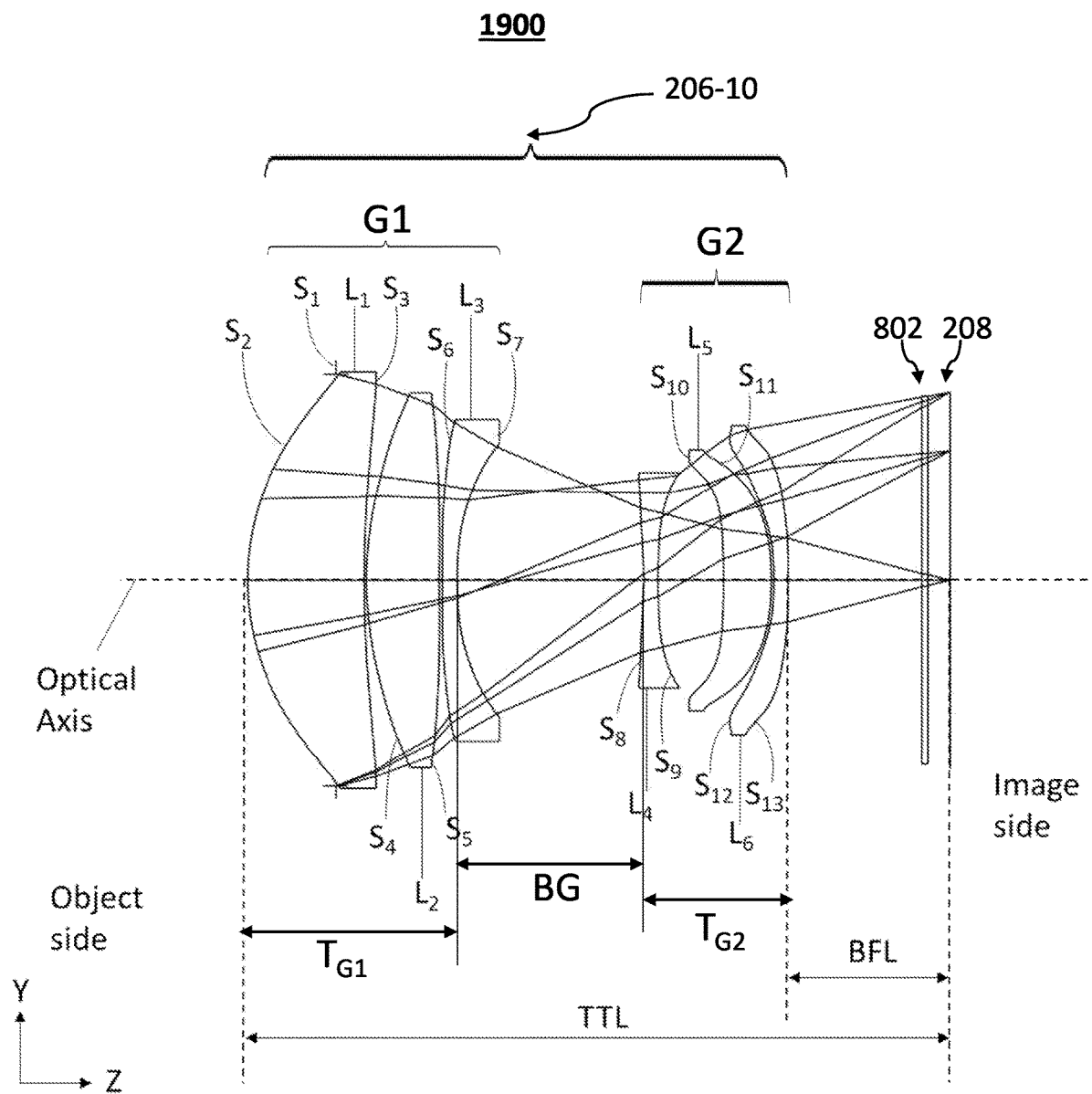
FIG. 19A shows yet another embodiment of a pop-out optical lens system disclosed herein in a pop-out state.
Figure 19B:
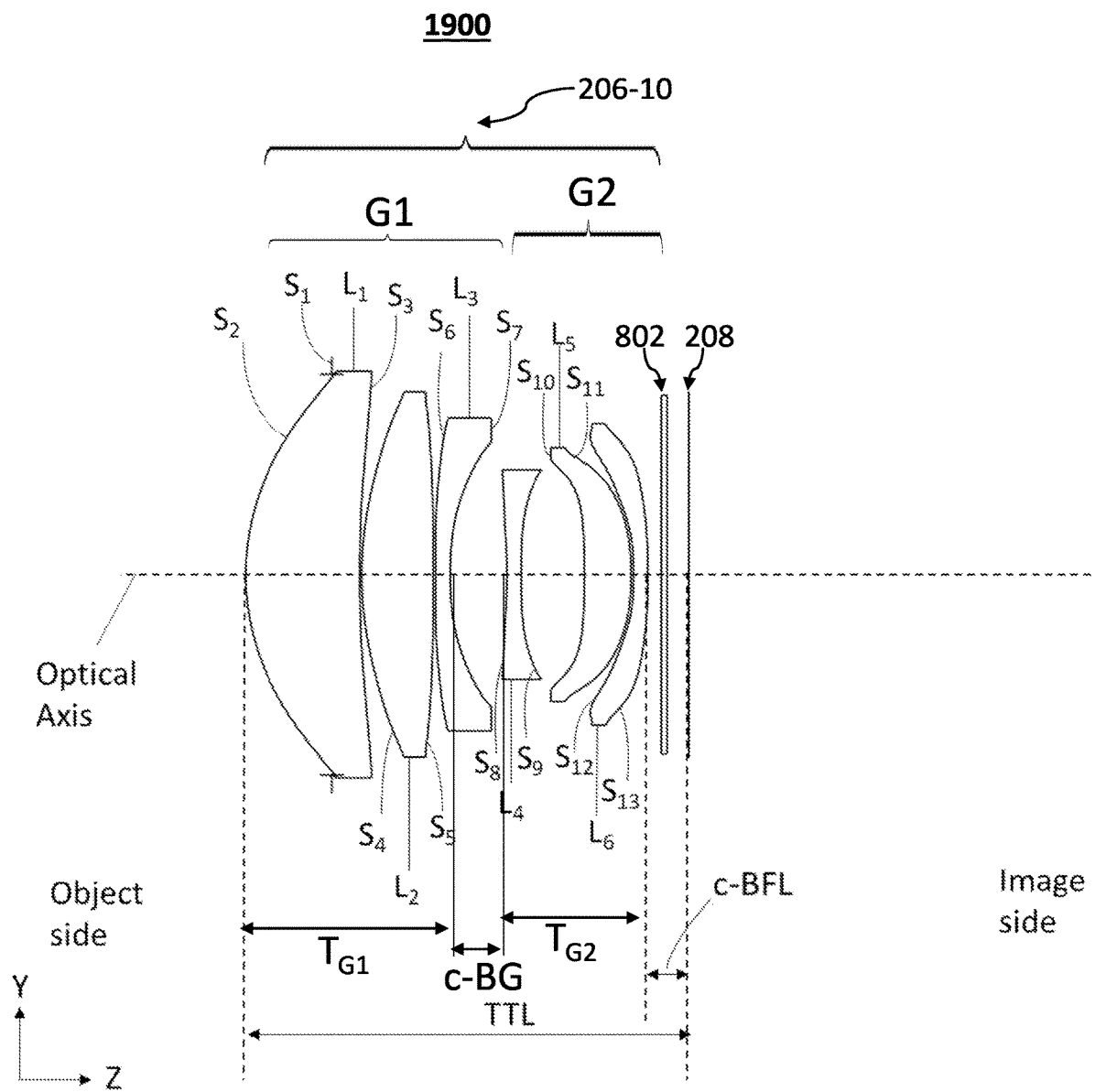
FIG. 19B shows the pop-out optical lens system of FIG. 19A in a collapsed state.

FIG. 19A shows yet another embodiment of a pop-out optical lens system disclosed herein and numbered 1900 in a pop-out state. FIG. 19B shows pop-out optical lens system 1900 in a collapsed state. Lens system 1900 comprises a pop-out lens 206-10 divided into two lens groups G1 and G2, an image sensor 208 and, optionally, an optical element 802.

Table 31 provides surface types, Table 32 provides aspheric coefficients, and Table 33 shows the BG and the BFL for the pop-out state and the c-BG and the c-BFL for the collapsed state. Table 34 shows the deflection point distances from the optical axis.

TABLE 31

EFL = 14.6 mm, F# = 2, HFoV = 12.8 deg, Sensor Height Full Diagonal = 6.5 mm

| Group | Lens | Surface | Type | R [mm] | T [mm] | D/2 [mm] | Nd | Vd | Focal Length [mm] | |
|---|---|---|---|---|---|---|---|---|---|---|
| | Object | $S_0$ | Flat | Infinity | Infinity | | | | | |
| | Stop | $S_1$ | Flat | Infinity | −1.5744 | 3.6595 | | | | |
| G1 | L1 | $S_2$ | QTYP | 4.4361 | 2.0811 | 3.6595 | 1.5333 | 56.1625 | 10.5748 | 10.2898 |
| | | $S_3$ | QTYP | 17.1831 | 0.0371 | 3.4917 | | | | |
| | L2 | $S_4$ | QTYP | 5.6555 | 1.2961 | 3.2810 | 1.5109 | 56.7467 | 14.9745 | |
| | | $S_5$ | QTYP | 19.8249 | 0.0505 | 3.1251 | | | | |
| | L3 | $S_6$ | QTYP | −175.7762 | 0.2670 | 2.8113 | 1.6604 | 20.2676 | −11.9103 | |
| | | $S_7$ | QTYP | 8.3152 | See Table 33 | 2.3768 | | | | |
| G2 | L4 | $S_8$ | QTYP | −6.5426 | 0.2590 | 1.7889 | 1.5339 | 55.8284 | −11.2510 | −12.4375 |
| | | $S_9$ | QTYP | 77.3828 | 1.1602 | 1.8648 | | | | |
| | L5 | $S_{10}$ | QTYP | −15.1296 | 0.8481 | 2.0658 | 1.6080 | 25.6443 | 13.0264 | |
| | | $S_{11}$ | QTYP | −5.3338 | 0.0451 | 2.2702 | | | | |
| | L6 | $S_{12}$ | QTYP | −7.5609 | 0.2554 | 2.6195 | 1.5437 | 55.9556 | −14.3694 | |
| | | $S_{13}$ | QTYP | −216.3040 | See Table 33 | 2.7044 | | | | |
| | Glass window | $S_{14}$ | Flat | Infinity | 0.1100 | | 1.5168 | 64.1673 | | |
| | | $S_{15}$ | Flat | Infinity | 0.3900 | | | | | |
| | Image sensor | $S_{16}$ | | | | | | | | |

TABLE 32

| Surface | Conic (k) | NR | $A_0$ | $A_1$ | $A_2$ | $A_3$ |
|---|---|---|---|---|---|---|
| $S_2$ | 0 | 3.63E+00 | −2.91E−01 | −8.05E−02 | −2.62E−02 | −4.27E−03 |
| $S_3$ | 0 | 3.48E+00 | −2.65E−01 | −7.73E−02 | 2.94E−02 | −7.70E−03 |
| $S_4$ | 0 | 3.34E+00 | −3.37E−01 | −8.26E−02 | 4.49E−02 | −1.18E−02 |
| $S_5$ | 0 | 3.25E+00 | −4.14E−01 | 1.15E−02 | 7.94E−04 | −3.69E−03 |
| $S_6$ | 0 | 2.80E+00 | 1.78E−01 | −5.55E−02 | 1.16E−02 | 3.08E−03 |
| $S_7$ | 0 | 2.35E+00 | 2.66E−01 | −5.92E−02 | 1.10E−02 | −2.21E−03 |
| $S_8$ | 0 | 2.00E+00 | 9.75E−02 | −1.02E−02 | −2.53E−03 | 2.44E−03 |
| $S_9$ | 0 | 1.91E+00 | 7.56E−02 | 5.35E−03 | −3.61E−03 | 2.18E−03 |
| $S_{10}$ | 0 | 1.97E+00 | −2.06E−01 | −7.41E−03 | 1.20E−02 | 1.23E−02 |
| $S_{11}$ | 0 | 2.23E+00 | −7.22E−02 | −6.08E−02 | −4.02E−03 | 3.52E−03 |
| $S_{12}$ | 0 | 2.53E+00 | −2.88E−01 | 3.29E−02 | −9.09E−04 | −1.65E−03 |
| $S_{13}$ | 0 | 2.56E+00 | −5.32E−01 | 2.37E−02 | 1.08E−03 | 3.36E−03 |

| Surface | $A_4$ | $A_5$ | $A_6$ | $A_7$ | $A_8$ |
|---|---|---|---|---|---|
| $S_2$ | −1.06E−03 | 6.89E−04 | 2.45E−04 | 1.36E−04 | −7.34E−05 |
| $S_3$ | −2.39E−03 | 6.73E−03 | −4.20E−03 | 1.24E−03 | −1.28E−04 |
| $S_4$ | −7.89E−03 | 1.05E−02 | −3.05E−03 | −3.70E−04 | 4.94E−04 |
| $S_5$ | −6.79E−03 | 1.08E−02 | −5.13E−03 | 8.77E−04 | 1.17E−04 |
| $S_6$ | −2.71E−03 | 8.88E−04 | −2.85E−04 | 1.16E−04 | −2.50E−05 |
| $S_7$ | 1.85E−03 | −1.35E−03 | 5.37E−04 | −3.12E−05 | −2.07E−05 |
| $S_8$ | 2.31E−04 | −1.22E−05 | −2.13E−04 | 7.09E−05 | −6.57E−06 |
| $S_9$ | −5.62E−04 | 3.85E−04 | −2.40E−04 | 5.87E−05 | −4.84E−06 |
| $S_{10}$ | 9.85E−03 | 6.56E−03 | 3.37E−03 | 1.23E−03 | 3.22E−04 |
| $S_{11}$ | 4.14E−03 | 2.69E−03 | 7.37E−06 | −4.58E−04 | −2.90E−04 |
| $S_{12}$ | −3.35E−03 | −1.95E−03 | −8.35E−04 | −2.85E−04 | −3.85E−05 |
| $S_{13}$ | −4.54E−04 | −5.31E−04 | −6.51E−04 | −2.79E−04 | −1.69E−04 |

TABLE 33

| | | On State (Pop Out) | Off State (Collapsed) |
|---|---|---|---|
| T [mm] | $S_9$ | 3.3200 | 0.7500 |

TABLE 33-continued

| | On State (Pop Out) | Off State (Collapsed) |
|---|---|---|
| $S_{13}$ | 2.3809 | 0.2500 |

TABLE 34

| | | DP1 [mm] | DP2 [mm] | DP3 [mm] |
|---|---|---|---|---|
| L5 | $S_{10}$ | 1.9372 | N/A | N/A |
| | $S_{11}$ | 2.1333 | N/A | N/A |

TABLE 34-continued

|  |  | DP1 [mm] | DP2 [mm] | DP3 [mm] |
|---|---|---|---|---|
| L6 | $S_{12}$ | 2.1267 | N/A | N/A |
|  | $S_{13}$ | 2.5492 | N/A | N/A |

Figure 20A:
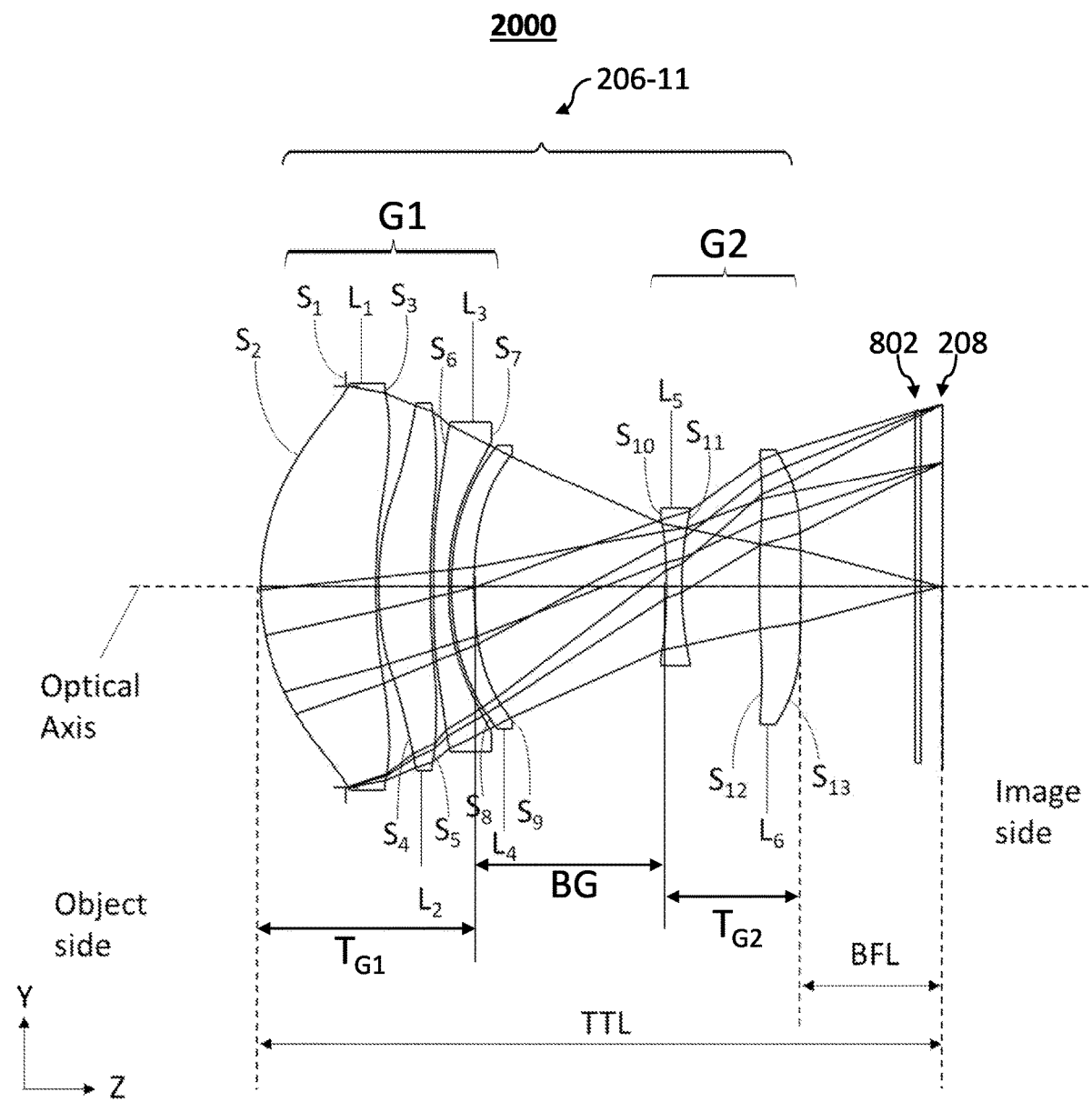
FIG. 20A shows yet another embodiment of a pop-out optical lens system disclosed herein in a pop-out state.
Figure 20B:
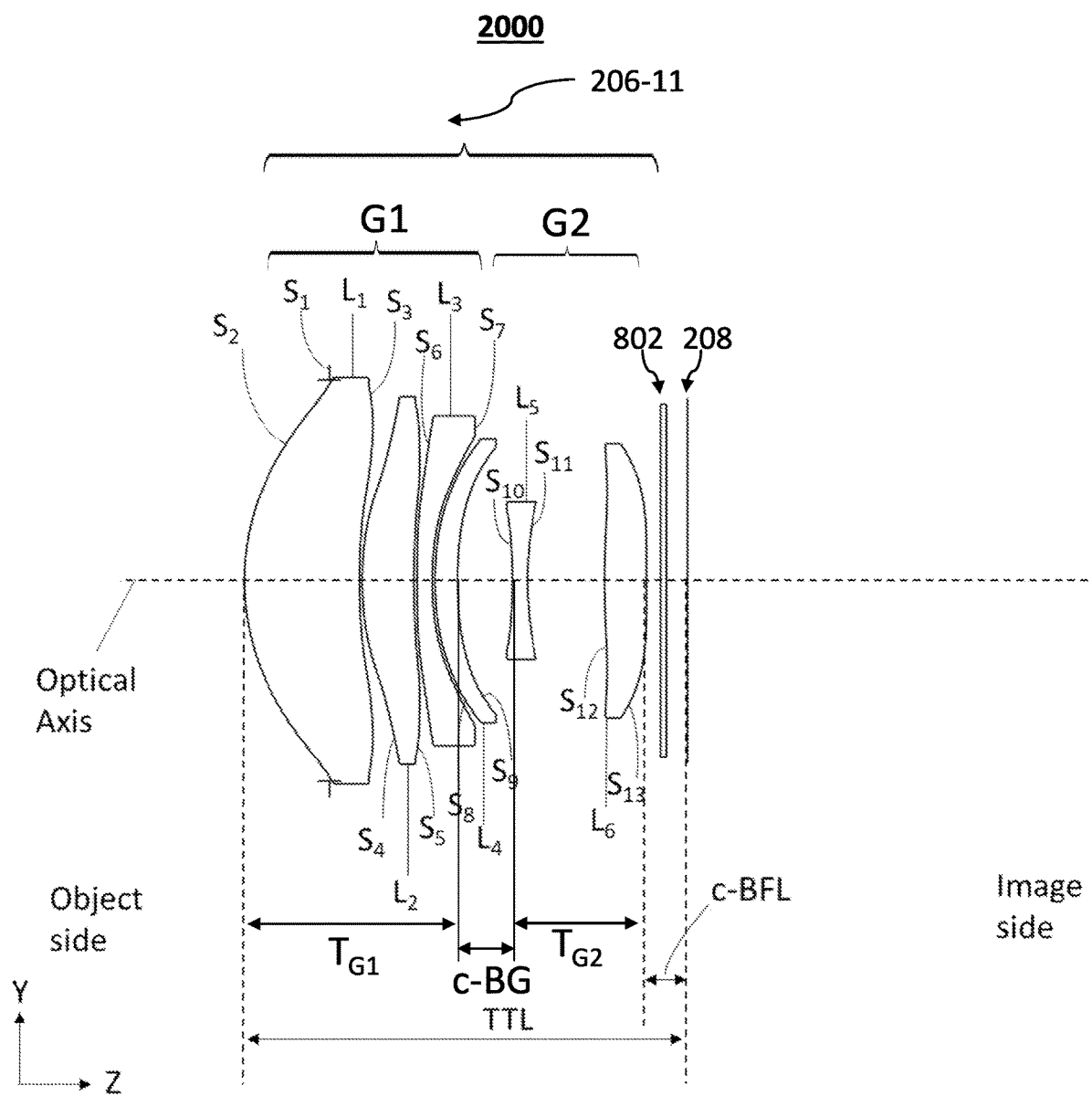
FIG. 20B shows the pop-out optical lens system of FIG. 20A in a collapsed state.

FIG. 20A shows yet another embodiment of a pop-out optical lens system disclosed herein and numbered 2000 in a pop-out state. FIG. 20B shows pop-out optical lens system 2000 in a collapsed state. Lens system 2000 comprises a pop-out lens 206-11 divided into two lens groups G1 and G2, an image sensor 208 and, optionally, an optical element 802.

Table 35 provides surface types, Table 36 provides aspheric coefficients, and Table 37 shows the BG and the BFL for the pop-out state and the c-BG and the c-BFL for collapsed state. Table 38 shows the deflection point distances from the optical axis.

The focal length of L3+L4 together is $f_{3+4} = -17.34$.

TABLE 35

| EFL = 14.7 mm, F# = 2, HFoV = 12.7 deg, Sensor Height Full Diagonal = 6.5 mm | | | | | | | | | |
|---|---|---|---|---|---|---|---|---|---|
| Lens |  | Surface | Type | R [mm] | T [mm] | D/2 [mm] | Nd | Vd | Focal Length [mm] |
|  | Object | $S_0$ | Flat | Infinity | Infinity |  |  |  |  |
|  | Stop | $S_1$ | Flat | Infinity | -1.56 | 3.68 |  |  |  |
| G1 | L1 | $S_2$ | QTYP | 4.30 | 2.12 | 3.68 | 1.53 | 56.16 | 11.37  10.31 |
|  |  | $S_3$ | QTYP | 12.20 | 0.05 | 3.55 |  |  |  |
|  | L2 | $S_4$ | QTYP | 5.78 | 0.95 | 3.32 | 1.54 | 55.99 | 18.93 |
|  |  | $S_5$ | QTYP | 12.34 | 0.06 | 3.22 |  |  |  |
|  | L3 | $S_6$ | QTYP | 31.14 | 0.28 | 2.97 | 1.67 | 19.44 | -13.96  -17.34 |
|  |  | $S_7$ | QTYP | 7.21 | 0.05 | 2.60 |  |  |  |
|  | L4 | $S_8$ | QTYP | 5.77 | 0.41 | 2.55 | 1.51 | 56.81 | 64.80 |
|  |  | $S_9$ | QTYP | 6.81 | See Table 37 | 2.40 |  |  |  |
| G2 | L5 | $S_{10}$ | QTYP | -11.79 | 0.28 | 1.72 | 1.54 | 55.90 | -7.33  -13.01 |
|  |  | $S_{11}$ | QTYP | 6.11 | 1.42 | 1.84 |  |  |  |
|  | L6 | $S_{12}$ | QTYP | 12.04 | 0.77 | 2.34 | 1.61 | 25.64 | 20.17 |
|  |  | $S_{13}$ | QTYP | 466.66 | See Table 37 | 2.46 |  |  |  |
|  | Glass window | $S_{14}$ | Flat | Infinity | 0.11 |  | 1.52 | 64.17 |  |
|  |  | $S_{15}$ | Flat | Infinity | 0.39 |  |  |  |  |
| Image sensor | $S_{16}$ |  |  |  |  |  |  |  |  |

TABLE 36

| Surface | Conic (k) | NR | $A_0$ | $A_1$ | $A_2$ | $A_3$ |
|---|---|---|---|---|---|---|
| $S_2$ | 0 | 3.63E+00 | -2.91E-01 | -8.05E-02 | -2.62E-02 | -4.27E-03 |
| $S_3$ | 0 | 3.48E+00 | -2.65E-01 | -7.73E-02 | 2.94E-02 | -7.70E-03 |
| $S_4$ | 0 | 3.34E+00 | -3.37E-01 | -8.26E-02 | 4.49E-02 | -1.18E-02 |
| $S_5$ | 0 | 3.25E+00 | -4.14E-01 | 1.15E-02 | 7.94E-04 | -3.69E-03 |
| $S_6$ | 0 | 2.80E+00 | 1.78E-01 | -5.55E-02 | 1.16E-02 | 3.08E-03 |
| $S_7$ | 0 | 2.35E+00 | 2.66E-01 | -5.92E-02 | 1.10E-02 | -2.21E-03 |
| $S_8$ | 0 | 2.00E+00 | 9.75E-02 | -1.02E-02 | -2.53E-03 | 2.44E-03 |
| $S_9$ | 0 | 1.91E+00 | 7.56E-02 | 5.35E-03 | -3.61E-03 | 2.18E-03 |
| $S_{10}$ | 0 | 1.97E+00 | -2.06E-01 | -7.41E-03 | 1.20E-02 | 1.23E-02 |
| $S_{11}$ | 0 | 2.23E+00 | -7.22E-02 | -6.08E-03 | -4.02E-03 | 3.52E-03 |
| $S_{12}$ | 0 | 2.53E+00 | -2.88E-01 | 3.29E-02 | -9.09E-04 | -1.65E-03 |
| $S_{13}$ | 0 | 2.56E+00 | -5.32E-01 | 2.37E-02 | 1.08E-03 | 3.36E-03 |

| Surface | $A_4$ | $A_5$ | $A_6$ | $A_7$ | $A_8$ |
|---|---|---|---|---|---|
| $S_2$ | -1.06E-03 | 6.89E-04 | 2.45E-04 | 1.36E-04 | -7.34E-05 |
| $S_3$ | -2.39E-03 | 6.73E-03 | -4.20E-03 | 1.24E-03 | -1.28E-04 |
| $S_4$ | -7.89E-03 | 1.05E-02 | -3.05E-03 | -3.70E-04 | 4.94E-04 |
| $S_5$ | -6.79E-03 | 1.08E-02 | -5.13E-03 | 8.77E-04 | 1.17E-04 |
| $S_6$ | -2.71E-03 | 8.88E-04 | -2.85E-04 | 1.16E-04 | -2.50E-05 |

TABLE 36-continued

| | | | | | |
|---|---|---|---|---|---|
| $S_7$ | 1.85E−03 | −1.35E−03 | 5.37E−04 | −3.12E−05 | −2.07E−05 |
| $S_8$ | 2.31E−04 | −1.22E−05 | −2.13E−04 | 7.09E−05 | −6.57E−06 |
| $S_9$ | −5.62E−04 | 3.85E−04 | −2.40E−04 | 5.87E−05 | −4.84E−06 |
| $S_{10}$ | 9.85E−03 | 6.56E−03 | 3.37E−03 | 1.23E−03 | 3.22E−04 |
| $S_{11}$ | 4.14E−03 | 2.69E−03 | 7.37E−06 | −4.58E−04 | −2.90E−04 |
| $S_{12}$ | −3.35E−03 | −1.95E−03 | −8.35E−04 | −2.85E−04 | −3.85E−05 |
| $S_{13}$ | −4.54E−04 | −5.31E−04 | −6.51E−04 | −2.79E−04 | −1.69E−04 |

TABLE 37

| | | On State (Pop Out) | Off State (Collapsed) |
|---|---|---|---|
| T [mm] | $S_9$ | 3.5280 | 1.0000 |
| | $S_{13}$ | 2.0865 | 0.2500 |

TABLE 38

| | | DP1 [mm] | DP2 [mm] | DP3 [mm] |
|---|---|---|---|---|
| L5 | $S_{10}$ | N/A | N/A | N/A |
| | $S_{11}$ | 1.7781 | N/A | N/A |
| L6 | $S_{12}$ | 0.8539 | 2.1100 | N/A |
| | $S_{13}$ | 0.0957 | N/A | N/A |

Figure 21A:
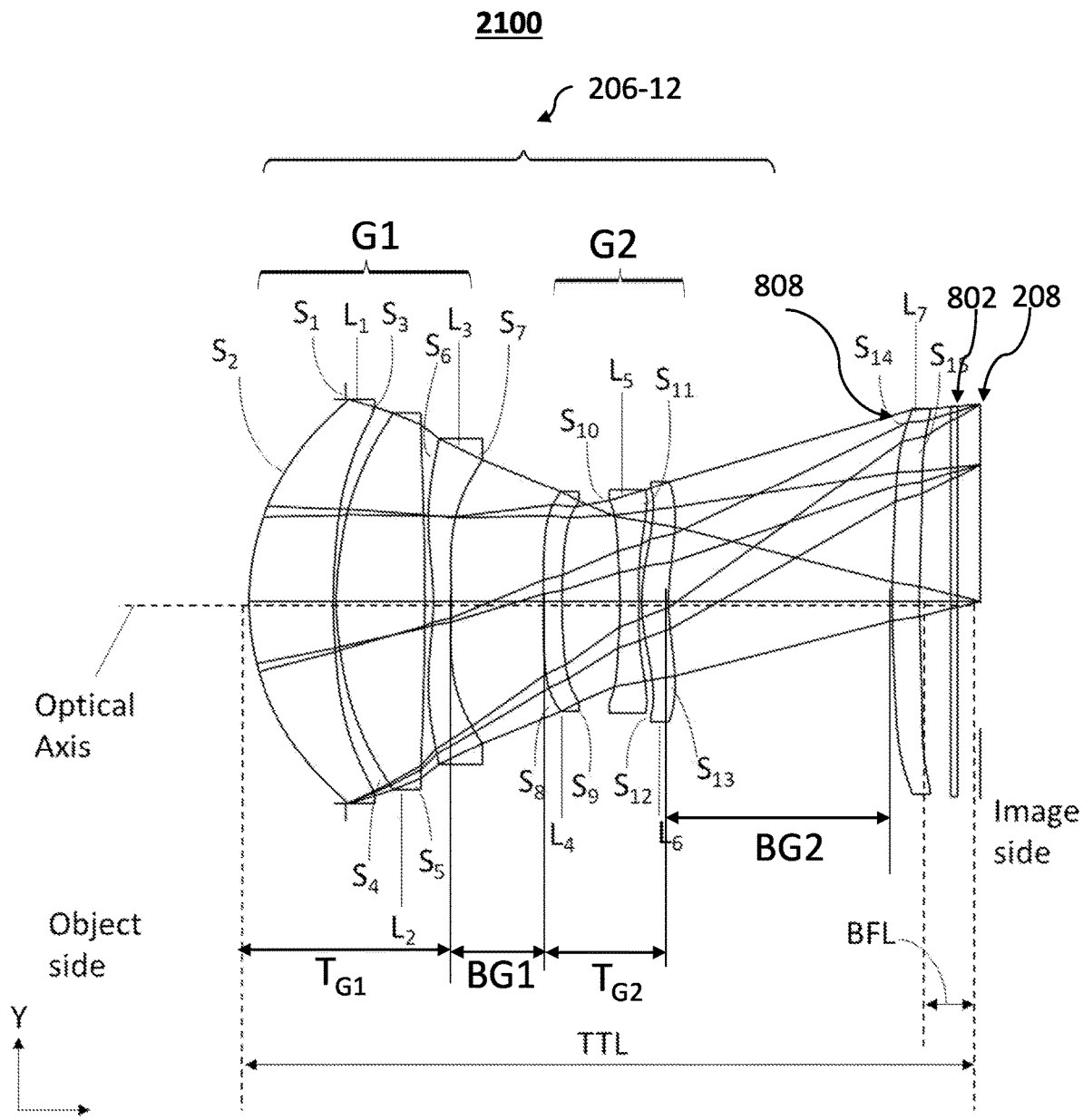
FIG. 21A shows yet another embodiment of a pop-out optical lens system disclosed herein in a pop-out state.
Figure 21B:
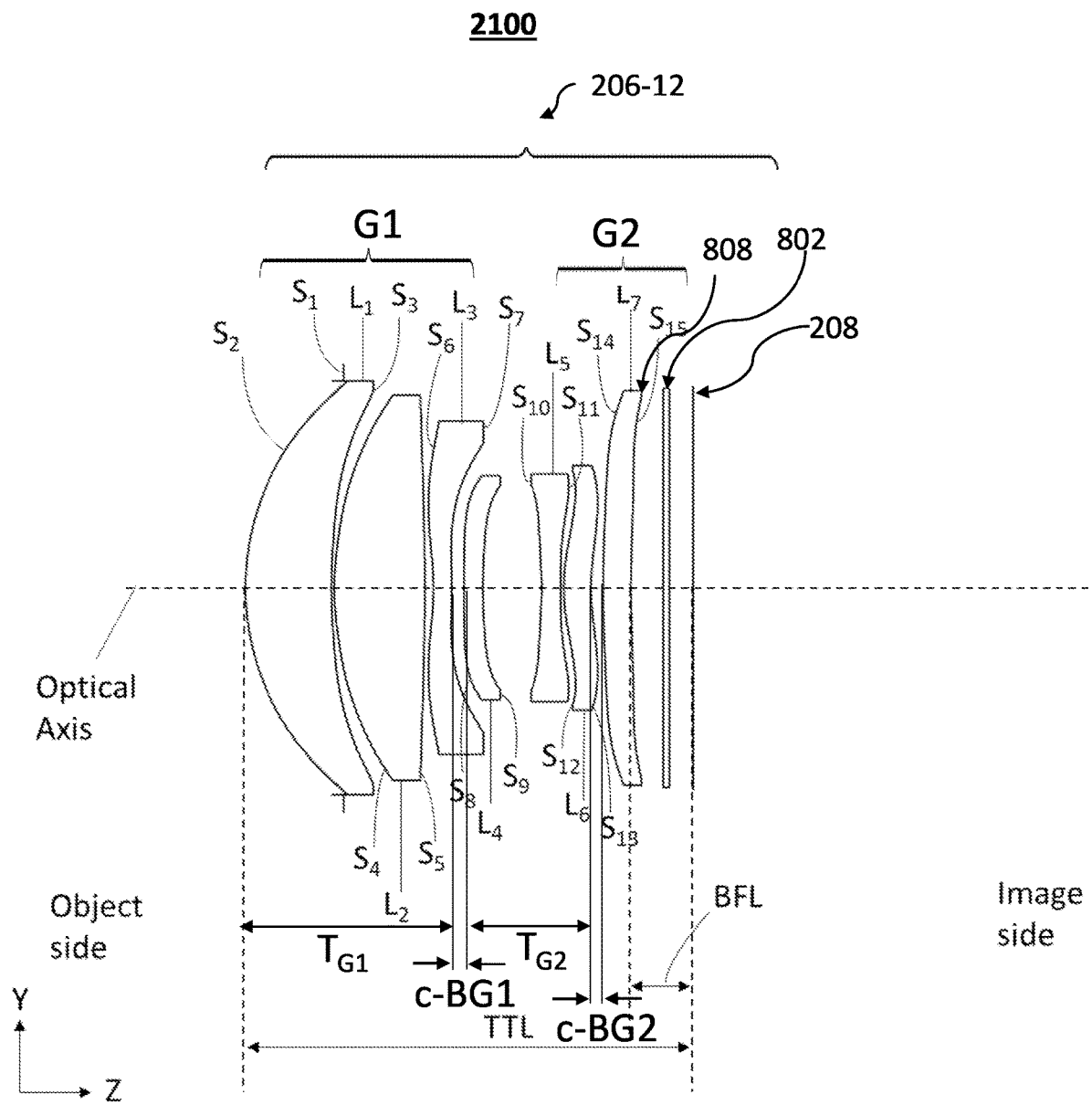
FIG. 21B shows the pop-out optical lens system of FIG. 21A in a collapsed state.

FIG. 21A shows yet another embodiment of a pop-out optical lens system disclosed herein and numbered 2100 in a pop-out state. FIG. 21B shows pop-out optical lens system 2100 in a collapsed state. Lens system 2100 comprises a pop-out lens 206-12 which is divided into three lens groups G1, G2 and Field lens 808, an image sensor 208 and, optionally, an optical element 802.

Table 39 provides surface types, Table 40 provides aspheric coefficients, and Table 41 shows BG1 and BG2 for the pop-out state and c-BG1 and c-BG2 for collapsed state. Table 42 shows the deflection point distances from the optical axis.

TABLE 39

EFL = 13.9 mm, F# = 2, HFoV = 13.5 deg, Sensor Height Full Diagonal = 6.5 mm

| Group | Lens | Surface | Type | R [mm] | T [mm] | D/2 [mm] | Nd | Vd | Focal Length [mm] | |
|---|---|---|---|---|---|---|---|---|---|---|
| | Object | $S_0$ | Flat | Infinity | Infinity | | | | | |
| | Stop | $S_1$ | Flat | Infinity | −1.66 | 3.47 | | | | |
| G1 | L1 | $S_2$ | QTYP | 4.41 | 1.44 | 3.47 | 1.55 | 55.64 | 16.37 | 9.95 |
| | | $S_3$ | QTYP | 7.27 | 0.05 | 3.33 | | | | |
| | L2 | $S_4$ | QTYP | 4.32 | 1.51 | 3.23 | 1.51 | 56.81 | 7.82 | |
| | | $S_5$ | QTYP | −52.11 | 0.15 | 3.05 | | | | |
| | L3 | $S_6$ | QTYP | −3.92 | 0.31 | 2.82 | 1.67 | 19.44 | −9.80 | |
| | | $S_7$ | QTYP | −9.93 | See Table 41 | 2.45 | | | | |
| G2 | L4 | $S_8$ | QTYP | 21.91 | 0.32 | 1.92 | 1.55 | 56.85 | −27.93 | −13.32 |
| | | $S_9$ | QTYP | 8.97 | 0.99 | 1.76 | | | | |
| | L5 | $S_{10}$ | QTYP | −5.89 | 0.32 | 1.73 | 1.55 | 56.02 | −11.76 | |
| | | $S_{11}$ | QTYP | −69.36 | 0.05 | 1.91 | | | | |
| | L6 | $S_{12}$ | QTYP | 3.04 | 0.46 | 1.94 | 1.67 | 19.44 | 19.56 | |
| | | $S_{13}$ | QTYP | 3.70 | See Table 41 | 2.05 | | | | |
| Field Lens | L7 | $S_{14}$ | QTYP | 15.39 | 0.47 | 3.29 | 1.67 | 19.44 | −448.46 | |
| | | $S_{15}$ | QTYP | 14.47 | 0.54 | 3.30 | | | | |
| | Glass window | $S_{16}$ | Flat | Infinity | 0.11 | | 1.52 | 64.17 | | |
| | | $S_{17}$ | Flat | Infinity | 0.39 | | | | | |
| | Image sensor | $S_{18}$ | | | | | | | | |

TABLE 40

| Surface | Conic (k) | NR | $A_0$ | $A_1$ | $A_2$ | $A_3$ | $A_4$ |
|---|---|---|---|---|---|---|---|
| $S_2$ | 0 | 3.52E+00 | 3.05E-01 | -1.75E-01 | 1.08E-01 | -5.69E-02 | 2.67E-02 |
| $S_3$ | 0 | 3.33E+00 | -1.44E-01 | 9.96E-02 | -6.22E-02 | 1.75E-02 | -1.58E-02 |
| $S_4$ | 0 | 3.26E+00 | -5.61E-01 | 1.16E-01 | -5.80E-02 | 2.25E-02 | -1.65E-02 |
| $S_5$ | 0 | 3.10E+00 | 2.25E-02 | 7.68E-04 | -9.98E-04 | -2.60E-03 | -9.16E-04 |
| $S_6$ | 0 | 2.75E+00 | 1.38E+00 | -2.15E-01 | 5.41E-02 | -1.88E-02 | 6.37E-03 |
| $S_7$ | 0 | 2.32E+00 | 8.26E-01 | -1.09E-01 | 2.21E-02 | -8.06E-03 | 1.87E-03 |
| $S_8$ | 0 | 2.14E+00 | 3.84E-01 | 7.32E-02 | -2.03E-02 | -1.12E-02 | -1.91E-03 |
| $S_9$ | 0 | 1.99E+00 | 2.37E-01 | 6.43E-02 | -2.65E-02 | -7.56E-03 | -4.58E-03 |
| $S_{10}$ | 0 | 1.83E+00 | 1.22E-01 | -8.70E-02 | 9.67E-03 | -4.42E-03 | 2.08E-04 |
| $S_{11}$ | 0 | 1.97E+00 | 2.29E-01 | -1.18E-01 | 2.15E-02 | -5.51E-03 | 1.70E-03 |
| $S_{12}$ | 0 | 1.98E+00 | -6.03E-01 | 1.22E-02 | -1.01E-02 | -1.09E-03 | -1.71E-04 |
| $S_{13}$ | 0 | 2.10E+00 | -6.99E-01 | 4.54E-02 | -1.48E-02 | 1.08E-03 | -8.96E-04 |
| $S_{14}$ | 0 | 3.30E+00 | -8.94E-02 | 9.94E-02 | -2.24E-02 | -1.68E-03 | -2.82E-03 |
| $S_{15}$ | 0 | 3.35E+00 | -2.82E-01 | 1.19E-01 | -3.61E-02 | -4.14E-03 | -5.42E-03 |

| Surface | $A_5$ | $A_6$ | $A_7$ | $A_8$ | $A_9$ | $A_{10}$ |
|---|---|---|---|---|---|---|
| $S_2$ | -1.04E-02 | 4.42E-03 | -2.44E-03 | 1.02E-03 | -2.68E-04 | -1.40E-07 |
| $S_3$ | 4.39E-03 | -1.08E-03 | 3.34E-04 | 6.27E-05 | — | — |
| $S_4$ | 2.94E-03 | -9.67E-04 | 3.08E-04 | 2.63E-04 | — | — |
| $S_5$ | -5.21E-06 | 6.89E-04 | -3.89E-04 | -4.99E-06 | — | — |
| $S_6$ | -2.07E-03 | 8.82E-04 | -1.35E-04 | -4.51E-05 | — | — |
| $S_7$ | -2.41E-04 | 4.11E-05 | 4.76E-05 | -2.17E-05 | — | — |
| $S_8$ | -2.84E-04 | -1.03E-04 | -4.12E-06 | -6.60E-06 | — | — |
| $S_9$ | -1.24E-03 | -3.84E-04 | -6.86E-05 | -2.03E-05 | — | — |
| $S_{10}$ | -1.08E-04 | 2.49E-05 | 1.66E-05 | 4.91E-06 | — | — |
| $S_{11}$ | 7.12E-04 | 2.28E-04 | 1.31E-04 | -1.71E-05 | — | — |
| $S_{12}$ | 7.13E-04 | 2.54E-04 | 1.50E-04 | 9.66E-06 | — | — |
| $S_{13}$ | 4.06E-04 | -1.37E-05 | 5.28E-05 | -1.11E-05 | — | — |
| $S_{14}$ | 3.35E-04 | -5.87E-04 | — | — | — | — |
| $S_{15}$ | 5.37E-04 | -8.14E-04 | — | — | — | — |

TABLE 41

| | | On State (Pop Out) | Off State (Collapsed) |
|---|---|---|---|
| T [mm] | $S_7$ | 1.58 | 0.20 |
| | $S_{13}$ | 3.82 | 0.20 |

TABLE 42

| | | DP1 [mm] | DP2 [mm] | DP3 [mm] |
|---|---|---|---|---|
| L6 | $S_{12}$ | 0.8851 | N/A | N/A |
| | $S_{13}$ | 0.7231 | N/A | N/A |
| L7 | $S_{14}$ | 3.1393 | N/A | N/A |
| (FL) | $S_{15}$ | 0.8056 | 1.8548 | 3.0509 |

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

Unless otherwise stated, the use of the expression "and/ or" between the last two members of a list of options for selection indicates that a selection of one or more of the listed options is appropriate and may be made.

It should be understood that where the claims or specification refer to "a" or "an" element, such reference is not to be construed as there being only one of that element.

Furthermore, for the sake of clarity the term "substantially" is used herein to imply the possibility of variations in values within an acceptable range. According to one example, the term "substantially" used herein should be interpreted to imply possible variation of up to 5% over or under any specified value. According to another example, the term "substantially" used herein should be interpreted to imply possible variation of up to 2.5% over or under any specified value. According to a further example, the term "substantially" used herein should be interpreted to imply possible variation of up to 1% over or under any specified value.

All references mentioned in this specification are herein incorporated in their entirety by reference into the specification, to the same extent as if each individual reference was specifically and individually indicated to be incorporated herein by reference. In addition, citation or identification of any reference in this application shall not be construed as an admission that such reference is available as prior art to the present disclosure.

What is claimed is:

1. A camera, comprising:
    a lens comprising N lens elements $L_1$-$L_N$ arranged along a lens optical axis starting with $L_1$ on an object side and ending with $L_N$ on an image side, wherein N≥5, wherein the lens elements are divided into two or more lens groups and wherein two adjacent lens groups are separated by a respective air-gap $d_1$ along the lens optical axis;
    an image sensor separated from lens element $L_N$ by an air-gap $d_2$ along the lens optical axis, the image sensor having a sensor diagonal $S_D$ between 7 and 20 mm; and
    an actuator operative to control the air-gaps $d_1$ and $d_2$ to switch the camera between M≥1 operative pop-out states and a collapsed state and to focus the camera on an object at an object-lens distance u of less than 30 cm, wherein in each operative pop-out state m∈{1,2, . . . M} the lens has a respective effective focal length $EFL_m$ and a total track length $TTL_m$, wherein in the collapsed state the lens has a total track length c-TTL, wherein a minimal $EFL_{min}$ of the M effective focal lengths $EFL_m$ is equal to or greater than 7 mm, and wherein $c\text{-}TTL<0.65\cdot EFL_{min}$, wherein the actuator comprises a plurality of springs and a guiding and positioning mechanism, wherein the guiding and positioning mechanism enables sufficient z-decenter and xy-decenter accuracy between lens elements in the operative state and repeatability in switching between operative and collapsed states, and wherein the sufficient decenter accuracy is less than 0.1 mm decenter and the repeatability is less than 0.05 mm decenter.

2. The camera of claim 1, wherein the sufficient decenter accuracy is less than 0.8 mm decenter and wherein the repeatability is less than 0.04 mm decenter.

3. A camera, comprising:

a lens comprising N lens elements $L_1$-$L_N$ arranged along a lens optical axis starting with $L_1$ on an object side and ending with $L_N$ on an image side, wherein $N\geq 5$, wherein the lens elements are divided into two or more lens groups and wherein two adjacent lens groups are separated by a respective air-gap di along the lens optical axis;

an image sensor separated from lens element $L_N$ by an air-gap $d_2$ along the lens optical axis, the image sensor having a sensor diagonal SD between 7 and 20 mm; and an actuator operative to control the air-gaps di and $d_2$ to switch the camera between $M\geq 1$ operative pop-out states and a collapsed state and to focus the camera on an object at an object-lens distance u of less than 30 cm, wherein in each operative pop-out state $m\in\{1,2,\ldots M\}$ the lens has a respective effective focal length $EFL_m$ and a total track length $TTL_m$, wherein in the collapsed state the lens has a total track length c-TTL, wherein a minimal $EFL_{min}$ of the M effective focal lengths $EFL_m$ is equal to or greater than 7 mm, and wherein $c\text{-}TTL<0.65 EFL_{min}$, wherein the switching from the operative state to the collapsed state is performed by a window frame pressing on the optics module to bring the camera to a collapsed state height.

4. A camera, comprising:

a lens comprising N lens elements $L_1$-$L_N$ arranged along a lens optical axis starting with $L_1$ on an object side and ending with LN on an image side, wherein $N\geq 5$, wherein the lens elements are divided into two or more lens groups and wherein two adjacent lens groups are separated by a respective air-gap di along the lens optical axis;

an image sensor separated from lens element $L_N$ by an air-gap $d_2$ along the lens optical axis, the image sensor having a sensor diagonal $S_D$ between 7 and 20 mm; and an actuator operative to control the air-gaps $d_1$ and $d_2$ to switch the camera between $M\geq 1$ operative pop-out states and a collapsed state and to focus the camera on an object at an object-lens distance u of less than 30 cm, wherein in each operative pop-out state $m\in\{1,2,\ldots M\}$ the lens has a respective effective focal length $EFL_m$ and a total track length $TTL_m$, wherein in the collapsed state the lens has a total track length c-TTL, wherein a minimal $EFL_{min}$ of the M effective focal lengths $EFL_m$ is equal to or greater than 7 mm, and wherein $c\text{-}TTL<0.65 EFL_{min}$, wherein the actuator is further operative to, in a first operative pop-out state, focus the camera to an object at an object-lens distance of equal or less than 100 cm, and wherein, the focusing of the camera to an object-lens distance of less than 30 cm is in a second pop-out state different from the first pop-out state.

5. A camera, comprising:

a lens comprising N lens elements $L_1$-$L_N$ arranged along a lens optical axis starting with $L_1$ on an object side and ending with LN on an image side, wherein $N\geq 5$, wherein the lens elements are divided into two or more lens groups and wherein two adjacent lens groups are separated by a respective air-gap di along the lens optical axis;

an image sensor separated from lens element $L_N$ by an air-gap $d_2$ along the lens optical axis, the image sensor having a sensor diagonal SD between 7 and 20 mm; and an actuator operative to control the air-gaps $d_1$ and $d_2$ to switch the camera between $M\geq 1$ operative pop-out states and a collapsed state and to focus the camera on an object at an object-lens distance u of less than 30 cm, wherein in each operative pop-out state $m\in\{1,2,\ldots\}$ the lens has a respective effective focal length $EFL_m$ and a total track length $TTL_m$, wherein in the collapsed state the lens has a total track length c-TTL, wherein a minimal $EFL_{min}$ of the M effective focal lengths $EFL_m$ is equal to or greater than 7 mm, and wherein $c\text{-}TTL<0.65\cdot EFL_{min}$, wherein the actuator comprises a guiding and positioning mechanism based on a kinematic coupling mechanism.

6. A handheld electronic device, comprising the camera of claim 4.

7. A camera system comprising the camera of claim 4 together with a second camera comprising a second lens system having at least one air-gap, wherein the actuator is further operative to control the at least one air-gap of the second camera for simultaneously switching the camera of claim 4 and the second camera between $O\geq 1$ second camera operative pop-out states and a second camera collapsed state.

8. The camera system of claim 7, wherein in the second camera collapsed state the second lens has a total track length c-TTL2 and wherein $cTTL_2=cTTL\pm10\%$.

9. A handheld electronic device comprising the camera system of claim 7.

10. The handheld electronic device of claim 7, wherein the device has a device exterior surface, wherein in an operative state either of the first or second cameras extends beyond the device exterior surface by 2 mm-10 mm, and wherein in a non-operative state either of the first or second cameras extends beyond the device exterior surface by less than 2 mm.

11. A lens system, comprising:

an image sensor; and a lens distanced by a back focal length (BFL) from the image sensor and having a field of view FOV<40deg, an effective focal length (EFL) and a lens mean glass thickness (MGT), the lens including i lens elements L1-Li starting with L1 from an object side toward an image side, wherein $2\leq i\leq N$, wherein each lens element Li has a respective thickness T, and a focal length $f_i$, with a magnitude |fi|, wherein at least some lens elements are organized in two lens groups G1 and G2 separated by a big gap (BG) and having, respectively for G1 and G2, effective focal lengths EFL(G1) and EFL(G2), mean glass thicknesses MGT(G1) and MGT(G2) and mean air gaps MAG(G1) and MAG(G2), wherein the lens has a pop-out total track length TTL<20 mm in a pop-out state and a collapsed total track length c-TTL in a collapsed state, wherein TTL <0.95×EFL, and wherein a ratio c-TTL/TTL <0.7, wherein a first deflection point at the rear surface of $L_{N-1}$ is located at a distance d-r measured from an optical axis of the lens, and a first deflection point at the front surface of $L_{N-1}$ is located at a distance d-f measured from an optical axis of the lens, and wherein 0.5 mm<d-r, d-f >1.0 mm.

12. A lens system, comprising:
an image sensor; and
a lens distanced by a back focal length (BFL) from the image sensor and having a field of view FOV <40deg, an effective focal length (EFL) and a lens mean glass thickness (MGT), the lens including i lens elements L1-Li starting with L1 from an object side toward an image side, wherein 2≤i≤N, wherein each lens element Li has a respective thickness $T_i$ and a focal length $f_i$, with a magnitude $|f_i|$, wherein at least some lens elements are organized in two lens groups G1 and G2 separated by a big gap (BG) and having, respectively for G1 and G2, effective focal lengths EFL(G1) and EFL(G2), mean glass thicknesses MGT(G1) and MGT(G2) and mean air gaps MAG(G1) and MAG(G2), wherein the lens has a pop-out total track length TTL <20 mm in a pop-out state and a collapsed total track length c-TTL in a collapsed state, wherein TTL <0.95× EFL, and wherein a ratio c-TTL/TTL <0.7,
wherein a first deflection point at the rear surface of $L_{N-1}$ is located at a distance d-r measured from an optical axis of the lens, and wherein d-r >1.5 mm.

13. A lens system, comprising:
an image sensor; and
a lens distanced by a back focal length (BFL) from the image sensor and having a field of view FOV <40deg, an effective focal length (EFL) and a lens mean glass thickness (MGT), the lens including i lens elements L1-Li starting with L1 from an object side toward an image side, wherein 2≤i≤N, wherein each lens element Li has a respective thickness $T_i$, and a focal length $f_i$, with a magnitude $|f_i|$, wherein at least some lens elements are organized in two lens groups G1 and G2 separated by a big gap (BG) and having, respectively for G1 and G2, effective focal lengths EFL(G1) and EFL(G2), mean glass thicknesses MGT(G1) and MGT(G2) and mean air gaps MAG(G1) and MAG(G2), wherein the lens has a pop-out total track length TTL <20 mm in a pop-out state and a collapsed total track length c-TTL in a collapsed state, wherein TTL <0.95× EFL, and wherein a ratio c-TTL/TTL <0.7,
wherein a first deflection point at the front surface of LN is located at a distance d-f measured from an optical axis of the lens, and wherein d-f >0.8 mm.

14. A lens system, comprising:
an image sensor; and
a lens distanced by a back focal length (BFL) from the image sensor and having a field of view FOV <40deg, an effective focal length (EFL) and a lens mean glass thickness (MGT), the lens including i lens elements L1-Li starting with L1 from an object side toward an image side, wherein 2≤i≤N, wherein each lens element Li has a respective thickness $T_i$ and a focal length $f_i$, with a magnitude $|f_i|$, wherein at least some lens elements are organized in two lens groups G1 and G2 separated by a big gap (BG) and having, respectively for G1 and G2, effective focal lengths EFL(G1) and EFL(G2), mean glass thicknesses MGT(G1) and MGT(G2) and mean air gaps MAG(G1) and MAG(G2), wherein the lens has a pop-out total track length TTL <20 mm in a pop-out state and a collapsed total track length c-TTL in a collapsed state, wherein TTL <0.95× EFL, and wherein a ratio c-TTL/TTL <0.7,
wherein a first deflection point at the rear surface of LN is located at a distance d-r measured from an optical axis of the lens, and wherein d-r >0.15 mm.

15. A lens system, comprising:
an image sensor; and
a lens distanced by a back focal length (BFL) from the image sensor and having a field of view FOV <40deg, an effective focal length (EFL) and a lens mean glass thickness (MGT), the lens including i lens elements L1-Li starting with L1 from an object side toward an image side, wherein 2≤i≤N, wherein each lens element Li has a respective thickness $T_i$, and a focal length $f_i$, with a magnitude $|f_i|$, wherein at least some lens elements are organized in two lens groups G1 and G2 separated by a big gap (BG) and having, respectively for G1 and G2, effective focal lengths EFL(G1) and EFL(G2), mean glass thicknesses MGT(G1) and MGT(G2) and mean air gaps MAG(G1) and MAG(G2), wherein the lens has a pop-out total track length TTL <20 mm in a pop-out state and a collapsed total track length c-TTL in a collapsed state, wherein TTL <0.95× EFL, and wherein a ratio c-TTL/TTL <0.7,
wherein a first deflection point at the rear surface of LN is located at a distance d-r measured from an optical axis of the lens, and wherein d-r >2 mm.

* * * * *